United States Patent [19]
Phillips

[11] Patent Number: 5,307,892
[45] Date of Patent: May 3, 1994

[54] ELECTRONICALLY CONTROLLED POWER STEERING SYSTEM

[75] Inventor: Edward H. Phillips, Rochester Hills, Mich.

[73] Assignee: Techco Corporation, Troy, Mich.

[21] Appl. No.: 868,087

[22] Filed: Apr. 13, 1992

Related U.S. Application Data

[63] Continuation of Ser. No. 562,473, Aug. 3, 1990, abandoned.

[51] Int. Cl.⁵ .......................... B62D 5/04; B62D 5/06; B62D 5/08
[52] U.S. Cl. ................................ 180/79.1; 91/375 A; 180/132; 180/141; 180/142; 180/143; 364/424.05
[58] Field of Search ....................... 180/79.1, 132, 141, 180/142, 143; 364/424.05; 91/375 A

[56] References Cited

U.S. PATENT DOCUMENTS 4,875,540  10/1989  Oshita et al. ..................... 180/79.1

FOREIGN PATENT DOCUMENTS 118569  7/1984  Japan ..................... 180/141

Primary Examiner—Mitchell J. Hill
Attorney, Agent, or Firm—Gifford, Groh, Sprinkle, Patmore and Anderson

[57] ABSTRACT

An electronically controlled power steering system for motor vehicles is disclosed for steering dirigible wheels in response to an input torque applied to a steering wheel. The power steering system includes a mechanical steering gear mechanism coupled to the steering wheel for generating a mechanically derived steering force in response to the input torque. A power cylinder is coupled to the mechanical steering gear mechanism for producing a hydraulically derived steering force which augments the mechanically derived steering force. A control valve is provided which is in fluid communication with the power cylinder for generating differential pressure applied to the power cylinder. A first signal is generated which is indicative of the input torque applied to the steering wheel. A signal processing unit generates an output signal in response to the first signal. The signal processing unit is operable to selectively actuate the control valve in response to the output signal for selectively regulating the hydraulically derived steering force generated by the power cylinder.

69 Claims, 25 Drawing Sheets

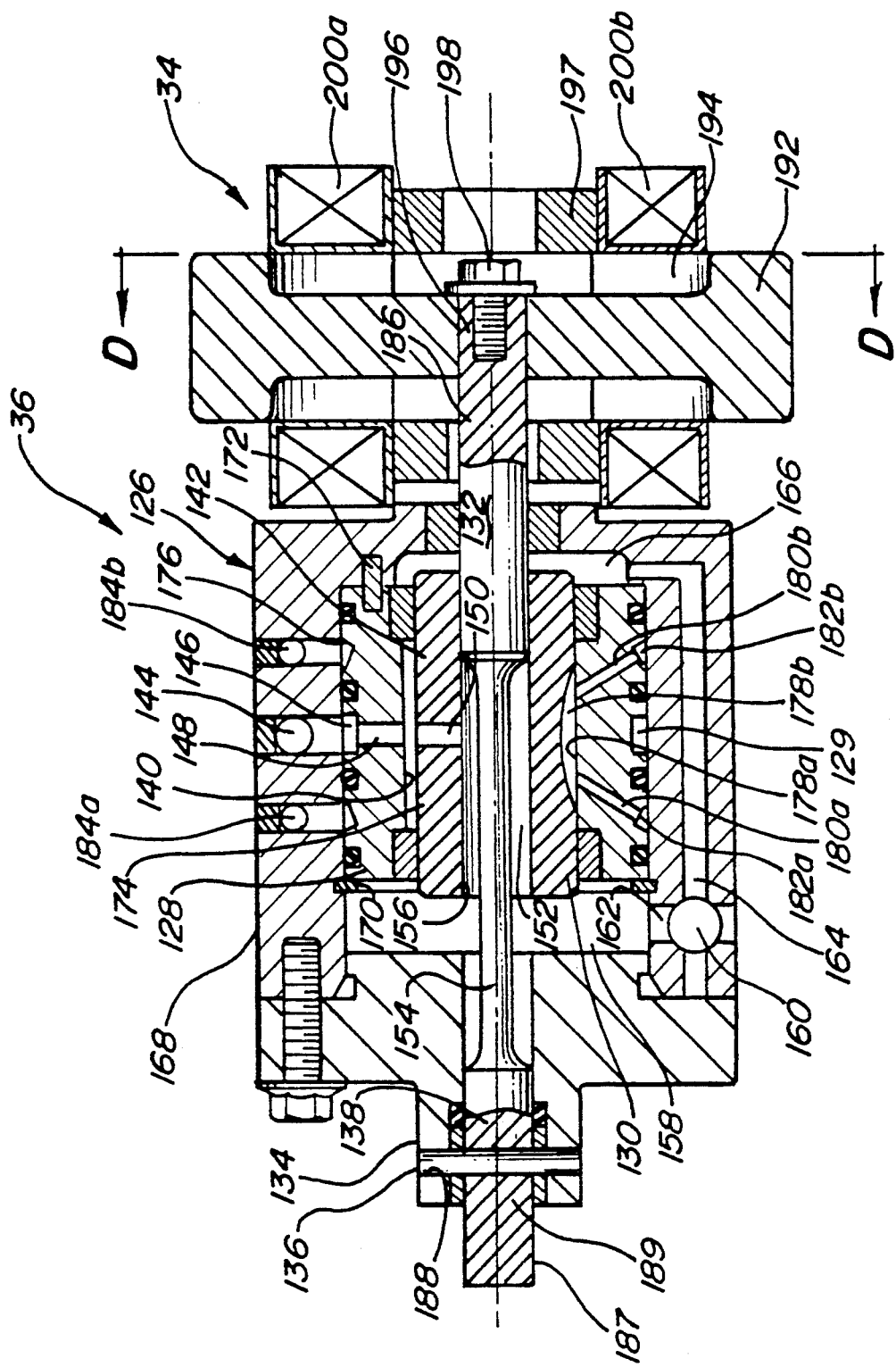

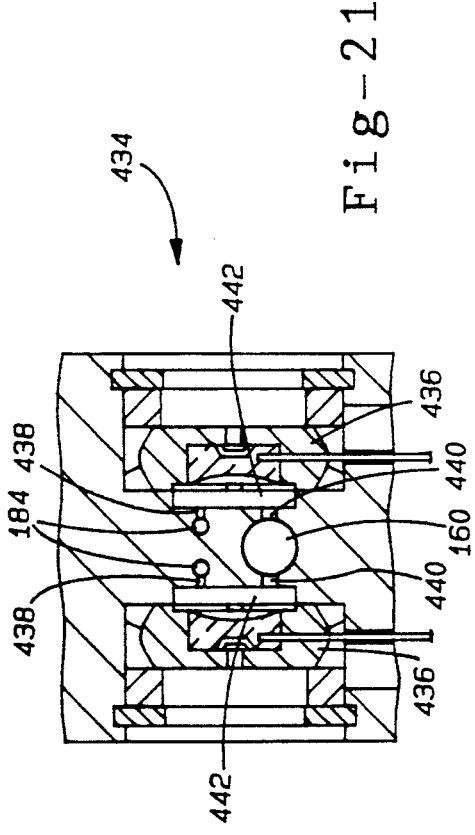

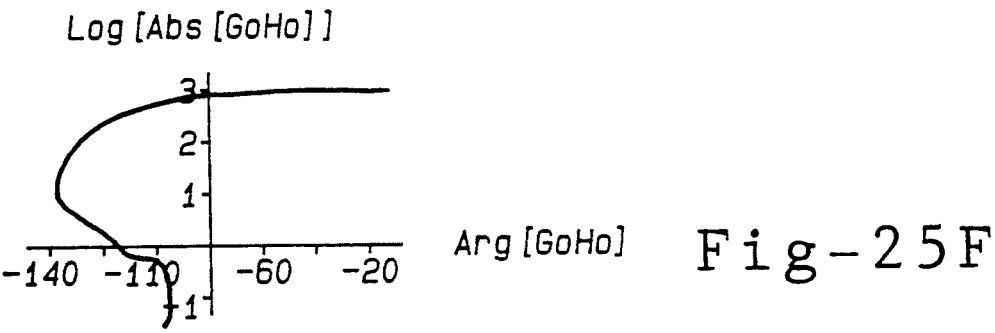
Fig-25F
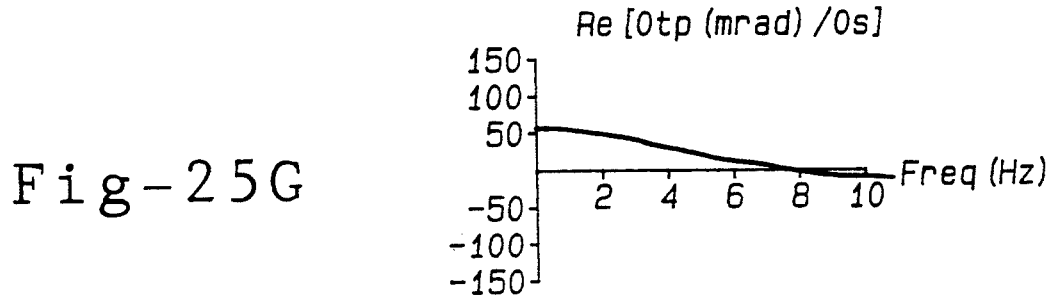
Fig-25G
Fig-25H
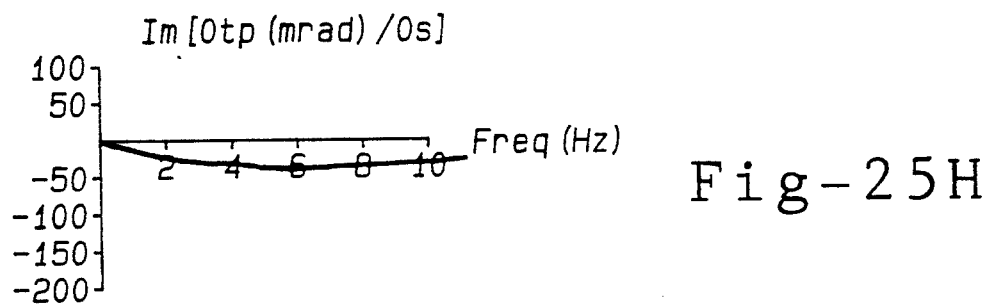
Fig-25I
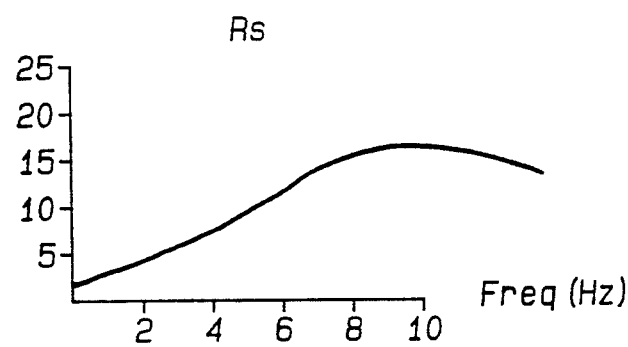
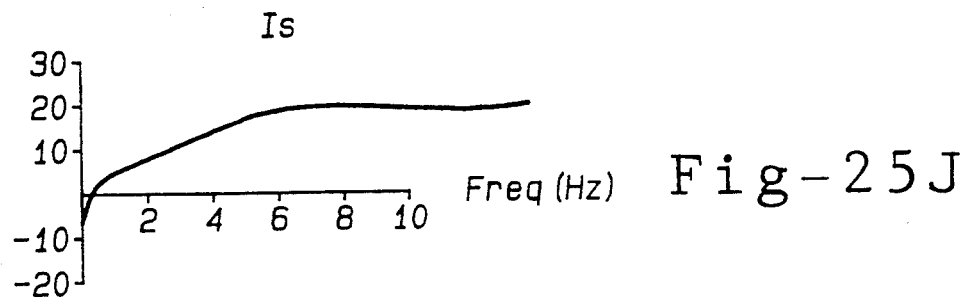
Fig-25J

ELECTRONICALLY CONTROLLED POWER STEERING SYSTEM

This is a continuation of U.S. patent application Ser. No. 07/562,473, filed Aug. 3, 1990 now abandoned.

BACKGROUND AND SUMMARY OF THE INVENTION

The invention relates generally to power steering systems and, in particular, to methods and apparatuses for electronically controlled power steering systems.

Power steering systems are used in motor vehicle applications to augment the steering effort provided by the driver of a vehicle. Many conventional systems employ a four-way open-center "rotary" control valve having "follow along" position feedback in which road feel is artificially induced by deflection of a torsion bar. Other power steering systems typically employ a four-way open-center "reaction" control valve also having "follow along" position feedback wherein road feel is induced directly via hydraulic reaction forces.

Conventionally, the control valves of the power steering systems are mechanically coupled to the vehicle's steering shaft and are typically located just ahead of the vehicles's steering gear assembly. Unfortunately, this placement often results in significantly compromising the static and dynamic performance of the host power steering systems. For example, such power steering systems may generate poor response during lower steering wheel torque inputs and/or generate excessive response to small changes in the steering wheel torque input at higher levels thereof. Dynamically, some conventional power steering systems are also subject to sluggish behavior which produces a response that is delayed beyond normally anticipated human perception times. In addition, some power steering systems are subject to undesirably rapid steering wheel motion without a concomitant increase in required steering wheel torque. In other words, the steering force output of such systems cannot be said to be rate stable.

Further, power steering systems have been recently modified to include "speed sensitive" steering. In general, most "speed sensitive" systems increase steering forces at high vehicular speeds by reducing hydraulic fluid flow through the control valves in order to reduce valve gain. An alternative power steering system, known as a "Variable-Assist" Power Steering System is described in SAE Technical Paper No. 880707 entitled 1988 LINCOLN CONTINENTAL VARIABLE-ASSIST POWER STEERING SYSTEM by J. J. Duffy.

In order to comprehend system performance characteristics required for an "ideal" power steering system, it is first necessary to understand the nature of a vehicle's overall information (i.e., feedback) inputs are visual and tactile. The driver senses the vehicle's overall position and dynamic attitude. The driver then compares the vehicle's actual lateral position and yaw, as well as any lateral acceleration and roll motion, with those he desires and mentally formulates error signals representative of the differences there between. The driver's response is to continuously modify his input to the vehicle's steering wheel. Typically, a driver completes the derived response by applying a predetermined level of torque to the steering wheel in anticipation of it executing a predetermined degree of rotational motion. If both the steering wheel and the vehicle behave precisely as anticipated, the steering system can be said to be "ideal".

Typical "rotary valve" equipped power steering systems have substantially nonlinear static performance characteristics. Unexpectedly small changes in the output force are concomitant with given changes in steering wheel torque at low output force levels while unexpectedly large changes of output force are concomitant with given changes in steering wheel torque at high output force levels. Both conditions can result in excessive steering wheel motion with respect to the predetermined amount of rotational motion anticipated by the driver. In the low output force condition, rotational compliance inherent in the rotary valve results in relatively large steering wheel motions before the required output force levels are obtained. And, in the high output force condition, lack of any apparent tactile input torque modulation often results in over-correction of the steering wheel's position.

In many cases, rotary valve equipped power steering systems also produce relatively slow response at low output force levels. This is indirectly the result of the method employed for achieving overall closed-loop stability of the system. All power steering systems are closed-loop servo systems which must achieve unity gain cross-over in a satisfactory manner for system stability. (A thorough discussion of servo system stability is contained in a book entitled FEEDBACK AND CONTROL SYSTEMS by Di Stefano III, Stubberud and Williams, and published by the McGraw-Hill Book Company as one of Schaum's Outline Series.)

Most rotary valve equipped power steering systems manufactured today utilize an O-ring "brake" to disrupt normal system roll-off characteristics and to preclude system oscillation Such an O-ring can be seen quite clearly in FIG. 2 of U.S. Pat. No. 4,452,274 (Haga et al). The O-ring is located in a groove in the steering shaft which is typically ported to incoming hydraulic fluid pressure such that the O-ring acts as a brake between the steering shaft and the valve sleeve whenever the incoming hydraulic fluid pressure is elevated.

The result of poor response at low steering forces is that the driver of a vehicle having rotary valve power steering is unable to exert "fine" direction control over the vehicle under transient conditions such as ruts in the road or side wind gusts. Vehicles having the slow response time noted above typically have a wide range of lateral position uncertainty under the most severe transient conditions which is generally greater than the range of lateral position uncertainty for vehicles equipped with backlash free manual steering systems.

To most modern vehicle owners, manual steering systems are deemed undesirable because they provide no steering assist. However, exclusive of their performance superiority over rotary valve systems, both manual and "reaction valve" equipped power steering systems have shortcomings when measured against the "ideal" standards outlined above. This is because the driver tactilely expects higher input torque requirements when entering a turn at a higher vehicular speed. Exclusive of exciting tire slip angles and the like, this is simply not the case with any known steering system unless it is supplemented with a shock absorber-type damper linked to the vehicle's dirigible wheels. In fact, under certain nonlinear conditions involving tire slip angles or other transient conditions, rapid movements of the steering wheel can even result in lower input torques. The reason for this unstable behavior is that known steering systems, which do not feature the above noted shock absorber-type damper, have minimal rate stabilization, or feedback, inherent in their operation.

In accordance with the teachings of the present invention, the concept of utilizing "rate" feedback to enhance steering stability can be extended to form the basis for an improved type of speed sensitive steering known herein as "rate derived-speed sensitive" steering. As detailed hereinbefore, conventional "speed sensitive" steering systems merely increase steering force (i.e., magnitude derived speed sensitive steering systems). To promote superior stability, it is preferable to implement a "rate derived-speed sensitive" steering system wherein rate feedback is increased as a function of vehicular speed. Therefore, tactile resistance is felt by the driver in direct proportion to the applied steering wheel rotational velocity. In addition, the tactile resistance would increase as a selected function of vehicular speed.

Accordingly, the present invention includes various structural embodiments and methods for an electronically controlled power steering system wherein the advantages associated with the "ideal" steering system, explained above, are substantially realized. In a first embodiment, a torque transducer associated with the steering shaft is used to provide a signal indicative of steering wheel torque. This applied torque derived, signal (hereinafter "torque signal") is suitably frequency compensated or manipulated and amplified The compensated and amplified torque signal is then utilized to provide an "output signal" which drives a torque motor which, in turn, actuates a rotary control valve. The rotary valve then provides differential fluid flow to a power cylinder to provide steering assist. If desired, the signal amplification can be varied as a function of vehicular speed to implement "magnitude derived-speed sensitive" steering.

The torque motor driven rotary valve can be located remotely from the steering shaft. Preferably, it is located within a pump assembly utilized to provide hydraulic fluid to the power steering system. Fluid passage to-and-from the rotary valve is accomplished via direct porting with hydraulic lines used for transmitting fluid to either end of the power cylinder.

Functionally, nonlinear amplification of the torque signal is used to increase system gain at low input torque levels and reduce system gain at high input torque levels. Thus, the static performance characteristic of the overall power steering system is modified such that it is much more nearly ideal. The frequency compensation is utilized to ensure stable system operation together with an acceptable unity gain cross-over frequency. Thus, the system response is tactilely acceptable in both magnitude and response time under virtually all normal and transient conditions.

The nonlinear amplification of the torque signal can be accomplished in a continuous manner through zero values of applied torque. Alternatively, the torque signal can be initialized at selected left and right values of applied torque. This provides a "dead zone" near the zero values of applied torque wherein no steering assist is provided. If this is done, the effect is to emulate power steering systems wherein components of the control valve assembly are physically locked or "intermeshed" together at low values of applied torque. In this manner, unassisted manual steering is present at low values of steering load.

According to a second embodiment, a tachometer is located within the steering unit. The tachometer is used to provide an additional signal indicative of steering rate (hereinafter "rate signal"). The "rate signal" is suitably frequency compensated and amplified. The amplification can be accomplished linearly or it can be accomplished nonlinearly as a function of its own magnitude and/or the magnitude of the torque signal. The compensated and amplified rate signal is then utilized to selectively modify the "output" signal applied to the torque motor in order to provide the "rate feedback" mentioned hereinbefore. Also, the amplification can be varied as a function of vehicular speed to implement the "rate derived-speed sensitive" steering of the present invention.

In a third preferred embodiment, pressure transducers are utilized to measure differential pressure applied to the power cylinder. Output signals from the pressure transducers are utilized to provide a "pressure" signal which, in turn, is feedback and selectively compared with the "torque" signal. Such feedback ensures that the differential pressure applied to the power cylinder is actually the desired function of the torque applied to the steering wheel. Thus, while the power steering system described in the third embodiment includes application of a rotary valve, it emulates the superior operational characteristics of power steering systems utilizing reaction valves.

In a fourth embodiment, a reaction valve is substituted for the rotary valve. An exemplary reaction valve suitable for this purpose is one that was first described in U.S. Pat. No. 4,922,803, entitled FOUR-WAY VALVE issued May 8, 1990 to Edward H. Phillips, and as modified in U.S. Ser. No. 485,637, entitled VARIABLE RATIO REACTION VALVE by Edward H. Phillips, filed Feb. 23, 1990, both of which are assigned to the common assignee of the present application and both of which are incorporated by reference herein. These control valves are known as "variable ratio" reaction valves and have the advantage that their static performance characteristics are selectively chosen in a manner that substantially emulates the ideal static performance characteristics described above. Thus, the torque signal can be linearly amplified rather than nonlinearly amplified in forming the "output" signal used to drive the torque motor.

The control valve of the fourth embodiment is superior over conventional systems in that it is a reaction valve such that the torque imposed on the torque motor is a more accurate model of the actual steering load. Since the torque delivered by the torque motor is substantially a linear function of the output signal and the torque signal and applied torque are also linearly related thereto, the applied torque is likewise a more accurate model of the actual steering load. As will be explained hereinafter, this characteristic aids in centering the steering wheel after a turn. In addition, since reverse differential pressure generated by the mechanical backup steering can exert reverse torque on the reaction valve. This tends to open the reaction valve so that mechanical backup steering can be accomplished with reduced effort. Thus, the fourth preferred embodiment of the present invention substantially emulates the superior "ideal" power steering system as outlined hereinbefore.

Because the fourth embodiment includes "rate" feedback, it is possible to eliminate a pair of controlled orifice flow restrictors commonly utilized with reaction valves as described in U.S. Pat. No. 4,922,803 (See FIGS. 22-26C). This is possible because the hydraulically-derived rate stabilization provided by the controlled orifice flow restrictors of U.S. Pat. No. 4,922,803 is electronically implemented in the present invention by the rate feedback function. This has the further advantage of eliminating hydraulic power loss associated with the controlled orifice flow restrictors. Thus less hydraulic power is required whenever the steering system is in motion.

As in all power steering systems, a fail-safe operation is required for all of the various embodiments of the present invention. In the case of the first, second and fourth preferred embodiments of the present invention, current passing through the torque motor is measured and compared with calculated current values. In the case of the third preferred embodiment of the present invention, the output signals from the pressure transducers are compared with calculated differential values thereof. In either case, excessive variation thereby causes current to stop flowing through the torque motor.

Various other objects and advantages of the present invention will become more apparent to one skilled in the art from reading the following specification taken in conjunction with the appended claims and the following drawings.

BRIEF DESCRIPTION OF THE DRAWINGS

FIG. 5 is a cross-sectional view depicting an exemplary rotary control valve assembly which is utilized in the first, second and third preferred embodiments of the present invention;

FIG. 21 is a sectional view depicting a differential pressure transducer assembly associated with the third preferred embodiment of the present invention;

FIG. 22 is a detailed block diagram depicting the function of the control portions of the third preferred embodiment of the present invention;

DETAILED DESCRIPTION OF THE PREFERRED EMBODIMENTS

Figure 1:
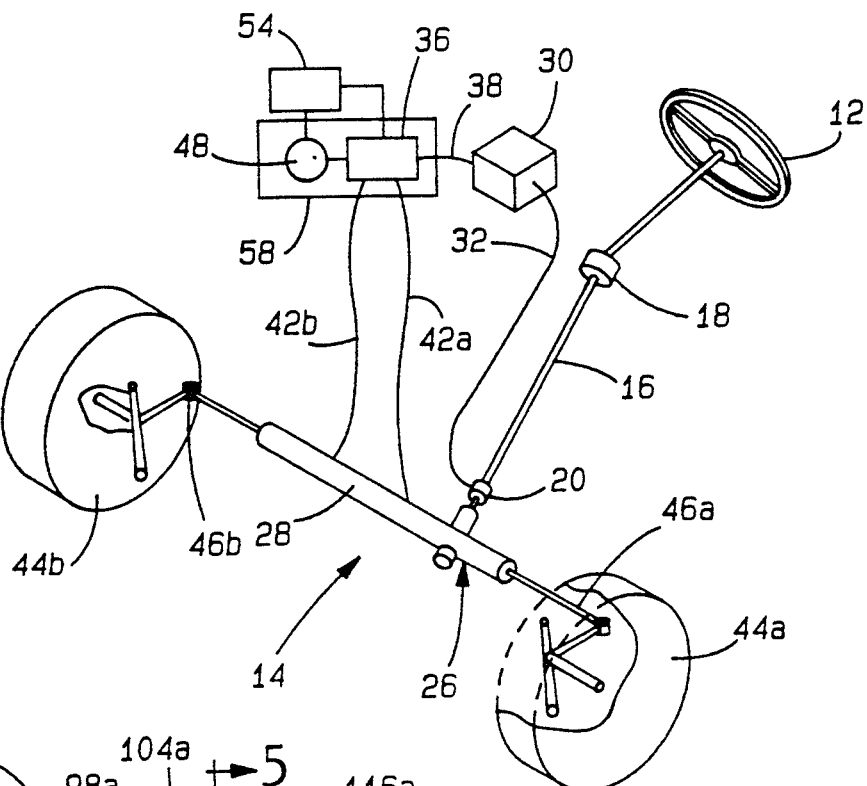
FIG. 1 is an isometric drawing showing the general relationship of various components of an electronically controlled power steering system according to the present invention.

With reference to FIGS. 1 through 11, a first embodiment of an electronically controlled power steering system 10 for use in a motor vehicle is shown. In the operation of an electronically controlled power steering system 10, a driver of the motor vehicle applies an "input" torque by selectively rotating a steering wheel 12. The "input" torque is transmitted to a steering unit 14 via a steering shaft 16 which typically includes first and second couplings 18 and 20. Steering unit 14 includes an internal torque transducer 22. As will be described hereinafter in greater detail, when an electronically controlled power steering system 10 is configured as any of the power steering systems, according the second through fourth embodiments to be hereinafter described, steering unit 14 additionally includes an internal tachometer 24. In general, torque transducer 22 is utilized for providing a "torque" signal that is representative of the "input" torque while tachometer 24 is used for providing a "rate" signal that is representative of the velocity of any output motion of steering unit 14.

Steering unit 14 also includes a mechanical steering gear assembly 26 and a power cylinder 28. Power cylinder 28 is conventionally configured as a double-acting hydraulic cylinder which is mechanically coupled to steering gear assembly 26. Power cylinder 28 is utilized for the conventional purpose of providing steering assist in the form of a "hydraulically derived" steering force. The "hydraulically derived" steering force augments the "mechanically derived" steering force, produced by steering gear assembly 26, to generate a "total" steering force.

In general, the torque and rate signals are conveyed to a signal processing unit 30 via an input cable 32. The torque and rate signals are suitably filtered, amplified and manipulated or frequency compensated to form an "output" signal. The output signal is applied to a torque motor 34 via an output cable 38. Torque motor 34 is located within a control valve assembly 36 and is used to selectively apply torque to a control valve 40, also confined within valve assembly 36, such that output fluid is selectively conveyed to either end of power cylinder 28 via left and right hydraulic lines 42a and 42b, respectively. Steering motion and total steering force are applied to dirigible wheels 44a and 44b, from steering unit 14, via tie-rod and linkage assemblies 46a and 46b, respectively.

Hydraulic fluid is normally supplied to control valve 40 at a nominally constant flow rate by a pump 48. Pump 48 is usually driven by the vehicle's engine (not shown) via a belt and pulley assembly (not shown). When pump 48 is thus directly coupled to the vehicle's engine, and further, when it is a fixed displacement pump, the flow rate of output fluid flowing from the fixed displacement pump varies proportionately with engine speed. In this case, a portion of the output fluid flow is then selectively bypassed to a reservoir 54 by a flow regulating device and the remaining fluid flow is delivered to control valve 40 at the nominally constant input fluid flow rate. (i.e., see a description of such power steering pumping systems in MARKS' HANDBOOK FOR MECHANICAL ENGINEERS published by the McGraw-Hill Book Company.)

In general, control valve assembly 36 may be located within steering unit 14, in nominally juxtaposed relation to power cylinder 28, or it can be remotely positioned as predicated on each particular vehicular application. For example, FIG. 1 schematically shows control valve assembly 36 positioned near and, more preferably, commonly housed with pump 48 in a housing 58. This placement has the advantage that both input fluid flow to, and return flow from, control valve assembly 36 can be conducted directly via porting which is internal to housing 58.

As an alternative, the fixed displacement pump and flow regulating by-pass valve can be replaced by a substantially constant speed (i.e., electric motor driven) fixed displacement pump to obtain a constant input fluid flow rate. Alternatively, they could be replaced by an engine driven variable displacement pump whose displacement is varied such that its value is substantially inversely proportional to engine speed.

Either alternate installation would have two distinct application advantages. First, less fluid would be pumped. Thus, energy consumption would be reduced. And second, the variable (i.e., as a function of system pressure) time constant associated with the response time of flow regulating by-pass valve would be eliminated. And, as will be shown hereinafter, servo-control of control valve 40 would be simplified. However, it will be appreciated by those skilled in the art that any suitable hydraulic system for supplying constant input flow to control valve 40 can be utilized.

Figure 3:
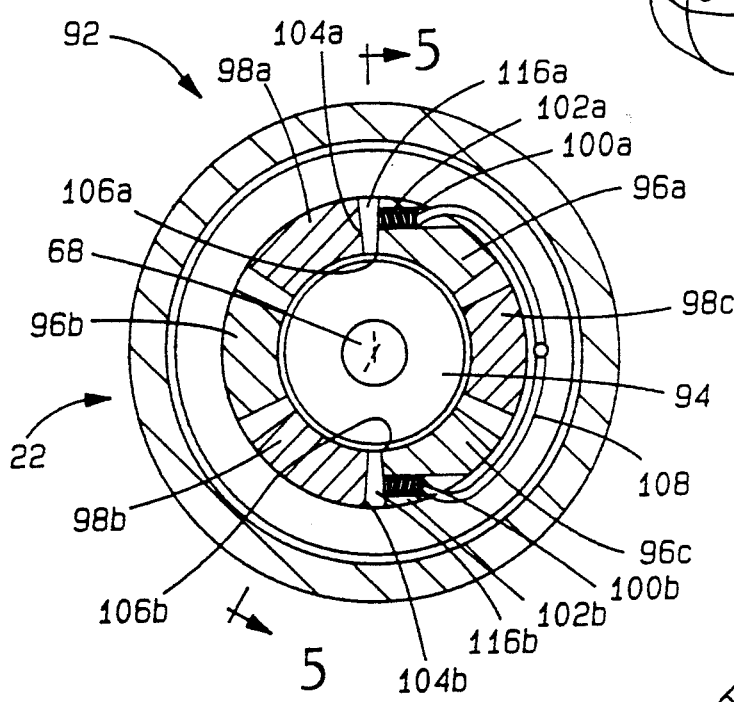
FIG. 3 is a cross-sectional view taken along line A—A of FIG. 2.
Figure 4:
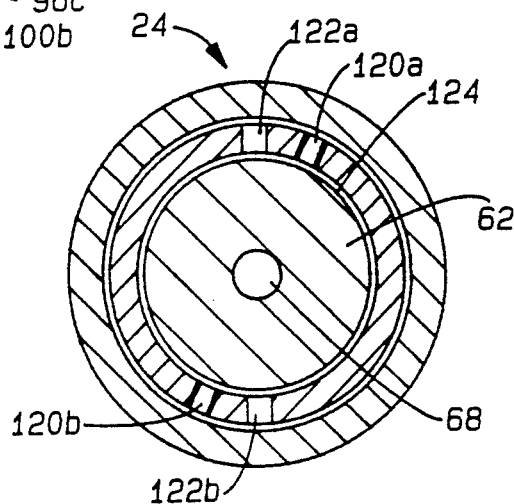
FIG. 4 is a cross-sectional view taken along line B—B of FIG. 2.
Figure 2:
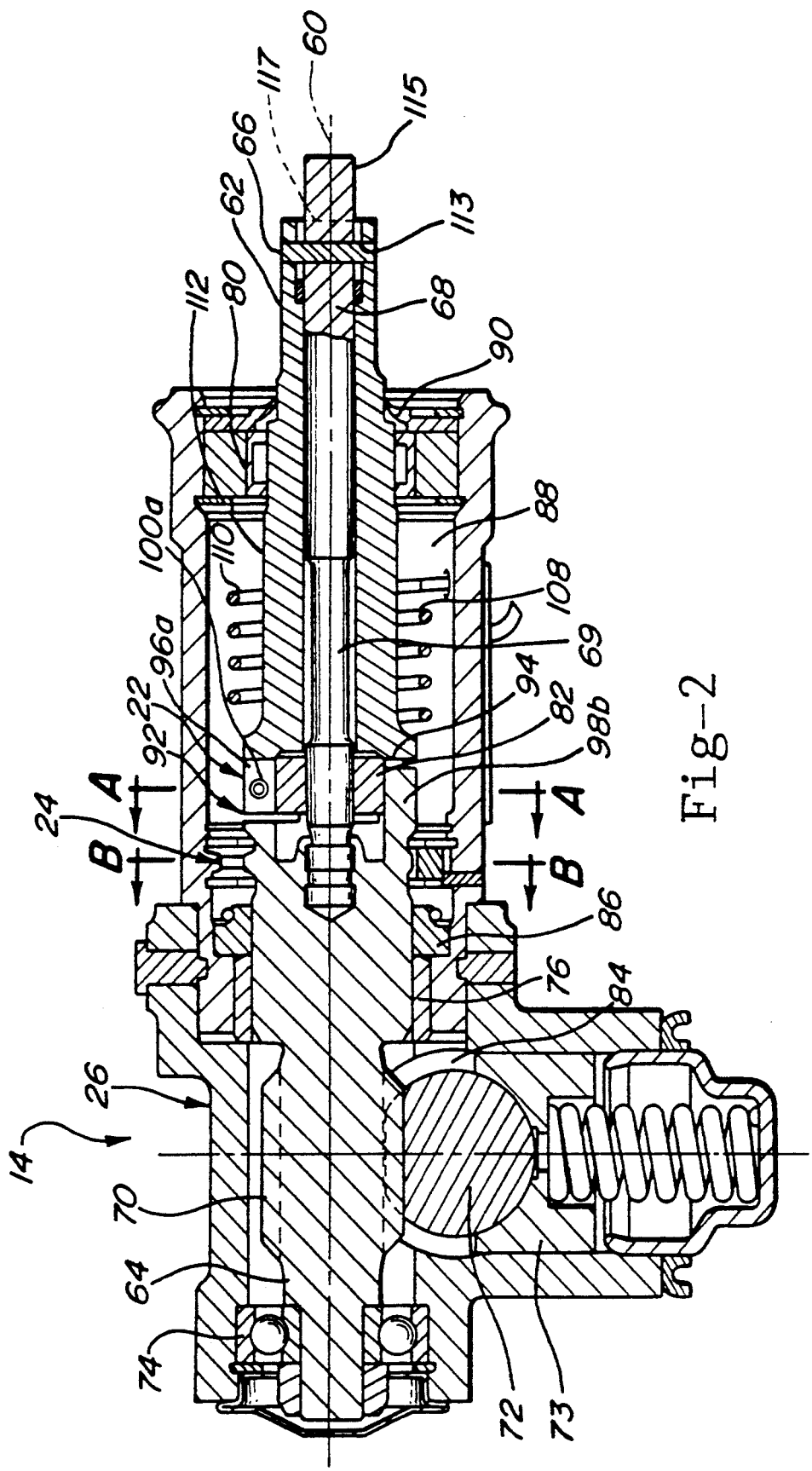
FIG. 2 is a cross-sectional view taken along line C—C of FIG. 3 showing the input portion of the steering unit of FIG. 1, a torque sensor, a tachometer and a steering gear assembly.
Figure 6:
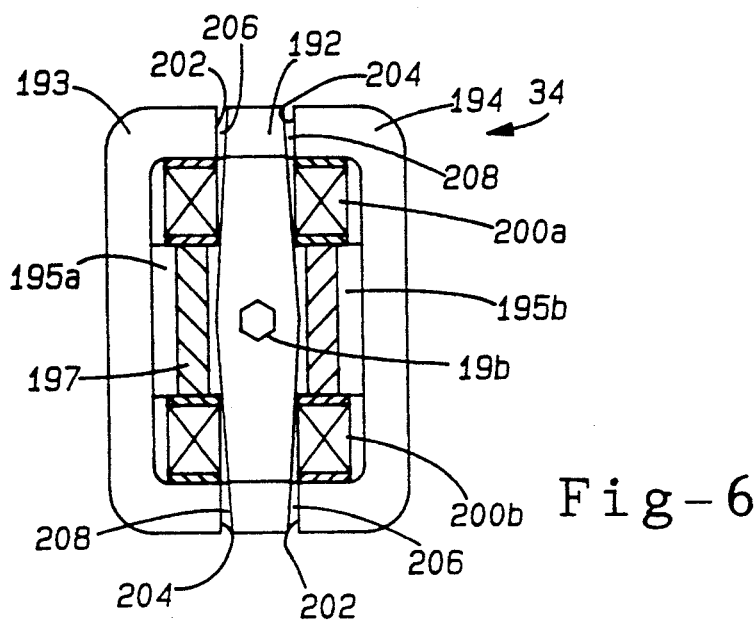
FIG. 6 is a cross-sectional view taken along line D—D of FIG. 5 showing an exemplary torque motor utilized for providing rotation to the control valves described herein.

With particular reference to FIGS. 2, 3 and 4, the primary structural components associated with a portion of steering unit 14 and including torque transducer 22, tachometer 24 and steering gear assembly 26 are disclosed. While steering gear assembly 26 is illustrated as a rack and pinion type, it will be appreciated that other steering mechanisms, such as recirculating ball types, can be used. FIG. 2 is a cross-sectional view having a centerline 60 which is substantially common to both an input shaft 62 and an actuation member such as pinion shaft 64. Input torque is applied to input shaft 62 from steering shaft 16 via coupling 20. The input torque is transmitted to pinion shaft 64 via a pin 66 and a rotationally compliant member such as torsion bar 68 in a manner similar to that utilized in many conventional rotary power steering valves. It will be noted that these components and their utilization generally follow similar components as disclosed in U.S. Pat. No. 4,452,274 (Haga et al). However, torsion bar 68 is depicted with a much stiffer compliant section 69. The increased stiffness is indicative an electronically controlled power steering system 10 has much improved tactile input characteristics, as will be detailed below.

The input torque applied to pinion shaft 64 is imparted by a pinion gear 70 formed on pinion shaft 64 to a driven member such as a transversely extending rack 72 to produce the "mechanically derived" steering force. Rack 72 is biased by a spring loaded yoke 73 to provide "back-lash" free operation. Pinion shaft 64 is supported by bearings 74 and 76 and axially retained by nut 78 and input shaft 62 is supported by bearings 80 and 82 and axially retained via the interference assemblage of torsion bar 68 into pinion shaft 64 and pin 66. In addition, lubricating grease is retained within a cavity 84 within which steering gear assembly 26 is disposed by a seal 86. Likewise, dust is excluded from a second cavity 88 which is adapted to house torque transducer 22 and tachometer 24 by a dust seal 90.

With reference particularly now to FIGS. 2 and 3, an exemplary combined torque transducer and backup coupling assembly 92 is depicted. The combined torque transducer and backup coupling assembly 92 includes a loosely fit jaw-type coupling 94 having three jaw teeth 96a, 96b and 96c formed on the inboard end of input shaft 62, and three complimentary jaw teeth 98a, 98b and 98c formed on the juxtaposed end of pinion shaft 64. First and second proximity transducers 100a and 100b respectively, are located in counterbored holes 102a and 102b, formed in jaw teeth 96a and 96c, respectively, such that they measure the distances between surfaces 104a and 106a, and 104b and 106b, respectively, of jaw teeth 96a and 98a, respectively, and jaw teeth 96c and 98c, respectively.

A cable 108 is utilized to make electrical connections to first and second proximity transducers 100a and 100b, respectively, which are mounted on input shaft 62 and thus rotate with respect to cavity 88. Cable 108 is formed with a coiled section 110 which is loosely wrapped around a smooth cylindrical portion 112 of input shaft 62. This allows input shaft 62 to rotate without constricting cable 108.

In operation, torsion bar 68 deflects in a substantially linear manner with respect to the "input" torque via the driver applying a torque to steering wheel 12. Thus, there is a related opposite polarity change in the proximate distances between proximity sensor 100a and surface 106a, and proximity sensor 100b and surface 106b concomitant with the application of the input torque. Signal processing unit 30 derives a signal from first proximity transducer 100a which is subtracted from a signal derived from second proximity transducer 100b to form a "torque" signal.

Normally, during assembly and with the combined torque transducer and backup coupling assembly 92 free of applied torque, jaw teeth 96a, 96b and 96c are appropriately centered between jaw teeth 98a, 98b and 98c. This is accomplished via rotational alignment of torsion bar 68 with respect to input shaft 62 such that the "torque" signal has a substantially zero value. This alignment is maintained while a hole 113 is formed through input shaft 62 and torsion bar 68 to accept pin 66 which is thereafter inserted therein. Although torsion bar 68 is shown extending from input shaft 62 (as indicated at 115) to enable this procedure, it is usually cut flush as indicated by dashed line 117 upon completion the assembly process.

The torque signal could be determined from either one of the signals derived from first and second proximity transducers 100a and 100b, respectively. However, because first and second proximity transducers 100a and 100b, respectively, are redundant, nominally fail-safe operation is derived by comparing their signals (i.e., within signal processing unit 30). If the absolute values of their output signals diverge excessively, then the system is disabled and mechanical backup steering (which is enabled as described below) is engaged. In addition, the utilization of first and second proximity transducers 100a and 100b, respectively, results in common mode rejection of signal errors due to any lateral offset motions of pinion shaft 64 relative to input shaft 62 (i.e., due to bearing clearance, etc). If any such relative lateral offset motion occurs, both signals are similarly effected and their difference remains substantially unchanged.

Preferably, first and second proximity transducers 100a and 100b, respectively, are inductive transducers whose direct output signals are highly non-linear. For this reason, their proximate active ends are located within counterbores 116a and 116b, respectively, of counterbored holes 102a and 102b, respectively, behind the plane of surfaces 104a and 104b, respectively. By mounting the proximity transducers in this manner, the range of measured proximate distances to surfaces 106a and 106b, respectively, is less than the null measured proximate distance thereto. Thus, signal processing requirements for first and second proximity transducers 100a and 100b, respectively, are simplified. In general, however, the direct output signals from proximity transducers 100a and 100b are non-linearly pre-amplified to form signals that are substantially a linear representation of the distances between surfaces 104a and 106a, and 104b and 106b, respectively.

The combined torque transducer and backup coupling assembly 92 additionally provides for backup mechanical steering in the event of possible system failure (i.e., such as is most commonly due to drive belt breakage and the resulting hydraulic failure). In this regard, the loosely fit jaw-type coupling 94 is equivalent in function to a loosely fit spline coupling, typical to most conventional rotary valve assemblies and shown, for instance, in FIG. 2 of U.S. Pat. No. 4,452,274. In practice, surfaces 102a and 104a, and 102b and 104b are formed with a slight crown and located such that the nominal distance therebetween accommodates the maximum desired deflection angle of torsion bar 68 during normal functioning of the electronically controlled power steering system 10.

With reference to FIGS. 2 and 4, an exemplary tachometer 24 is depicted. Tachometer 24 is thoroughly described in copending U.S. Pat. No. 5,121,054 entitled TACHOMETER by Edward H. Phillips and David W. Shortt, filed Jun. 6, 1990 issued Jun. 9, 1992, and U.S. Pat. No. 5,059,900 entitled TACHOMETER by Edward H. Phillips, issued Oct. 22, 1991 both of which are assigned to the common assignee of the present application and are incorporated by reference herein. Briefly, tachometer 24 utilizes first and second pairs of proximity transducers 120a and 122a, and 120b and 122b, respectively, to monitor the rotational position of a four-lobed sinusoidally undulating surface 124 formed on pinion shaft 62. Signals from these transducers are non-linearly amplified, in the manner described above, with respect to first and second proximity transducers 100a and 100b, respectively. Each one of first and second pairs of proximity transducers 120a and 122a, and 120b and 122b, respectively, generate quadrature signals x and y which are representative of the sinusoidal undulations of surface 124. These quadrature signals are then processed according o the equation:

$$d\theta/dt = (x\, dy/dt - y\, dx/dt)/r^2,$$

where $r^2 = x^2 + y^2$ (and thus has a constant value) to generate a "rate" signal which is representative of the rotational velocity $d\theta/dt$ of pinion shaft 64.

Again, in the manner described above with respect to the first and second proximity transducers 100a and 100b, respectively, operation of first and second pairs of proximity transducers 120a and 122a, and 120b and 122b, respectively, is redundant and further act to reject common mode mechanical inputs. In this case, however, signals derived from first and second pairs of proximity transducers 120a and 122a, and 120b and 122b, respectively, are summed rather than subtracted. Common mode rejection of offsetting lateral motion of pinion shaft 64 relative to input shaft 62 occurs because such motion results in opposite sign variations of the signals derived from individual proximity transducers 120a and 120b, or 122a and 122b. Thus, the sums of the signals derived from either of first or second pairs of proximity transducers 120a and 122a, or 120b and 122b, respectively, remain substantially unchanged.

FIG. 5 is a cross-sectional view illustrating an exemplary control valve 40 which, more particularly, is configured as a rotary valve assembly 126 and which is utilized in control valve assembly 36 in the first, second and third embodiments of the electronically controlled power steering systems of the present invention to be hereafter described. (Note that FIG. 5 is actually a multi-sectioned view as indicated by wavy lines 127 and 129. This allows all the elements of rotary valve assembly 126 as discussed herein to be viewed in one figure.) Rotary valve assembly 126 includes a fixed valve sleeve 128, a rotor 130 which is rotatably disposed within valve sleeve 128, and a torsion bar 132 which elastically connects rotor 130 to a fixed end cap 134 via a locator pin 136. Except for the fact that valve sleeve 128 and outboard end 138 of torsion bar 132 are fixed and that rotary valve assembly is remotely located from steering gear assembly 26, the components function in a generally conventional manner (i.e., similarly to like components depicted in FIG. 2 of U.S. Pat. No. 4,452,274).

Valve sleeve 128 has an even numbered plurality of axially extending slots formed on its inner periphery such that the even numbered slots are input slots 140 and the odd numbered slots are return slots 142. Input fluid flows to rotary valve assembly 126 via an input port 144, around an input groove 146 and into each of input slots 140 via an entry port 148. Return fluid flows from return slots 142 via an exhaust port 150 formed in rotor 130, to a passage 152 formed by the annular space between a torsionally compliant section 154 of torsion bar 132 and an axially extending bore 156 formed in rotor 128. The return fluid then flows into a first end chamber 158 and out through a return port 160 via a return line 162. In addition, a vent line 164 allows leakage fluid to pass from a second end chamber 166 to return port 160. Valve sleeve 128 is retained within valve housing 168 by a retaining ring 170 and is precluded from rotation therein by a pin 172.

Rotor 130 has an identically numbered plurality (i.e., the same number as the sum of input slots 140 and return slots 142) of axially extending input and return lands 174 and 176, respectively, facing input slots and return slots 140 and 142, respectively (i.e., exhaust ports 150 are formed in return lands 176 of rotor 130). In general, input and return lands 174 and 176, respectively, are tangentially narrower than input and return slots 140 and 142, respectively. This allows fluid to flow continuously through left and right slots 178a and 178b, respectively, which are formed in rotor 130 in order to define input and return lands 174 and 176, respectively. Left and right output fluid is thereby capable of selective flow through left and right passages 180a and 180b, respectively, around left and right grooves 182a and 182b, respectively, and through left and right ports 184a and 184b, respectively, and to-or-from the left and right hydraulic lines 42a and 42b, respectively (not shown in FIG. 5). Rotor 130 is affixed to inboard end 186 of torsion bar 132 via interference fit therebetween for rotation therewith.

Typically, rotor 130 is rotationally aligned within valve sleeve 128 such that input and return lands 174 and 176, respectively, are centered with respect to input and return slots 140 and 142, respectively, before a hole 188 is formed through end cap 134 and outboard end 138 of torsion bar 132 to accept receipt of locator pin 136. This is usually accomplished by passing fluid through rotary valve assembly 126, measuring left and right port pressures, selectively rotating outboard end 138 of torsion bar 132 with respect to end cap 134 until the left and right port pressures are substantially equal and then forming hole 188 and inserting pin 136 therethrough. Although outboard end 138 is shown extending from end cap 134 (as indicated at 187) to enable this procedure, it usually is cut flush as indicated by dashed line 189 to complete the assembly Referring now to FIG. 6, torque motor 34 is preferably a DC torque motor comprising an armature bar 192 rotating within pole pieces 193 and 194. Pole pieces 193 and 194 are north and south poled, respectively, under the influence of permanent magnets 195a and 195b. Permanent magnets 195a and 195b are positioned between a cage 197 and pole pieces 193 and 194, respectively. Armature bar 192 is affixed to inboard end 186 of torsion bar 132 via locking taper 196 and lock screw 198. Armature bar 192 applies torque to inboard end 186 of torsion bar 132 in substantially linear relationship to current flow through armature windings 200a and 200b.

In operation, the "output" signal from signal processing unit 30 is applied to armature windings 200a and 200b whereupon current flows therethrough in a substantially linearly manner. The current causes armature bar 192 to become poled with pole strength and direction that is also substantially linearly related to the "output" signal from signal processing unit 30. This causes armature bar 192 to be repelled from one set of pole piece faces 202 and 204 and attracted to the other set of pole piece faces 202 and 204 according to its induced pole strength and direction. An exemplary procedure for designing such torque motor 34 is as follows:

Magnetic force present in either of gaps 206 and 208 and supplemental field strength emanating from armature bar 192 are found by the equations:

$$F = B^2 A/2\mu_o$$

and $$B_a \mu_o N I/2g,$$

where F is the magnetic force, B is any particular field strength, $B_a$ is the supplemental field strength emanating from armature bar 192, A is the area of any of pole piece faces 202 or 204, $\mu_o = 4\pi \times 10^{-7}$, N is the number of turns in armature windings 200a and 200b, I is the current passing through armature windings 200a and 200b, and g is the nominal null gap present between any pole pieces 202 or 204 and armature bar 192. From these basic relationships output torque "T" can be found by $$T = (R A/\mu_o)[(B_o + \mu_o N I/2g)^2 - (B_o + \mu_o N I/2g)^2] = 2 R A B_o N I/g$$

where R is nominally the radius to the center of any of pole piece faces 202 or 204, and $B_o$ is the field strength provided by permanent magnets 195a and 195b.

According to the SAE Technical Paper No. 880707 entitled 1988 LINCOLN CONTINENTAL VARIABLE-ASSIST POWER STEERING SYSTEM, an unstressed valve orifice gap of 2.4 degrees (or 0.042 rad.) is sufficient for acceptable valve operation. A similar, or slightly larger, angular deflection capability is required for torque motor 34. Thus, a g/R ratio of 0.05 rad. is selected for torque motor 34 and the maximum value of the product N I is found by the equation:

$$N I_{max} = T_{max}/40 A B_o$$

where the subscript (max) implies maximum values. For instance, if $T_{max}$ is selected equal to 2 Nm, A is selected equal to 0.0002 M² and $B_o$ is set at 0.8 T, then $NI_{max} = 312.5$ At. Further, this means that the maximum value of $B_a$ is found by $$B_{amax} = \mu_o N I/2g = 0.0785 T.$$

Figure 7:
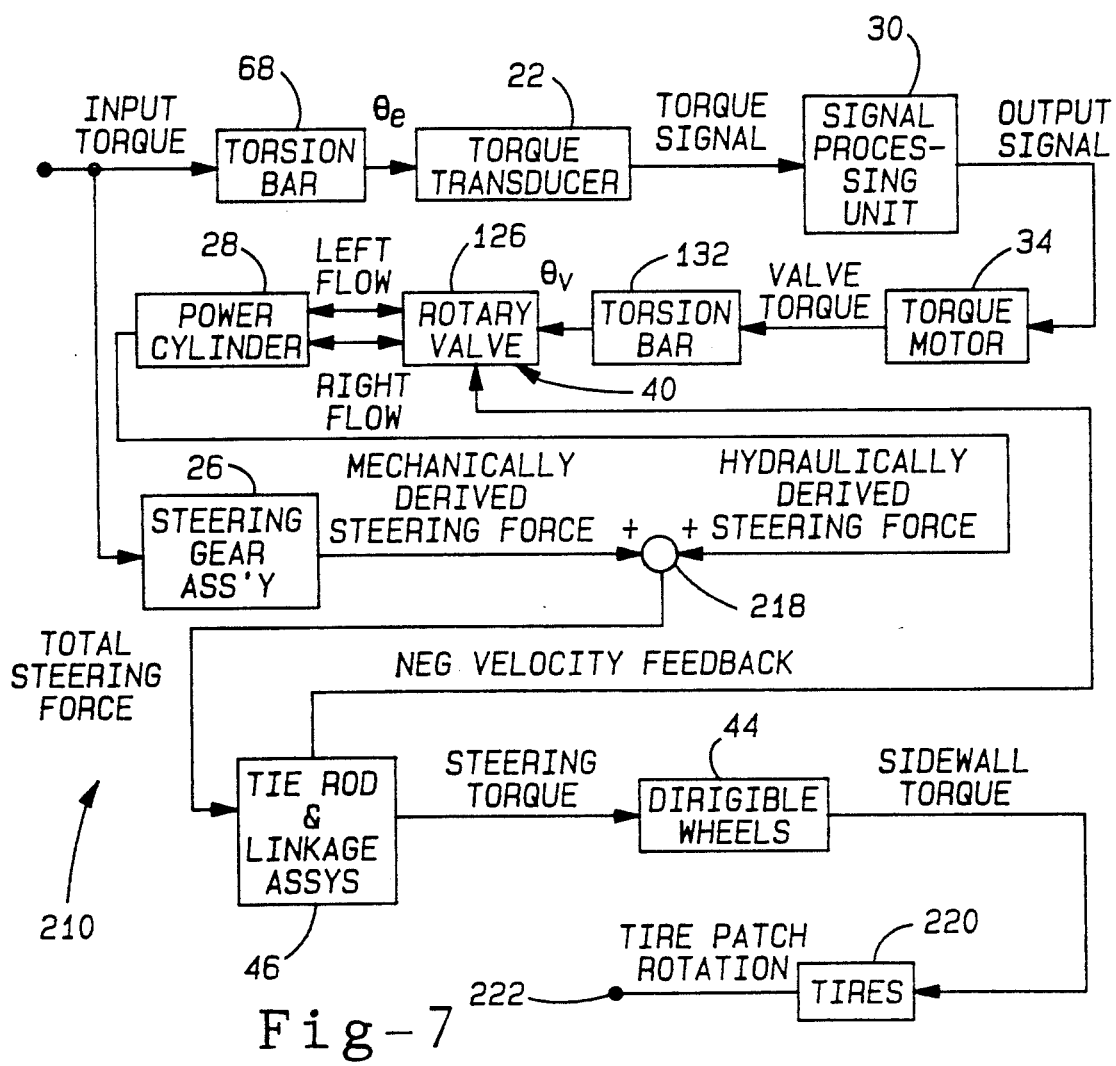
FIG. 7 is a block diagram depicting the operation of an electronically controlled power steering system according to the first preferred embodiment of the present invention.

With reference now to FIG. 7, a block diagram illustrating the interconnection, operation and output of the major components of an electronically controlled power steering system 210 configured according to a first embodiment of the present invention is disclosed (i.e., it utilizes rotary valve assembly 126 and torque transducer 22 but does not incorporate tachometer 24). "Input" torque is applied via steering wheel 12 and steering shaft 16 to torsion bar 68 and steering gear assembly 26 of steering unit 14.

The output from torsion bar 68 is an error angle θ which represents the deflection angle of torsion bar 68 and is sensed by torque transducer 22. The output signal from torque transducer 22 is the "torque" signal which is sent to signal processing unit 30. The output from signal processing unit 30 is the current "output" signal which is applied to torque motor 34. The output from torque motor 34 is "valve" torque which is applied to the torsionally compliant section 154 of torsion bar 132 which deflects through a valve deflection angle $\theta_v$ which is applied to rotary valve 126 of control valve assembly 36 to selectively control the operational flow characteristics thereof. In particular, the output signal from rotary valve 126 is differential left and right fluid flow which is applied to power cylinder 28. The output signal from power cylinder 28 is the "hydraulically" derived steering force.

The "mechanically" derived steering force of steering gear assembly 26 and the "hydraulically" derived steering force are positively summed (i.e., via summing point 218) to define the "total" steering force. The "total" steering force is applied to tie rod and linkage assemblies 46a and 46b. The "steering" torque is applied to dirigible wheels 44a and 44b. The output from wheels 44a and 44b is "tire" sidewall deflection torque which is a function of the characteristics of tires 220 mounted upon dirigible wheels 44a and 44b. Finally, the output signal from tires 220 is applied to an output terminal 222 which represents actual tire patch rotation associated with tires 220 in response to the initial input torque.

In addition to the above, a minimal form of "negative velocity" feedback is applied to rotary valve assembly 126. As will become apparent in a mathematical analysis to follow, this is due to the interaction between the volumetric flow through power cylinder 28 and the flow conductance characteristics of rotary valve 126. This "feedback" is indicated by a flow line 224 directed from the block representative of tie rod and linkage assemblies 46 to rotary control valve 126.

U.S. Pat. No. 4,452,274 discloses a method of modifying the static response characteristics of rotary valves which is generally difficult and expensive to accomplish when done mechanically via modified valve contours. However, this task can easily be accomplished with the electronically controlled power steering systems of the present invention via suitable non-linear amplification of the torque signal by signal processing unit 30.

Figure 8:
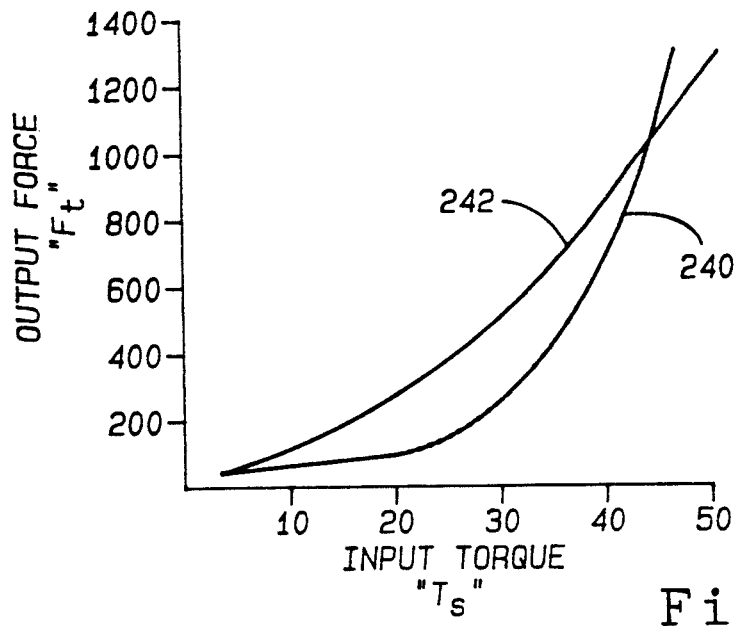
FIG. 8 is a graphical illustration comparing static performance characteristics of the electronically controlled power steering system of FIG. 7 when operated in either a linear or selectively non-linear amplification mode.

For instance, FIG. 8 shows curves 240 and 242 which depict the improved static response characteristics for electronically controlled power steering system 210 having rotary valve 126 with standard (i.e., orifice not modified as depicted in U.S. Pat. No. 4,452,274) orifice configurations. The curves 240 and 242 depict static response characteristics concomitant with linear and an exemplary non-linear amplification of the torque signal, respectively (where the units of force are lbs. and the units of torque are in.lbs.). The exemplary static response characteristic depicted in curve 242 is obtained via non-linear amplification of the "torque" signal according to the formula:

$$G_e = G[1 + 2000 (1.25 \theta_{emax} - \theta_e)^2],$$

where $G_e$ is the non-linear gain, G is nominal gain that is applicable to curve 240, $\theta_{emax}$ is the nominal maximum value for deflection of torsion bar 68, and $\theta_e$ is any particular value of torsion bar deflection. A computer program which is used to generate curves 240 and 242 is described hereinbelow.

Figure 9:
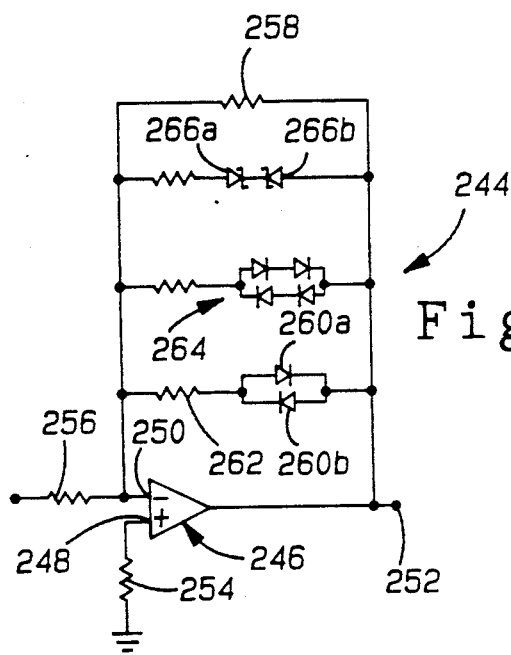
FIG. 9 is a circuit diagram depicting an exemplary non-linear amplifier wherein amplification decreases as a function of the applied signal.

If digital signal processing is performed in signal processing unit 30, an analog to digital conversion of the "torque" signal is performed and the "output" signal is generated therefrom by a microprocessor according to an algorithm embodying the exemplary formula shown above. If, on the other hand, analog signal processing is performed, non-linear analog amplification of the torque signal is preferred. With reference now to FIG. 9, an exemplary technique for producing such non-linear analog amplification is disclosed. In particular, a non-linear amplifier 244 includes an operational amplifier 246 which is operated in an inverting amplifier mode. The primary function of operational amplifier 246 is to keep voltage signals present on its positive and negative input terminals 248 and 250, respectively, at substantially identical values by modulating a "feedback" signal applied from its output terminal 252 via resistor 258 (or other feedback impedance, as will be further explained) to negative input terminal 250. Since positive input terminal 248 is held at ground potential via connection through resistor 254, the negative input terminal 250 is also held at ground potential. Thus, output terminal 252 must have an output signal whose value is equal to the negative of the value of an input signal applied to resistor 256 times the ratio of effective resistance value between input terminal 250 and output terminal 252 divided by the resistance value of resistor 256.

For low valued signals, the effective resistance value between input terminal 250 and output terminal 252 is the resistance value of resistor 258. However, when output signal voltage magnitude of approximately 0.6 volts is reached, one of diodes 260a and 260b conducts electrical current (and therefore is "on") and the effective resistance value between input terminal 250 and output terminal 252 becomes the product of the resistance values of resistors 258 and 262 divided by the sum of the resistance values of resistors 258 and 262. Since, in general, this new resistance value is less than the resistance value of resistor 258 alone, the gain of non-linear amplifier 244 is reduced when its output signal has a voltage of more than 0.6 volts.

This technique can be extended by utilizing a ladder arrangement of resistors in series connection with diode arrays having higher voltage threshold conductance values. This can be accomplished with either a series arrangement of diodes, as shown in diode array 264, or a back-to-back arrangement of zener diodes such as zener diodes 266a and 266b.

Figure 10:
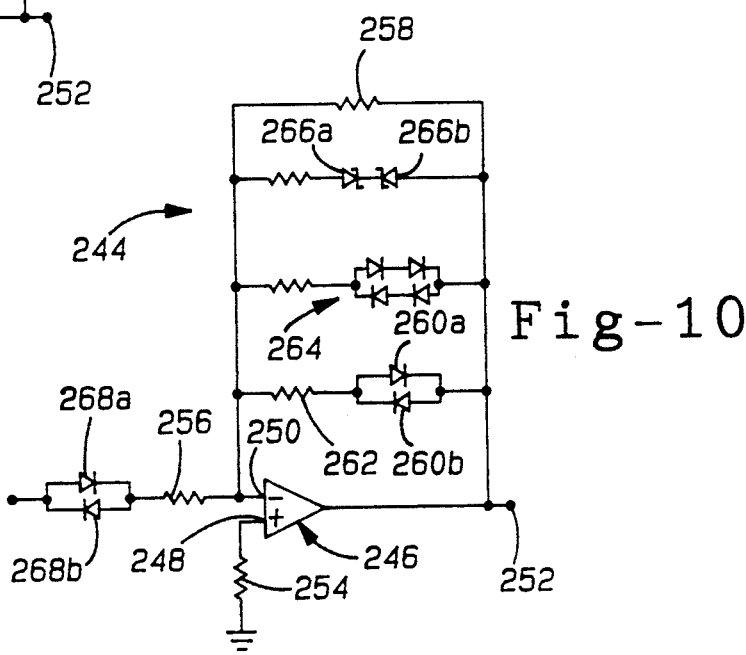
FIG. 10 is a circuit diagram depicting an alternative exemplary non-linear amplifier wherein amplification occurs at selected positive and negative initialization input signal values.

If it is desired to emulate power steering systems wherein control valve assemblies are physically locked together at low values of applied torque so that unassisted manual steering is present only at low values of steering load, an additional diode array such as diodes 268a and 268b is added in series with resistor 256 as shown in FIG. 10. This precludes any input signal from being applied therethrough until that input signal reaches a value having a magnitude of at least about 0.6 volts. Thus, the "output" signal will remain at ground potential, and therefore, no steering assist ("hydraulically derived steering force") will occur for the lower valued input signals.

A technique for effecting a selective signal reduction (i.e., such as the "torque" signal applied to non-linear amplifier 244) is described in U.S. Pat. No. 4,956,590 entitled VEHICULAR POWER STEERING SYSTEM by Edward H. Phillips, issued on Sep. 11, 1990, assigned to the common assignee of the present application and which is incorporated by reference herein. With reference particularly to FIG. 21 of U.S. Pat. No. 4,956,590, a diode bridge switching circuit is disclosed which modulates the signal to be selectively reduced by periodically faulting it to ground potential. This is done at a high cyclic rate wherein the relative zero (faulted) signal times are a function of vehicular speed. This is followed by suitable low pass filtering, all of which accomplishes the desired modulation. The essential elements of that diode switching circuit are reproduced herein in FIG. 11 as diode bridge switching circuit 270.

Figure 11:
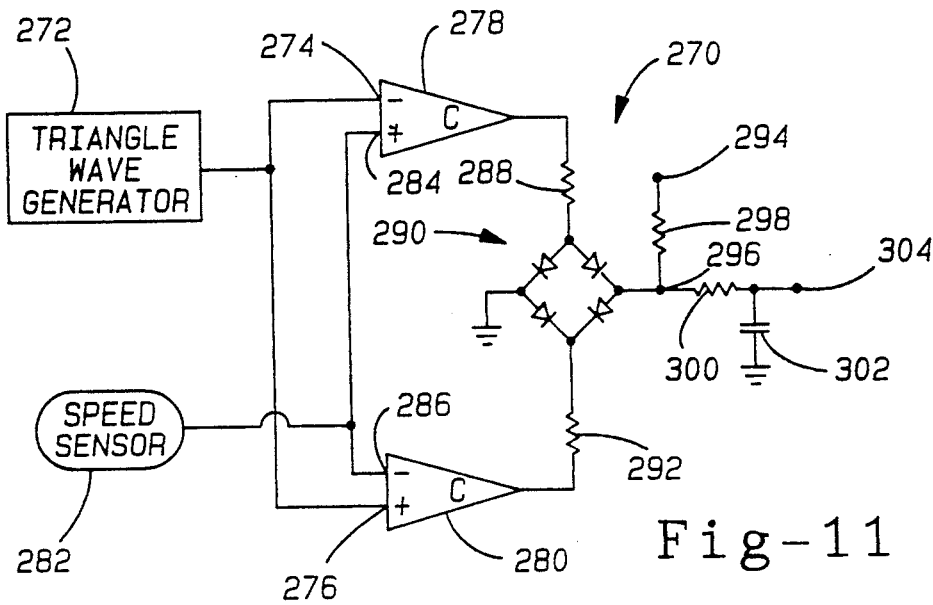
FIG. 11 is a circuit diagram which depicts a diode bridge switching circuit used for implementing "magnitude" derived speed controlled steering.

With reference now to FIG. 11, a triangle wave signal from a triangle wave generator 272 is applied to negative and positive input terminals 274 and 276, respectively, of comparitors 278 and 280, respectively. At the same time, a signal that is representative of vehicular speed (hereinafter "speed signal") from a speed sensor 282 is applied to positive and negative input terminals 284 and 286, respectively, of comparitors 278 and 280, respectively. Whenever the speed signal is more positive than the triangle wave signal, the output signal of comparitor 278 will be positive and the output signal of comparitor 280 will be negative. In this case, current will flow therebetween via resistor 288, diode bridge 290 and resistor 292, thus turning diode bridge 290 "on". If these various signals are inverted in relative value, then current does not flow because diode bridge 290 is reversely biased and is "off".

Meanwhile, the signal to be selectively reduced is applied to terminal 294. When diode bridge 290 is "off", the signal to be selectively reduced is present at junction 296. When diode bridge 290 is "on", the signal to be selectively reduced is faulted to ground via resistor 298 and diode bridge 290, and the voltage potential at junction 296 is substantially ground potential. The triangle wave generator 272 is operated at a frequency that is significantly higher than that of interest with respect to the signal to be selectively reduced (i.e., in the order of 20 kHz or even higher). Thus, it is a simple matter to low pass filter the modulated rectangle wave present at junction 296 with a single pole filter such as that comprising resistor 300 and capacitor 302. Thus, a filtered and modulated output signal which is selectively representative of the product of the signal to be selectively reduced and vehicular speed is presented at output terminal 304. Depending upon the manner in which the various threshold signal levels are manipulated, the modulated output signal can have minimal modulation (i.e., be at full strength) until some desired low vehicular speed (i.e., such as 15 mph) is reached and/or attain a fixed maximal modulation at some designated high vehicular speed (i.e., such as 80 mph).

As will be shown below, it is difficult to design software or analog circuitry which can effectively provide gain compensation (i.e., for use within signal processing unit 30) for enabling stable operation of the electronically controlled power steering system 210. Accordingly, a stabilization method involving the use of "rate" feedback provided by a tachometer system, such as exemplary tachometer 24, is utilized in the second embodiment of the present invention, as described below with reference to FIG. 12. The "rate" feedback is applied via additional circuitry in signal processing unit 30. The "rate" feedback can be thought of as being supplemental to the minimal negative velocity feedback which is applied to rotary valve assembly 126, as described above.

Figure 12:
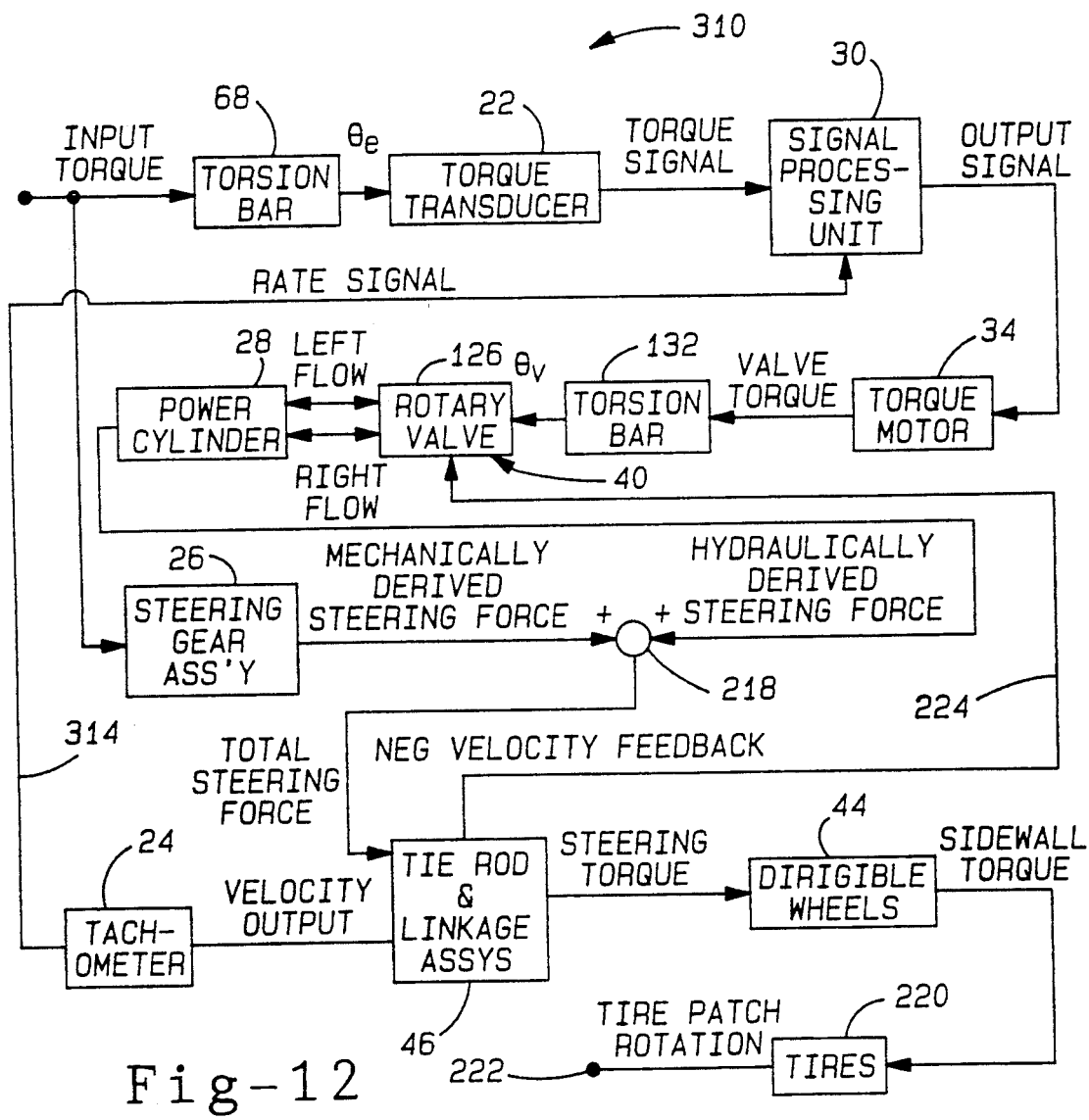
FIG. 12 is a block diagram depicting the operation of an electronically controlled power steering system which incorporates a "rate" feedback function according to the second preferred embodiment of the present invention.

With reference now to FIG. 12, there is shown a block diagram which depicts the interconnection, operation and output of the major components of an electronically controlled power steering system 310 representative of a second embodiment of the present invention. The block diagram includes all of the blocks of FIG. 7 and, in addition, incorporates tachometer 24 for providing "rate" feedback signal derived therefrom. Velocity output which is representative of motion of rack 72 and/or tie rod and linkage assemblies 46a and 46b is applied to tachometer 24. The output signal of tachometer 24 (the "rate" signal) is supplementally applied to signal processing unit 30 via flow line 314 where it is selectively compensated and amplified, and then utilized to selectively suppress the "output" signal that is applied to torque motor 34. In this way, system stability is enhanced because unstable motions of tie rod and linkage assemblies 46a and 46b are sensed (via rack 72, pinion shaft 64 and tachometer 24) and negatively fed back electronically such that the "output" signal applied to torque motor 34 is selectively modified.

Figure 13:
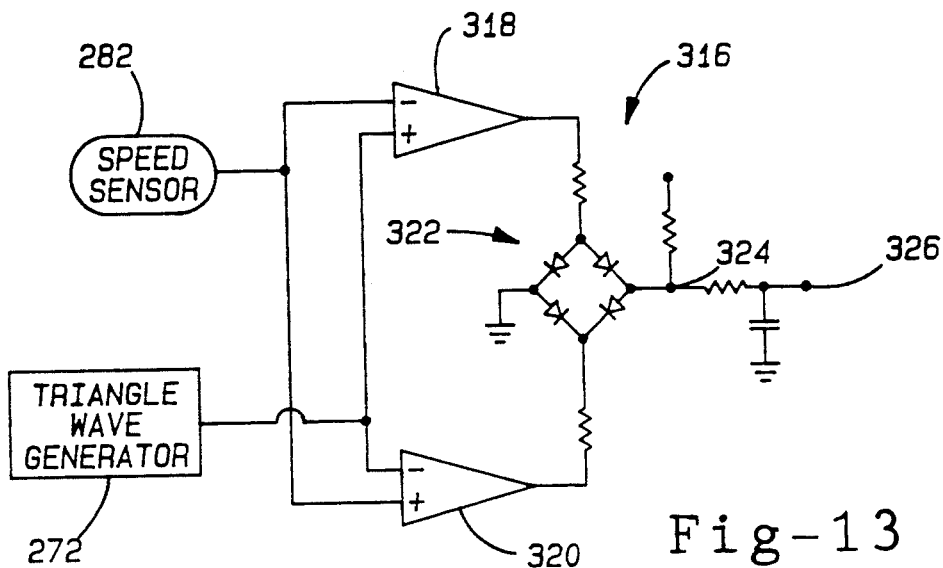
FIG. 13 is a circuit diagram which depicts a diode bridge switching circuit used for implementing "rate" derived speed controlled steering.

"Rate derived-speed sensitive" steering can be implemented in the electronically controlled power steering system 310 by selectively increasing the "rate" signal as a function of vehicular speed. An exemplary method of effecting such a selectively increasing rate signal is depicted in FIG. 13 wherein a diode switching circuit 316 is shown. The diode switching circuit 316 is similar to diode switching circuit 270 (FIG. 11) except that the input signal connections to comparitors 318 and 320, in diode switching circuit 316, are inverted in polarity from the input signal connections to comparitors 278 and 280, respectively, in diode switching circuit 270.

Thus, whenever the speed signal from speed sensor 282 is more positive than the triangle wave signal, the output signal of comparitor 318 will be negative and the output signal of comparitor 320 will be positive. Thus, in this case, diode bridge 322 will be reversely biased and be "off". And, whenever the triangle wave signal is more positive than the speed signal, the output signal of comparitor 318 will be positive and the output signal of comparitor 320 will be negative. Therefore, current will flow through diode bridge 322 which will be "on". This results in maximum modulation of a signal applied to input terminal 324 concomitantly with a small value of the speed signal and a minimal modulation of that signal (i.e., it will be at maximum strength) concomitantly with a large value of the speed signal. If the "rate" signal from tachometer 24 is applied to input terminal 324 then an appropriately modulated rate signal (which increases as a function of vehicular speed) will be present at output terminal 326.

Figure 14:
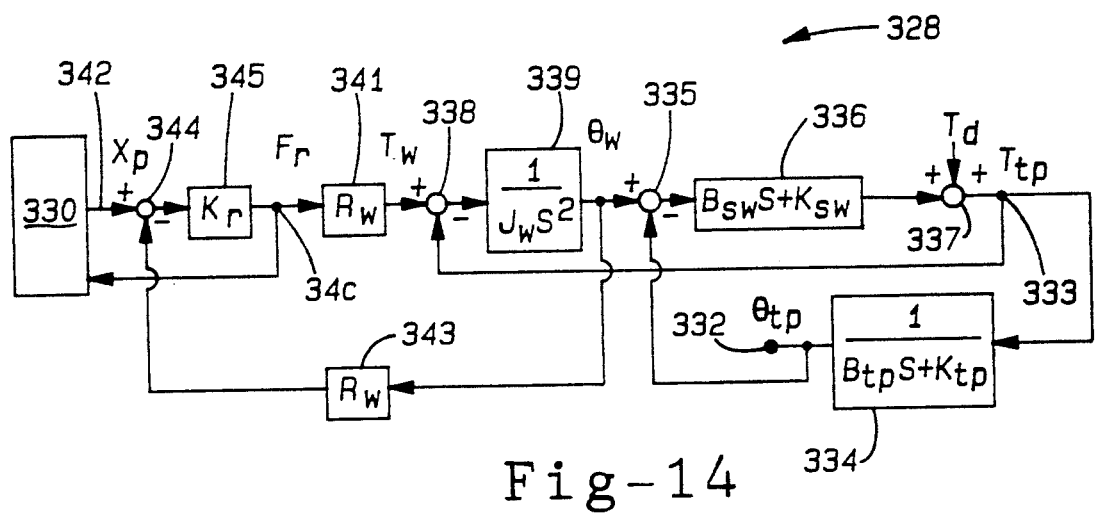
FIG. 14 is a detailed block diagram which depicts the functional characteristics of a host vehicle's structure, wheels, tires and tire patch.
Figure 15:
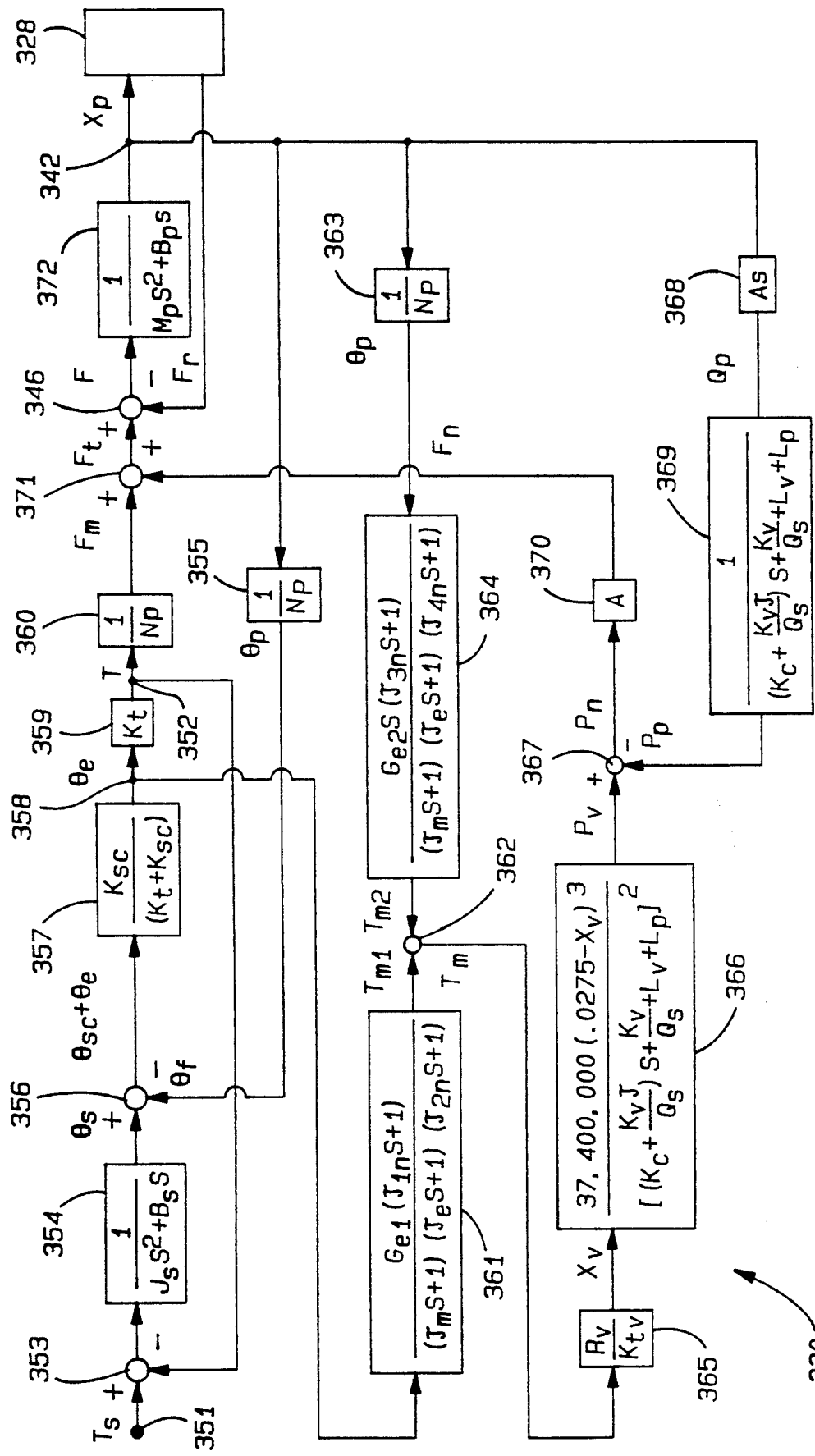
FIG. 15 is a detailed block diagram depicting the function of the control systems associated with either of the first and second preferred embodiments of the present invention.

With reference now to FIG. 14 and 15, there are shown considerably more elaborate block diagrams 328 and 330 which enable detailed mathematical analyses of the first and second electronically controlled power steering systems 210 and 310. Block diagram 328 depicts the operational characteristics of a host vehicle's structure, wheels, tires and tire patch wherein an exemplary set of tire patch characteristics comprise:

$$K_{tp} = 15000e^{-1.5X_p} \text{ and}$$

$$B_{tp} = 250 + 500 X_p + 87.5X_p^2,$$

where $K_{tp}$ is an exemplary torsional stiffness of the interface of the tire patch with a roadway, $X_p$ is piston/rack assembly and tie rod and linkage assembly input motion as measured at rack 72, and $B_{tp}$ is an exemplary torsional damping coefficient derived from the energy loss associated with torsional movement of the tire patch.

The output signal of a steering system as a whole determines the average steering angle achieved at the host vehicle's tire patches, $\theta_{tp}$, which is located in block diagram 328 at output terminal 332. $\theta_{tp}$ is determined by the sum of the torques applied to the tire patches, $T_{tp}$ (located at terminal 333) multiplied by control element $1/(B_{tp}s + K_{tp})$ (where $B_{tp}$ and $K_{tp}$ are the exemplary torsional stiffness and damping coefficient terms defined above and s is the LaPlace variable) shown at block 334. $T_{tp}$ is determined by the difference between average dirigible wheel angle, $\theta_w$, and $\theta_{tp}$ (which difference is achieved via summing point 335), multiplied by the control element (where $B_{sw}s + K_{sw}$) (and where $B_{sw}$ is a torsional damping coefficient derived from energy loss associated with torsional deflection of the tire patch with respect to wheels 44a and 44b and $K_{sw}$ is the torsional stiffness associated with torsional deflection of the tire patch with respect to wheels 44a and 44b) shown at block 336 plus any disturbing torque $T_d$ (as shown at summing point 337). $\theta_w$ is determined by the difference between the sum of the torques applied to wheels 44a and 44b, $T_w$, and $T_{tp}$ (which difference is achieved via summing point 338), multiplied by control element $1/(J_w s^2)$ (where $J_w$ is the moment of inertia of wheels 44a and 44b and the supporting assembly therefor) shown at block 339. $T_w$ is determined by the sum of the forces applied to an effective steering linkage radius $F_r$ (located at terminal 340) multiplied by a control element $R_w$ (where $R_w$ is the effective steering linkage radius) shown at block 341. $F_r$ is determined by the difference between $X_p$ (located at terminal 342) and $\theta_w$ multiplied by another control element $R_w$, shown at block 343 (which difference is achieved via summing point 344), multiplied by control element $K_r$ (where $K_r$ is the overall transverse stiffness of the host vehicle's structure including tie rod linkage assemblies 46a and 46b) shown at block 345.

With reference now to FIG. 15, block diagram 330 provides a detailed depiction of operational characteristics of the control portions of either of the electronically controlled power steering systems 210 or 310, whose principle function is to determine $X_p$. This cannot be done independently from the elements described above with respect to block diagram 328. This is because $F_r$ is fed back from terminal 340 to a position located within block diagram 330 at summing point 346.

Inputs to block diagram 330 are made at input terminal 351 by applying torque, $T_s$, to steering wheel 12. Torque present at input shaft 62 (and shown here at terminal 352), T, is subtracted therefrom (which subtraction is performed by summing point 353). The product of $(T_s - T)$ and control element $1/(J_s s^2 + B_s)$ (where $J_s$ is the moment of inertia of the steering wheel 12 and portions of the steering shaft 16 dynamically linked thereto and $B_s$ is a torsional damping coefficient associated with any energy loss associated with rotational motion of steering shaft 16) shown at block 354 determines steering wheel angle $\theta_s$. The product of $X_p$ and control element $1/N_p$ (wherein $N_p$ is the pitch radius of pinion gear 70) shown at block 355 determines rotational position feedback angle $\theta_f$. The difference between $\theta_s$ and $\theta_f$, which difference is generated by summing point 356, generates the sum of a steering shaft twist angle $\theta_{sc}$ and a system input error angle $\theta_e$. The product of $(\theta_{sc} + \theta_e)$ and control element $K_{sc}/(K_t + K_{sc})$ (where $K_{sc}$ is the torsional stiffness of steering shaft 16 and $K_t$ is the torsional stiffness of torsion bar 68) shown at block 357 generates the system input error angle $\theta_e$ at terminal 358 which comprises a twist angle of torsion bar 68. The product of $\theta_e$ and control element $K_t$ shown at block 359 provides the torque T at terminal 352.

"Mechanically derived" steering force, $F_m$, is provided by the product of T and control element $1/N_p$ shown at block 360. "Hydraulically derived" steering force, $F_h$, is provided via the difference of a product of $\theta_e$ and a first string of control elements and $X_p$ and a second string of control elements as follows: $\theta_e$ is multiplied by control element $G_{e1}(\tau_{1n}s+1)/(\tau_m s+1)(\tau_e s+1)(\tau_{2n}s+1)$ (where $G_{e1}$ is a gain factor comprising the ratio of DC value of torque delivered by torque motor 34 to $\theta_e$ in the absence of any rate signal, $(\tau_{1n}s+1)$ depicts a string of zeros with time constants $\tau_{1n}$ to be selected, $(\tau_m s+1)$ depicts a pole with a torque motor mechanical time constant $\tau_m$, $(\tau_e s+1)$ depicts a pole with a torque motor electrical time constant $\tau_e$ and $(\tau_{2n}s+1)$ depicts a string of poles with time constants $\tau_{2n}$ to be selected) shown at block 361 generates a "torque signal derived" motor torque, $T_{m1}$, which is positively applied to a summing point 362.

As a counterpoint to the "torque signal derived" motor torque in the electronically controlled power steering system 310, a "rate signal derived" motor torque, $T_{m2}$, is negatively applied to the summing point 362 to effect the rate feedback function. The "rate signal derived" motor torque, $T_{m2}$, is obtained as follows: $X_p$ is multiplied by another control element $1/N_p$ shown at block 363 to generate the rotational position of pinion shaft 64, $\theta_p$. $\theta_p$ is multiplied by control element $G_{e2}s(\tau_{3n}s+1)/(\tau_m s+1)(\tau_e s+1)(\tau_{4n}s+1)$ (where $G_{e2}$ is a gain factor comprising the ratio of DC value torque delivered by torque motor 34 to $X_p$ in the absence of any torque signal, $(\tau_{3n}s+1)$ depicts a string of zeros with time constants $\tau_{3n}$ be selected, and $(\tau_{4n}s+1)$ depicts a string of poles with time constants $\tau_{4n}$ to be selected) shown at block 364 generates the rate signal derived motor torque, $T_{m2}$, which is negatively applied to summing point 362. (Note, in the first electronically controlled power steering system 210, $G_{e2}=0.0$.)

The difference between the "torque signal" and "rate signal" derived motor torques, $T_{m1}-T_{m2}=T_m$, obtained from summing point 362 is multiplied by control element $R_v/K_{tv}$ (where $R_v$ is the radius of rotor 130 and $K_{tv}$ is the torsional stiffness of torsionally compliant section 154 of torsion bar 132) shown at block 365 to generate tangential valve motion $X_v$. $X_v$ is multiplied by control element $37{,}400{,}000(0.0275 X_v)^3/[K_c+J_v\tau/Q_s)s+K_v/Q_s+L_v+L_p]^2$ (where $K_c$ is cylinder fluid capacitance determined by the ratio of the volume of power cylinder 28 divided by four times the effective fluid bulk modulus, $K_v=2C_d^2 A_o^2/p$, $C_d$ is valve orifice discharge coefficient, $A_o$ is valve orifice area for any particular value of $\theta_e$, p is mass density of the fluid utilized, $\tau$ is pumping system time constant, $Q_s$ is nominal fluid supply rate, $L_v$ is valve leakage conductance and $L_p$ is cylinder leakage conductance) shown at block 366 to generate valve output pressure, $P_v$, as it would be obtained if the product $X_p s$ was allowed to generate the "rate signal" but not effect flow through power cylinder 28, which is positively applied to summing point 367.

(The particular function utilized in the bock 366 is unique to a rotary valve manufactured by the Ford Motor Co. Generally, however, it is equal to derivative of $K_v$ with respect to $X_v$ divided by the square of the sum of various fluid conductance terms imposed upon the rotary valve assembly 126. More detailed information can be found in a book entitled HYDRAULIC CONTROL SYSTEMS by Herbert E. Merritt and published by John Wiley & Sons, Inc.)

The product of $X_p$ and control element As (where A is the area of the piston in power cylinder 28 and s is the LaPlace complex variable) shown at block 368 determines cylinder flow rate $Q_p$. The product of $Q_p$ and control element $1/(K_c+K_v\tau/Q_s)s+K_v/Q_s+L_v+L_p)$ shown at block 369 determines piston pressure, $P_p$, as it would be obtained if $X_v$ had a zero value (i.e., no torque applied by torque motor 34) but the selective value of $K_v$ was maintained and $P_p$ is negatively applied to summing point 367. Output hydraulic pressure, $P_h=P_v-P_p$ is obtained from summing point 367 and the product of $P_h$ and control element A shown at block 370 generates "hydraulically derived" steering force $F_h$. $F_h$ is summed with $F_m$ at summing point 371 to generate "total" steering force $F_t$. $F_r$ is subtracted from $F_t$ at summing point 346 to generate "net" steering force F. An finally, F multiplied by control element $1/(M_p s^2+B_p s)$ (where $M_p$ is the mass associated dynamically with rack 72 and $B_p$ is a damping coefficient associated with energy loss concomitant with non-zero values of $X_p s$) shown at block 372 generates $X_p$.

Figure 16:
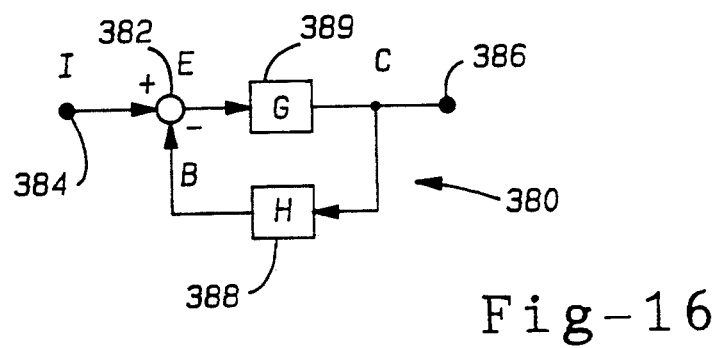
FIG. 16 is a "canonical form" of feedback control system to which the combined block diagrams of FIGS. 14 and 15 can be reduced via computations of forward and feedback transfer functions.

With reference now to FIG. 16, there is shown a "canonical form" block diagram 380. The combined block diagrams 318 and 330 can be reduced to this format via computation of suitable forward and feedback transfer functions. In block diagram 380 an input signal, I, is positively applied to a summing point 382 via an input terminal 384. Closed-loop response of block diagram 380 yields an output signal, C, at output terminal 386. C multiplied by control element H shown at block 388 generates a feedback signal, B, which is negatively applied to summing point 382. B is subtracted from I at summing point 382 to generate an error signal, E. Finally, E multiplied by control element G shown at block 389 generates output signal C.

It is desirable for either of power steering systems 210 or 310, as represented by block diagram 380, to operate in a stable manner. This will occur if the absolute value of an open-loop transfer function comprising the product GH goes through the value 1 with the absolute value of its argument less than 180°. If this is true then any disturbing signal input to the system will be damped out and the system's operation will be stable.

Two forms of open-loop transfer function can be defined with respect to block diagram 380. A first open-loop transfer function, GH, relates input motion $X_p$ to input torque $T_s$. A second open-loop transfer function, GoHo, relates input motion $X_p$ to steering wheel angle $\theta_s$. It is of interest to plot these functions with respect to frequency and phase angle in order to judge system stability. Because low frequency values differ widely between these two functions, it is of interest to plot real and imaginary parts of ratios of tire patch rotation $\theta_{tp}$ to input torque $T_s$, and tire patch rotation $\theta_{tp}$ to steering wheel angle $\theta_s$, respectively. (In the case of $T_s$ it is also helpful to multiply by a normalizing function such as a control element $Q_9=J_s s^2+B_s s$.)

Figure 17:
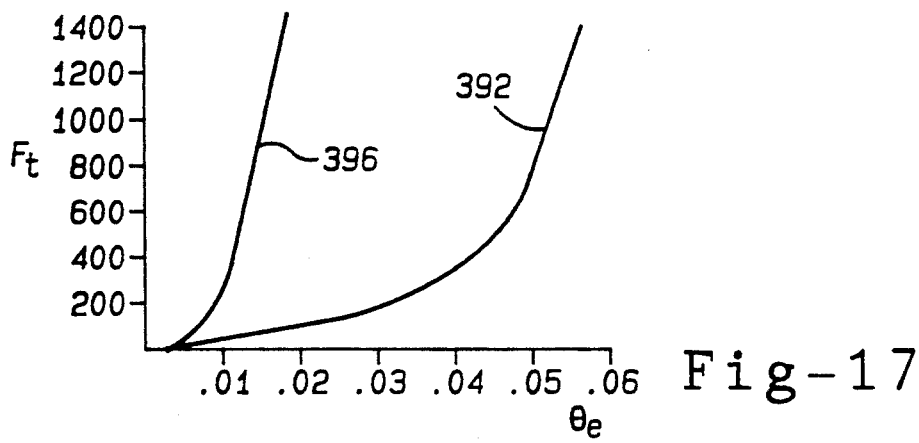
FIG. 17 is a graphical illustration comparing output force as functions of error angle for both of the first and second preferred embodiments of the present invention to that of a standard rotary valve equipped power steering system.

Detailed analysis and plotting of these functions (and others to be described hereinbelow) is greatly aided by utilizing computer analysis techniques. Such analysis has been performed with an analysis program entitled METHMATICA (available from Wolfram Research, Inc., of Champaign, Ill.). Shown below are first and second programs for plotting various performance curves for an electronically controlled power steering system utilizing a rotary valve. The first and second programs utilize typical values for the various terms defined above. In these programs, lower case letter and no subscripts are used. Thus, js is understood to represent $J_s$ and so on. The first program is used to plot output (steering) force ft ($F_t$) as functions of thetae ($\theta_e$), thetav ($\theta_v$) and ts ($T_s$) as shown in FIGS. 8 and 17. The first program is as follows:

| | |
|---|---|
| kt = | 2500.0; |
| np = | 0.333333; |
| rv = | 0.4; |
| qs = | 8.0; |
| a = | 1.0; |
| thetaemax = | 0.02; |
| tsmax = | kt thetaemax; |
| fm[thetae_]: = | kt thetae/np; |
| lv = | 0.004; |
| lp = | 0.0001; |
| ktv = | 270.0; |
| gel[thetae_]: = | (* 1000 *)750 + 1500000(0.025 − thetae)^2; |
| xv[thetae_]: = | gel[thetae] rv thetae/ktv; |
| thetav[thetae_]: = | xv[thetae]/rv; |
| kv[thetae_]: = | 9346000.0 (0.0275 − xv[thetae])^4; |
| lt = | lv + lp; |
| qss[thetae_]: = | ((kv[thetae]^2 + 4 qs kv[thetae] lt) ^0.5 − kv[thetae])/(2 lt); |
| fh[thetae_]: = | 0.107 10 ^ − 6 qss[thetae]^2 a/ (0.0275 − xv[thetae])^4; |
| ft[thetae_]: = | fm[thetae] + fh[thetae]; |
| ts[thetae_]: = | kt thetae; | where (* 1000 *) indicates the alternate constant value for gel:

As described hereinbefore, the curves 240 and 242 of FIG. 8 depict output force $F_t$ as a function of input torque $T_s$ for gel[thetae_]: = 1000 (i.e., a constant value) and 750+1500000 (0.025−thetae)^2, respectively. It can be seen that curve 242 compares favorably with curve 240 according to the teachings discussed hereinbefore. In addition, FIG. 17 illustrates curves 390 and 392 which depict output force $F_t$ as function of $\theta_e$ with the variable range of values for gel and $\theta_v$ and with the value of gel set at 1000, respectively. By plotting curves 390 and 392 in this manner, steering unit deflection for either of the electronically controlled power steering systems 210 or 310 can be compared to the steering unit deflection of a standard rotary valve equipped power steering system. It can be seen that the angular deflection indicated by curve 390 is markedly less than that indicated by curve 392 which simulates the static performance of conventional rotary valves.

The second program is used to plot dynamic system performance for a particular chosen value of thetae ($\theta_e$). It is defined as follows:

| | |
|---|---|
| thetae = | 0.0125; |
| js = | 0.32; |
| bs = | 0.0; |
| ksc = | 3200.0; |
| kt = | 2500.0; |
| gel = | (* 375.0 + 750000 (0.025 − thetae)^2 *) 750.0 + 1500000 (0.025 − thetae)^2; |
| ktv = | 320.0; |
| k3 = | ksc/(ksc + kt); |
| np = | 0.333333; |
| a = | 1.0; |
| rv = | 0.4; |
| xv = | gel rv thetae/ktv; |
| kv = | 9346000.0 (0.0275 − xv)^4; |
| ts = | kt thetae; |
| fm = | kt thetae/np; |
| qs = | 8.0; |
| lv = | 0.004; |
| lp = | 0.00001; |
| lt = | lv + lp; |
| qss = | ((kv^2 + 4 qs kv lt)^0.5 − kv)/(2 lt); |
| fh = | 0.107 10 ^ − 6 qss^2 a/(0.0275 − xv)^4; |
| ft = | fm + fh; |
| xp = | −Log[1 − ft/400]/1.5; |
| ktp = | 1.0 ((15000.0 E^(−1.5 xp)); |
| btp = | 1.0 (250 + 500 xp + 87.5 xp^2); |
| ksw = | 1.0 (25000.0); |
| bsw = | 1.0 (100.0); |
| jw = | 6.25; |
| rw = | 5.0; |
| kr = | 4000.0; |
| mp = | 0.025; |
| bp = | 2.0; |
| q1[s_]: = | bsw s + ksw; |
| q2[s_]: = | (btp + bsw)s + ktp + ksw; |
| q3[s_]: = | jw s^2 + q1[s] − q1[s]^2/q2[s] + kr rw^2; |
| q4[s_]: = | mp s^2 + bp s + kr; |
| tau = | 0.05; |
| kc = | 0.000025; |
| pi = | N[Pi,10]; |
| ge2 = | (* 0.0 *)10.0; |
| tau11 = | 0.015; |
| tau12 = | 0.0025; |
| tau13 = | 0.02; |
| tau14 = | (* 0.0 *)0.05; |
| taum = | 0.015; |
| taue = | 0.0025; |
| tau21 = | (* 0.01 *)0.004; |
| tau22 = | (* 0.005 *)0.1; |
| tau31 = | 0.015; |
| tau32 = | 0.0025; |
| tau33 = | (* 0.0 *)10.0; |
| tau34 = | 0.05; |
| tau35 = | 0.0125; |
| tau41 = | (* 0.0 *)100.0; |
| q01[s_]: = | (gel (tau11 s + 1) (tau12 s + 1) (tau13 s + 1) (tau14 s + 1))/ ((taum s + 1) (taue s + 1) (tau21 s + 1) (tau22 s + 1)); |
| q02[s_]: = | (ge2 s (tau31 s + 1) (tau32 s + 1) (tau33 s + 1) (tau34 s + 1) (tau35 s + 1))/(np (taum s + 1) (taue s + 1) (tau41 s + 1)); |
| q7[s_]: = | (kc + kv tau/qs) s + kv/qs + lv + lp); |
| q8[s_]: = | js s^2 + bs s + k3 kt; |
| q9[s_]: = | js s^2 + bs s; |
| q16[s_]: = | (37384000 (.0275 − xv)^3)/q7[s]^2; |
| go[s_]: = | Block[{myq01,myq02,myq3,myq4,myq7,myq16}, myq01 = q01[s]; myq02 = q02[s]; myq3 = q3[s]; myq4 = q4[s]; myq7 = q7[s]; myq16 = q16[s]; N[(k3 kt/np + k3 myq01 rv myq16 a/ktv)/ (myq4 − (kr rw)^2/myq3 + a^2 s/myq7 + (myq02 rv myq16 a)/ktv), 10]]; |
| ho = | N[1/np, 10]; |
| g[s_]: = | Block[{myq01,myq02,myq3,myq4,myq7,myq8, myq16}, myq01 = q01[s]; myq02 = q02[s]; myq3 = q3[s]; myq4 = q4[s]; myq7 = q7[s]; myq8 = q8[s]; myq16 = q16[s]; N[(k3 kt/np + k3 myq01 rv myq16 a/ktv)/ (myq8 (myq4 − (kr rw)^2/myq3 + a^2 s/myq7 + (myq02 rv myq16 a)/ktv)), 10]]; |
| h[s]: = | N[q9[s]/np, 10]; | where (*_*) indicates values utilized for the electronically controlled power steering system 210.

Shown in FIGS. 18A–J are plots depicting Log[Abs[GH]] as a function of Log[$\omega$]; Log[Abs[GH]] as a function of Arg[GH]; Re[$\theta_{tp}Q9/T_s$] and Im[$\theta_{tp}Q9/T_s$] as a function of frequency; Log[Abs[GoHo]] as a function of Log[$\omega$]; Log[Abs[GoHo]] as a function of Arg[GoHo]; and Re[$\theta_{tp}/\theta_s$], Im[$\theta_{tp}/\theta_s$], $R_s$ and $X_s$, as a function of frequency (where $R_s$ and $X_s$ are real and imaginary parts, respectively, of a steering wheel input impedance function determined by $T_s/s\theta_s$), for the electronically controlled power steering system 210. Shown in FIGS. 19A-J are an identical series of plots for electronically controlled power steering system 310.

Again, the difference between electronically controlled power steering systems 210 and 310 is that the electronically controlled power steering system 210 has no rate stabilization (i.e., it has a zero value for $G_{e2}$). This makes stabilization compensation quite difficult to implement. This can be seen from persistent peaks 400 and 401 of curves 402 and 403, respectively, shown in FIGS. 18A and 18E, respectively. Final gain crossover occurs at a value for Log[$\omega$] of about 2.85, or a frequency of about 115 Hz. Furthermore, unity gain crossover phase angles are relatively close to $-180$ degrees as shown at unity gain crossover points 404 and 405 of curves 406 and 407, respectively, shown in FIGS. 18B and 18F, respectively. With particular reference to the significantly smaller equivalent peaks 410 and 411 of curves 412 and 413, respectively, shown in FIGS. 19A and 19E, respectively, it can be seen that utilization of rate stabilization effectively negates this problem. In this case, final gain crossover occurs at a value for Log[$\omega$] of less than 2.1 or a frequency of about 18 Hz. Furthermore, unity gain crossover phase angles are now significantly more favorable (at about $-130$ degrees) as shown at unity gain crossover points 414 and 415 of curves 416 and 417, respectively, shown in FIGS. 19B and 19F, respectively.

Figure 19A:
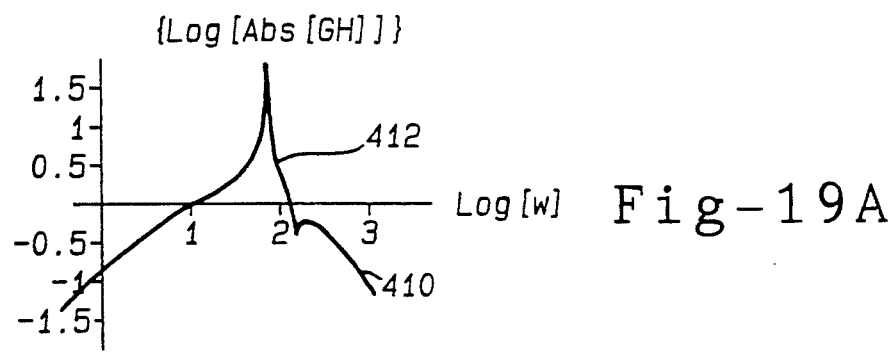
FIGS. 19 A-J are graphs depicting the dynamic performance of an electronically controlled power steering system constructed according to the second preferred embodiment of the present invention.
Figure 19B:
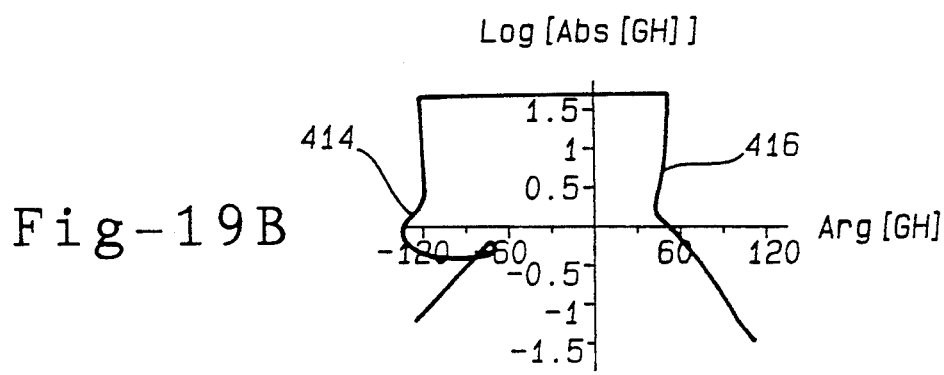
Figure 19C:
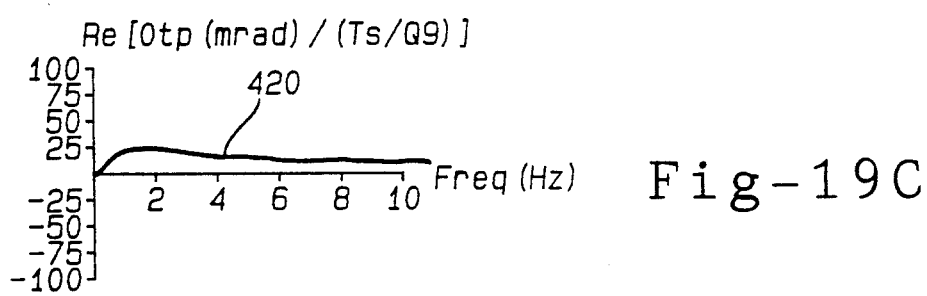
Figure 19D:
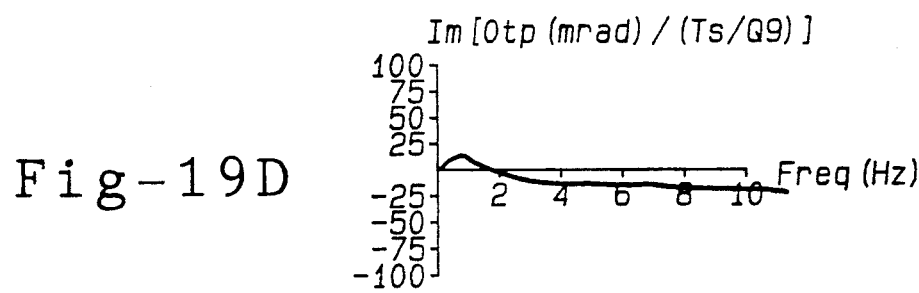
Figure 19E:
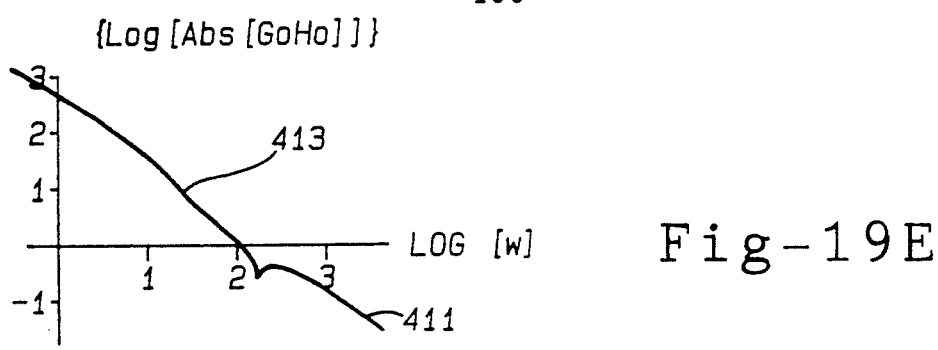
Figure 19F:
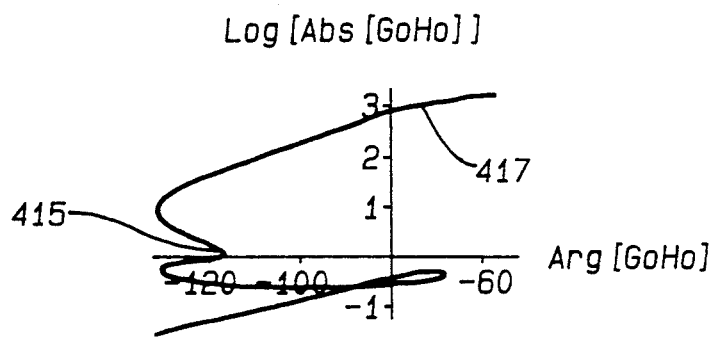
Figure 19G:
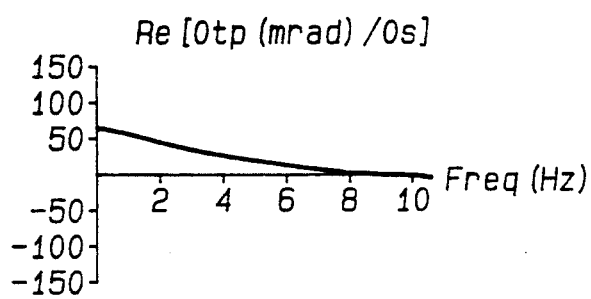
Figure 19H:
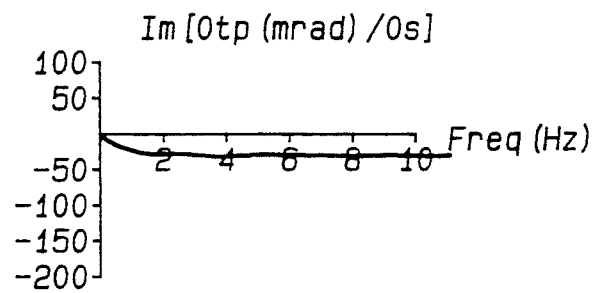
Figure 19I:
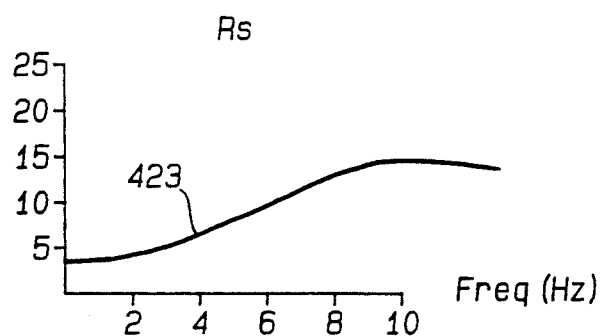
Figure 19J:
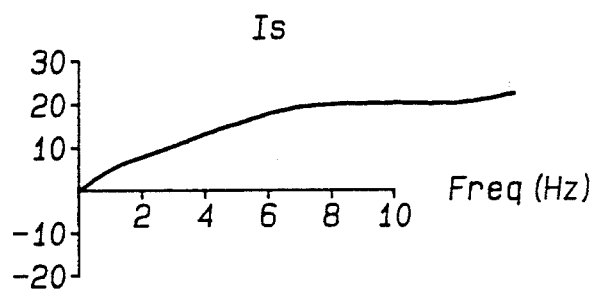

The tactile sensitivity ("nervousness") of electronically controlled power steering system 310 is considerably less than that of electronically controlled power steering system 210. This can be seen via a considerably lower range of $\theta_{tp}$ values (at a frequency of around 1 Hz) for curve 420 of FIG. 19C compared to curve 421 shown in FIG. 18C. The improvement can also be seen as an increase in $R_s$ from negligible values depicted by curve 422 in FIG. 18I to the meaningful values depicted by curve 423 in FIG. 19I. (For instance, $R_s = 3$ in.lbs.-sec. means that any given rotational input to steering wheel 12 will require an additional 3 in.lbs. per radian/sec. steering wheel rotational velocity.) "Rate derived-speed sensitive" steering is thereby shown to be produced by the rate stabilization.

Figure 20:
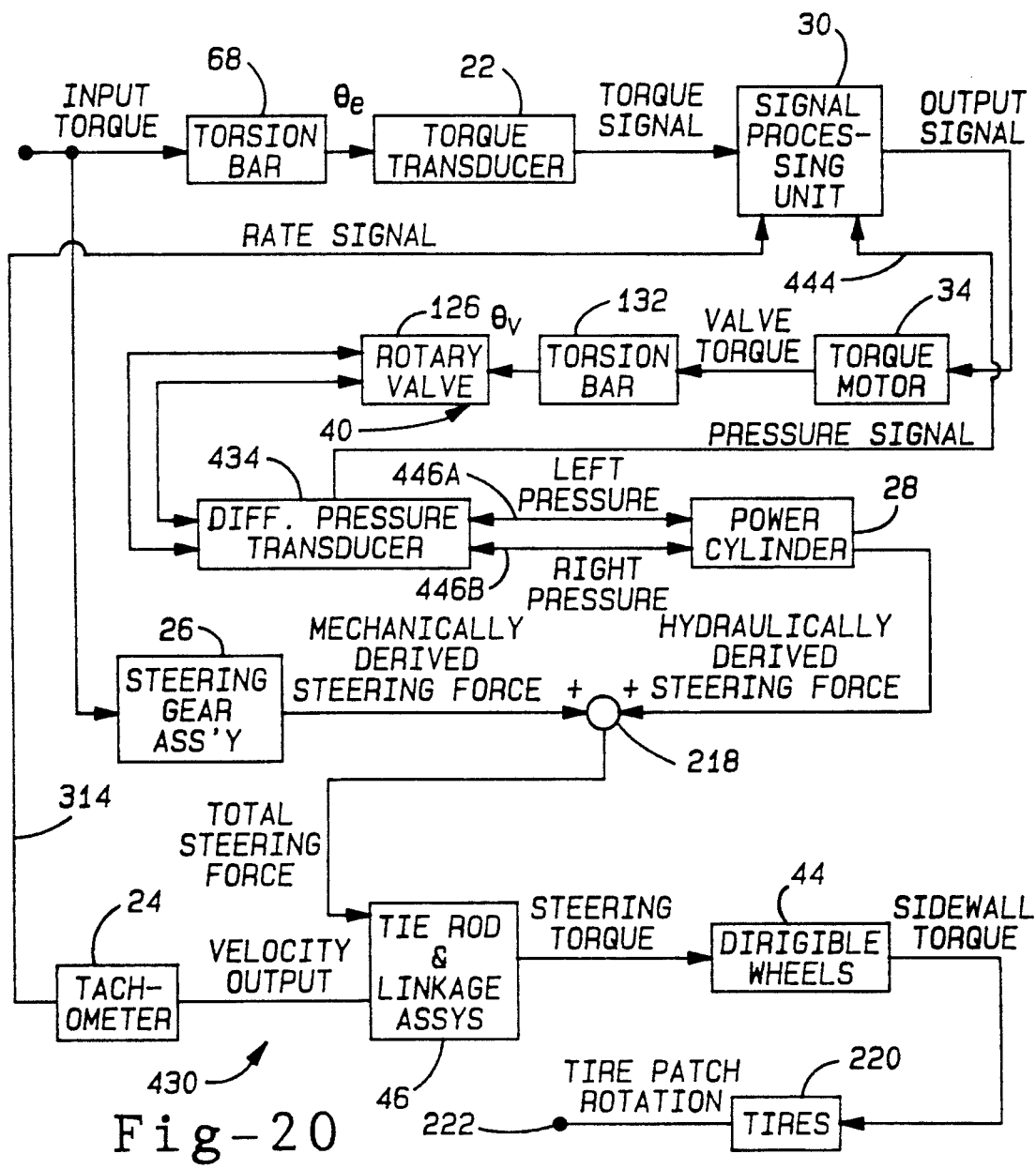
FIG. 20 is a block diagram depicting the operation of an electronically controlled power steering system which includes a fluid pressure feedback circuit according to the third preferred embodiment of the present invention.
Figure 18A:
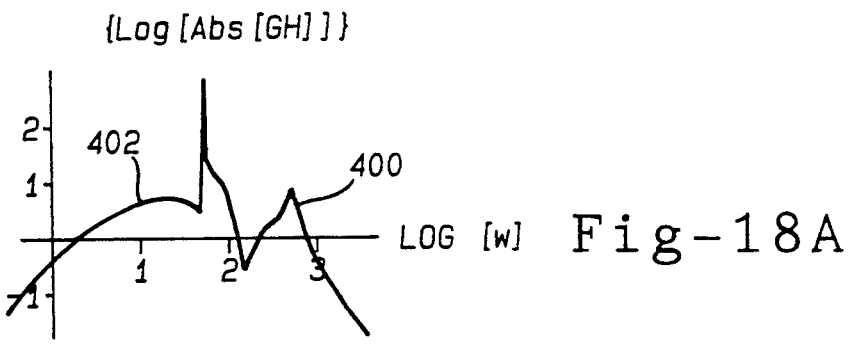
FIGS. 18 A-J are graphs depicting the dynamic performance of an electronically controlled power steering system constructed according to the first preferred embodiment of the present invention.
Figure 18B:
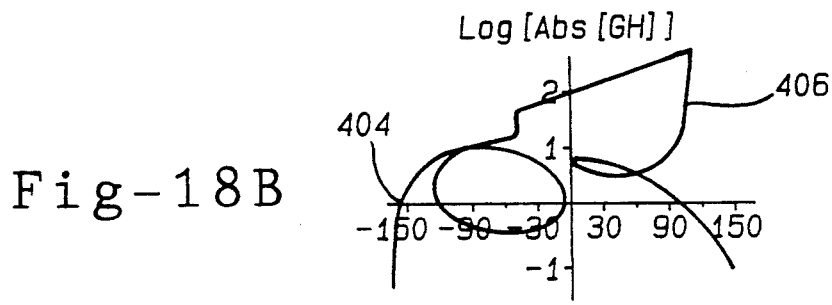
Figure 18C:
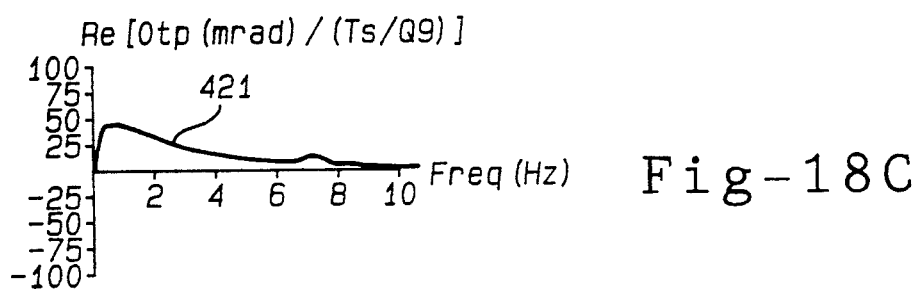
Figure 18D:
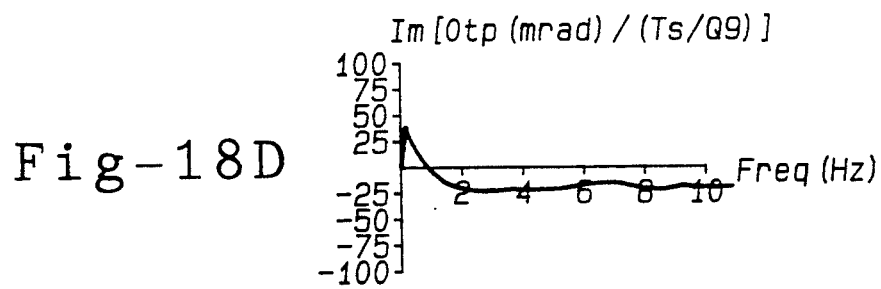
Figure 18E:
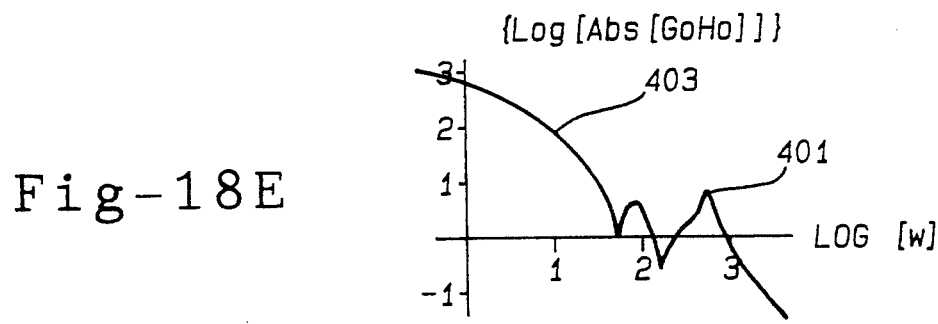
Figure 18F:
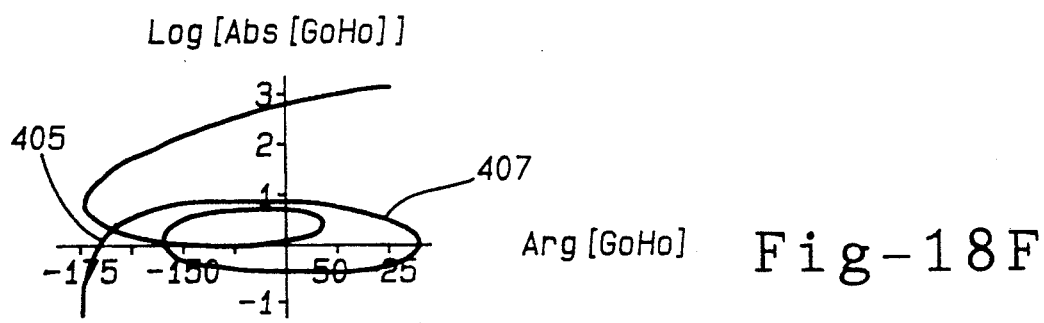
Figure 18G:
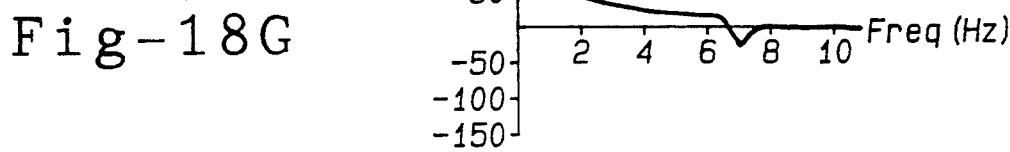
Figure 18H:
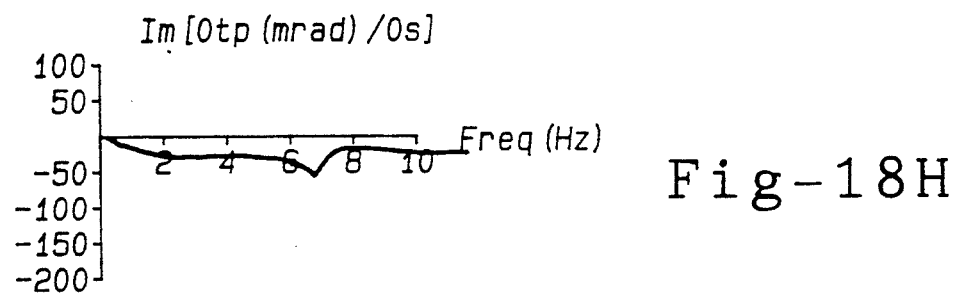
Figure 18I:
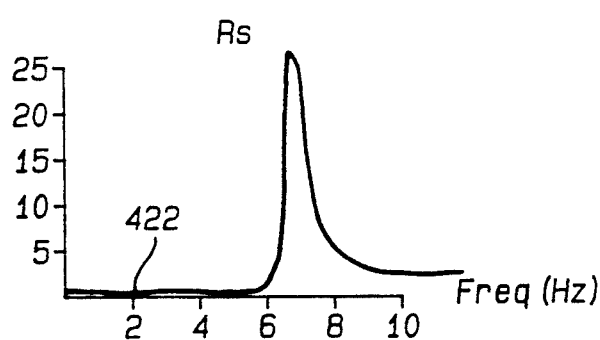
Figure 18J:
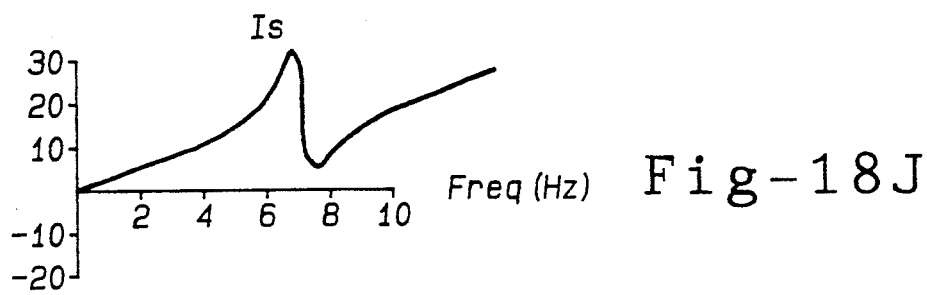

With reference now to FIG. 20, there is shown a block diagram which depicts the operation of the major components associated with an electronically controlled power steering system 430 that is configured according to the third embodiment of the present invention. The block diagram is identical to FIG. 12 with the addition of a differential pressure measuring transducer 434 which is utilized to measure the differential output pressure of rotary valve assembly 126 and the deletion of flow line 224.

In electronically controlled power steering system 430, "differential output pressure" signals from differential pressure measuring transducer 434 are fed back into signal processing unit 30 where they are compared with a signal that is selectively generated from the "torque" signal to generate an error signal. The "error" signal is amplified such that the "output" signal from signal processing unit 30 becomes a corrective signal which activates torque motor 34 to continuously modulate torque inputs to torsion bar 132 of rotary valve assembly 126 such that the "error" signal is always minimized. Thus, the "differential output pressure" signal is derived from the "torque" and "rate" signals in a selected manner and electronically controlled power steering system 430 is, in effect, a "reaction" power steering system.

The signal representing the differential pressure output from pressure transducer 434 is applied to signal processing unit 30 via flow line 444. Further, input hydraulic signals applied to power cylinder 28 from transducer 434 via flow lines 446a and 446b define left and right pressures, respectively. Because they are now pressures instead of flows, the minimal negative velocity feedback due to interaction between volumetric flow through power cylinder 28 and flow conductance characteristics of rotary valve assembly 126 is substantially non-existent. For this reason, flow line 224 (FIG. 12) is eliminated from block diagram 431.

An exemplary differential pressure transducer assembly 434 is shown in FIG. 21. The pressure transducer assembly 434 comprises left and right pressure transducers 436a and 436b, respectively, which measure left and right port pressures, respectively, present in left and right ports 184a and 184b, respectively, of rotary valve assembly 126 (FIG. 5). Exemplary pressure transducers adaptable for use as left and right pressure transducers 436a and 436b are solid state semiconductor devices such as pressure sensor Model MPX700D available from Motorola Inc., Phoenix, Ariz.

Currently however, only lower pressure versions of such pressure transducers are available. For this reason, a small amount of fluid is continuously conducted through a first set of orifices 438a and 438b to left and right chambers 442a and 442b, respectively. The fluid is then conducted through a second set of orifices 440a and 440b to return port 160. Left and right pressure transducers 436a and 436b, respectively, are used to measure left and right intermediate pressures, respectively, present in left and right chambers 442a and 442b, respectively. Because orifices 438a, 438b, 440a and 440b are square law devices, either of the left and right port pressures are related to the respective measured pressures by the formula:

$$P = [A_{438}^2 + A_{440}^2]/A_{438}^2]P_{442}$$

where P is either of the left or right pressures, $A_{438}$ is the effective orifice area of either of the orifices 438a and 438b, $A_{440}$ is the effective orifice area of the respective orifice 440a or 440b and $P_{442}$ is the respective measured pressure.

The fact that the hydraulic signals present in flow lines 446a and 446b are pressure signals simplifies system analysis as well. FIG. 22 is a detailed block diagram 450 which depicts the operational characteristics of electronically controlled power steering system 430. Terminal 351, junctions 352 and 358, summing points 353 and 356, and blocks 354, 355, 357, 359 and 360 all function in exactly the same manner as explained above with reference to block diagram 330 for generating the system input error angle $\theta_e$ at junction 358 and the mechanically derived steering force $F_m$ at summing point 371.

Hydraulically derived steering force, $F_h$, is provided via the difference of a product of $\theta_e$ and a first string of control elements, and $X_p$ and a second string of control elements as follows: $\theta_e$ is multiplied by control element $G_{e3}(\tau_{5n}s+1)/(\tau_m s+1)$ $(\tau_e s+1)(\tau_t s+1)(\tau s+1)(\tau_{6n} s+1)$ (where $G_{e3}$ is a gain factor comprising the ratio of DC value of differential pressure delivered by rotary valve assembly 126 to $\theta_e$ in the absence of any rate signal; $(\tau_{5n} s+1)$ depicts a string of zeros with time constants $\tau_{5n}$ to be selected; $(\tau_{6n} s+1)$ depicts a string of zeros with time constants $\tau_{6n}$ to be selected; $(\tau_t s+1)$ depicts a pole with pressure transducer time constant $\tau_t$; and the other elements retain their prior representations) shown at block 451 generates a differential pressure, $P_{to}$, that is derived from the "torque" signal and is positively applied to a summing point 452.

In counterpoint to the "torque signal derived" differential pressure $P_{to}$, a "rate signal derived" differential pressure $P_{ra}$ is negatively applied to summing point 452 to effect the rate feedback function. The rate signal derived differential pressure is obtained as follows: $X_p$ is multiplied by control element $1/N_p$ shown at block 363 to generate the rotational position of pinion shaft 64, $\theta_p$. $\theta_p$ is multiplied by control element $G_{e4}s(\tau_{7n}s+1)/(\tau_m s+1)(\tau_e s+1)(\tau_t s+1)(\tau s+1)(\tau_{8n}s+1)$ (where $G_{e4}$ is a gain factor comprising the ratio of DC value of differential pressure delivered by rotary valve assembly 126 to $X_p$ in the absence of any torque signal; $(\tau_{7n}s+1)$ depicts a string of zeros with time constants $\tau_{7n}$ to be selected; and $(\tau_{8n}s+1)$ depicts a string of zeros with time constants $\tau_{8n}$ to be selected) at block 453 to generate a differential pressure $P_{ra}$, that is derived from the "rate" signal and is negatively applied to a summing point 452.

"Output" hydraulic pressure, $P_h = P_{to} - P_{ra}$, is obtained from the summing point 452, and as before, the product of $P_h$ and control element A shown at block 370 generates hydraulically derived steering force $F_h$. $F_h$ is summed with mechanically derived steering force $F_m$ at summing point 371 to generate total steering force $F_t$. $F_r$ is subtracted from $F_t$ at summing point 346 to generate "net" steering force F. And finally, F is multiplied by control element $1/(M_p s^2 + B_p s)$ shown at block 372 to generate $X_p$.

Figure 23:
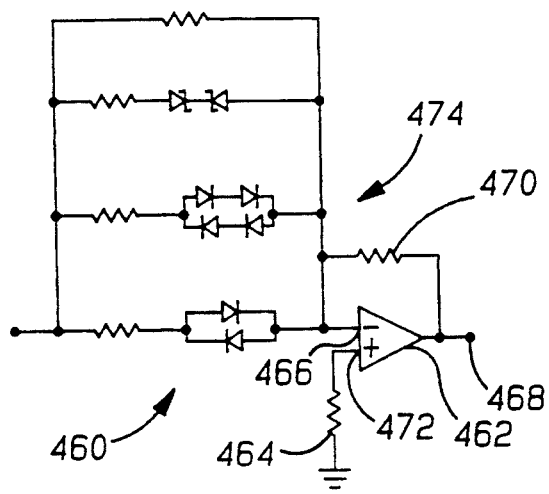
FIG. 23 is a circuit diagram depicting an exemplary nonlinear amplifier wherein amplification increases as a function of the applied signal.

Also as mentioned previously, it is desirable for electronically controlled power steering system 430 to have a selected non-linear static performance characteristic similar to that depicted by curve 242 of FIG. 8. Since the torque signal linearly represents torque applied to steering wheel 12, it is evident that $G_{e3}$ should increase in value concomitantly with increasing values of the torque signal. If this task is accomplished via software, then a microprocessor in signal processing unit 30 is suitably programmed. On the other hand, a circuit diagram depicting an exemplary non-linear amplifier 460 is shown in FIG. 23 wherein amplification increases as a function of applied signal.

The non-linear amplifier 460 comprises an operational amplifier 462 which is operated in an inverting amplifier mode. As with operational amplifier 246, voltage signals present on its positive and negative input terminals 464 and 466, respectively, are kept at substantially identical values by modulating a feedback signal applied from its output terminal 468 via feedback resistor 470 to negative input terminal 466. Since positive input terminal 464 is held at ground potential via connection through resistor 472, negative input terminal 466 is held at ground potential also. Thus, output terminal 468 must have an output signal whose value is equal to the negative of the value of an input signal applied to resistor and diode network 474 times the ratio of the resistance value of feedback resistor 470 divided by the resistance value of the resistor and diode network 474. Since the resistance value of the resistor and diode network 474 decreases as a function of increasing values of the input signal, the amplification of non-linear amplifier 460 increases as a function of increasing values of the input signal.

Shown below are third and fourth computer programs (which also utilize MATHEMATICA) for plotting output force $F_t$ and dynamic system performance, respectively. The third program utilizes values of $G_{e3}$ determined according to:

$$G_{e3} = 2,500 + 2,000,000\, \theta_e + 100,000,000\, \theta_e^2$$

and is defined as follows:

| | |
|---|---|
| kt = | 2500.0; |
| np = | 0.333333; |
| a = | 1.0; |
| thetaemax = | 0.02; |
| tsmax = | kt thetaemax; |
| fm[thetae__]: = | kt thetae/np; |
| ge3[thetae__]: = | 2500.0 + 2000000 thetae + 100000000 thetae ^2; |
| fh[thetae__]: = | ge3[thetae] thetae a; |
| ft[thetae__]: = | fm[thetae] + fh [thetae]; |
| fs[thetae__]: = | kt thetae; |

Figure 24:
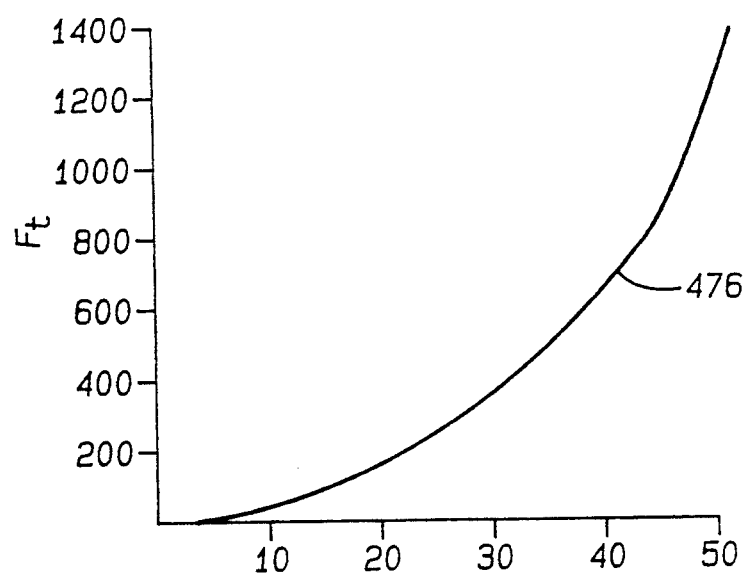
FIG. 24 is a graphical illustration depicting the static performance characteristics of an electronically controlled power steering system constructed according to the third preferred embodiment of the present invention.
Figure 25A:
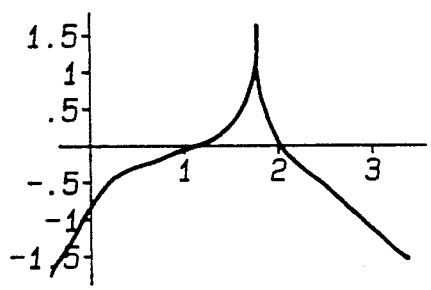
FIGS. 25 A-J are graphical illustrations depicting the dynamic performance of an electronically controlled power steering system constructed according to the third preferred embodiment of the present invention.
Figure 25B:
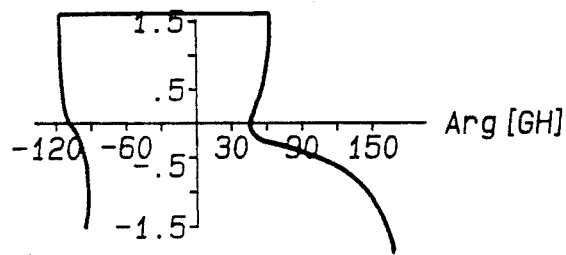
Figure 25C:
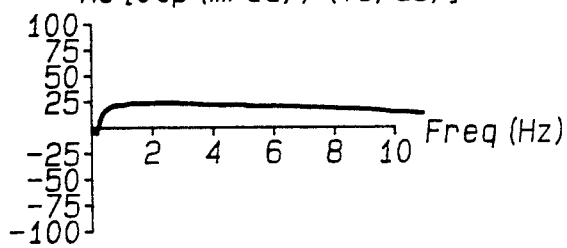
Figure 25D:
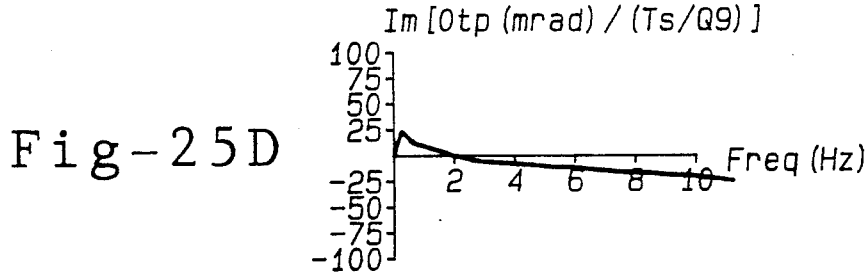
Figure 25E:
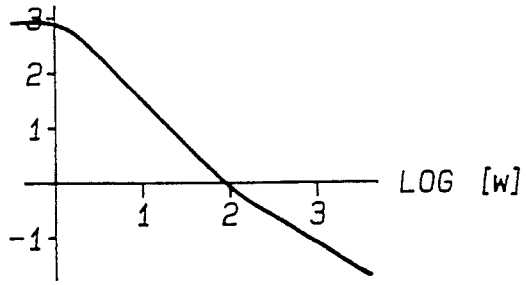

Shown in FIG. 24 is a graph wherein a curve 476 depicts the static performance characteristics (output force $F_t$ vs input torque $T_s$) of electronically controlled power steering system 430 which uses the above described values for $G_{e3}$. As desired, curve 476 is very similar to curve 242 shown in FIG. 8.

The fourth program is used to plot dynamic system performance for a particular chosen value of thetae ($\theta_e$). It is defined as follows:

| | |
|---|---|
| thetae = | 0.009; |
| js = | 0.32; |
| bs = | 0.0; |
| ksc = | 3200.0; |
| kt = | 2500.0; |
| ge3 = | 2500.0 + 2000000.0 thetae + 100000000.0 thetae ^2; |
| k3 = | ksc/(ksc + kt); |
| np = | 0.333333; |
| a = | 1.0; |
| ts = | kt thetae; |
| fm = | kt thetae/np; |
| fh = | ge3 thetae a; |
| ft = | fm + fh; |
| xp = | −Log[1 − ft/400]/1.5; |
| ktp = | 1.0 ((15000.0 E^ (−1.5 xp)); |
| btp = | 1.0 (250 + 500 xp + 87.5 xp^2); |
| ksw = | 1.0 (25000.0); |
| bsw = | 1.0 (100.0); |
| jw = | 6.25; |
| rw = | 5.0; |
| kr = | 4000.0; |
| mp = | 0.025; |
| bp = | 2.0; |
| q1[s__]: = | bsw s + ksw; |
| q2[s__]: = | (btp + bsw) s + ktp + ksw; |
| q3[s__]: = | jw s^2 + q1[s] − q1[s]^2/q2[s] + kr rw^2; |
| q4[s__]: = | mp s^2 + bp s + kr; |
| tau = | 0.05; |
| pi = | N[Pi,10]; |
| ge4 = | 10.0; |
| tau11 = | 0.015; |
| tau12 = | 0.0025; |
| tau13 = | 0.005; |
| tau14 = | 0.05; |
| taum = | 0.015; |
| taue = | 0.0025; |
| taut = | 0.005; |
| tau21 = | 0.0; |
| tau31 = | 0.015; |
| tau32 = | 0.0025; |
| tau33 = | 0.005; |
| tau34 = | 0.05; |
| tau35 = | 1.0; |
| tau36 = | 0.1; |
| tau41 = | 0.2; |
| tau42 = | 0.02; |
| qO3[s__]: = | (ge3 (tau11 s + 1) (tau12 s + 1) (tau13 s + 1) (tau14 s + 1))/((taum + 1) (taue s + 1) (taut s + 1) (tau s + 1) (tau21 s + 1)); |
| qO4[s__]: = | (ge4 s (tau31 s + 1) (tau32 s + 1) (tau33 s + 1) |

-continued

```
              (tau34 s + 1) (tau35 s + 1) (tau36 s + 1))/
              (np (taum s + 1) (taue s + 1) (taut s + 1)
              (tau s + 1) (tau41 s + 1) (tau42 s + 1));
q8[s_]:    =  js s^2 + bs s + k3 kt;
q9[s_]:    =  js s^2 + bs s;
go[s_]:    =  Block[{myq03,myq04,myq3,myq4},
              myq03 = q03[s];
              myq04 = q04[s];
              myq3 = q3[s];
              myq4 = q4[s];
              N[(k3 kt/np + k3 myq03 a)/
              (myq4 − (kr rw)^2/myq3 + myq04 a) 10]];
ho    =       N[1/np, 10];
g[s_]:    =   Block[{myq03,myq04,myq3,myq4,myq7,myq8},
              myq03 = q03[s];
              myq04 = q04[s];
              myq3 = q3[s];
              myq4 = q4[s];
              myq8 = q8[s];
              N[(k3 kt/np + k3 myq03a)/
              (myq8 (myq4 − (kr rw)^2/myq3 + myq04 a)), 10]];
h[s_]:    =   N[q9[s]/np, 10];
```

FIGS. 25A–J are graphs depicting the dynamic performance of electronically controlled power steering system 430 utilizing the values assumed above. The graphs are the same series of plots utilized above with reference to FIGS. 18A–J and 19A–J. In accordance with the plots shown in FIGS. 19A–J, FIGS. 25A–J reflect the superior dynamic performance of power steering system 430.

Figure 26:
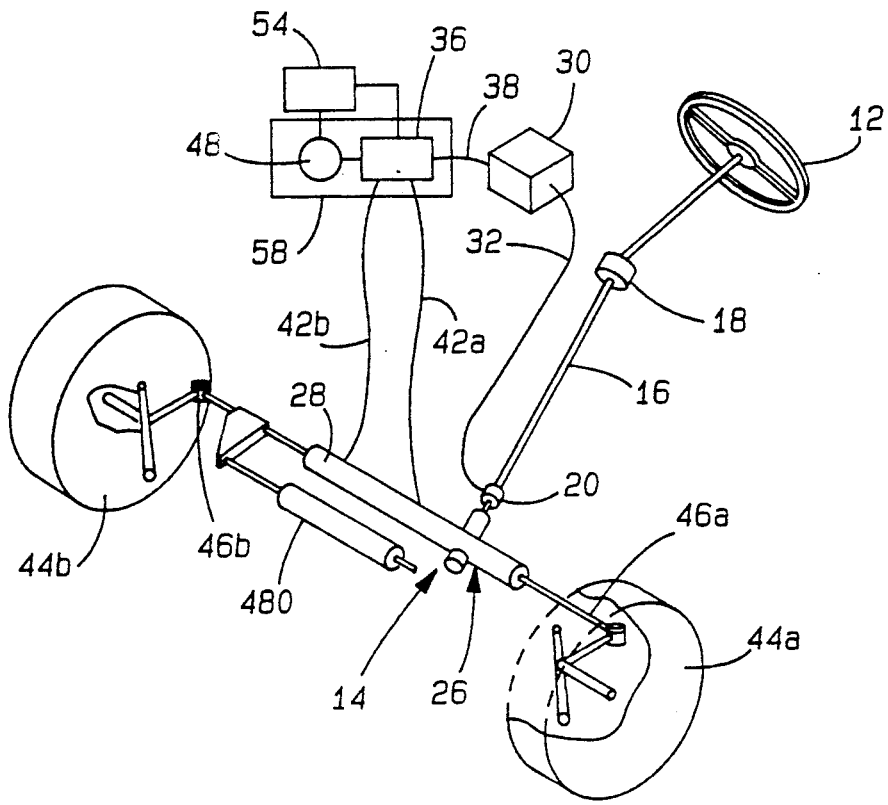
FIG. 26 is an isometric drawing showing the general relationship of the various components of an electronically controlled power steering system supplemented by a shock absorber-type damper mechanically linked to the tie rod and linkage assemblies thereof.

All of the dynamic performance characteristics related to volumetric flow are substantially eliminated in electronically controlled power steering system 430. Thus, negative velocity feedback due to interaction between volumetric flow through power cylinder 28 and flow conductance characteristics of rotary valve assembly 126 is substantially eliminated. For this reason, rate stabilization enabled by rate feedback is depicted in the block diagrams 20 and 22 to aid in achieving system stability. However, a hydro-mechanical form of rate feedback can be utilized in place of the electronic rate feedback provided by the tachometer 24. For instance, as discussed hereinbefore, one or more shock absorber-like devices 480 could be mechanically linked to tie rod and linkage assemblies 46a and/or 46b as shown in FIG. 26.

Figure 27:
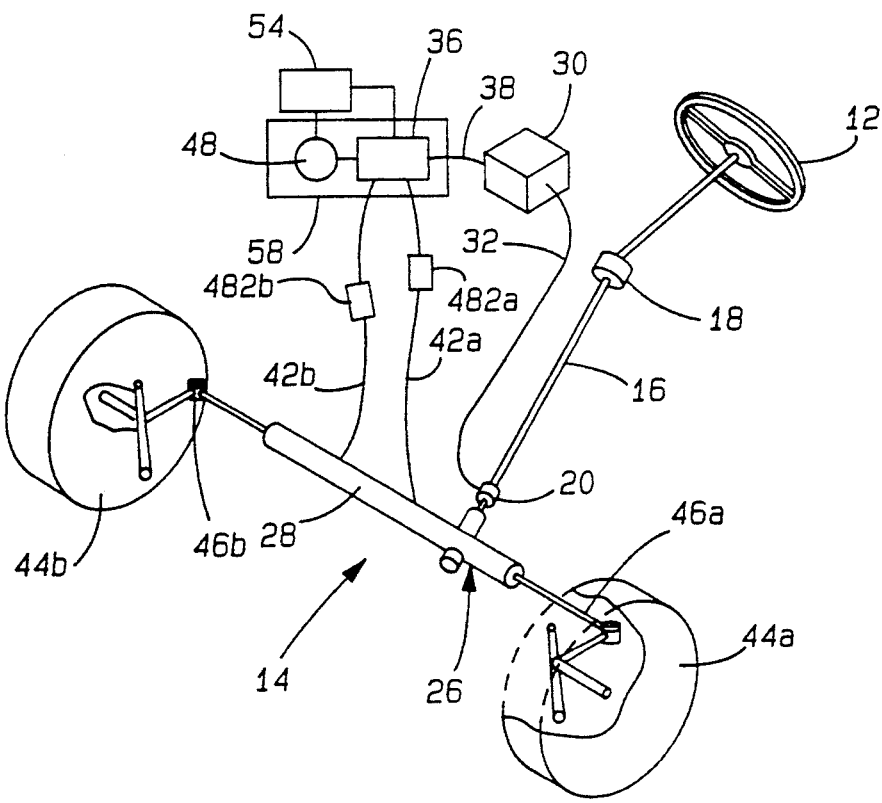
FIG. 27 is an isometric drawing showing the general relationship of various components of an electronically controlled power steering system supplemented by flow restrictors located between the control valve and the power cylinder portions thereof.

Alternately as is shown in FIG. 27, it is possible to utilize a pair of controlled orifice flow restrictors 482a and 482b to selectively impede fluid flow to and from power cylinder 28. This can be done via installation of controlled orifice flow restrictors 482 in left and right ports 184a and 184b, respectively, left and right hydraulic lines 42a and 42b, respectively (as shown in FIG. 27), or left and right ports 484a and 484b, respectively, of power cylinder 28. The controlled orifice flow restrictors 482 are those commonly utilized with reaction valves of the type described in U.S. Pat. No. 4,922,803 and U.S. patent application Ser. No. 485,637. However, using such hydro-mechanically sourced rate stabilization introduces hydraulic power loss associated with fluid flow through the controlled orifice flow restrictors 482. Thus, more hydraulic power is required whenever a steering system utilizing them is in motion.

Figure 28:
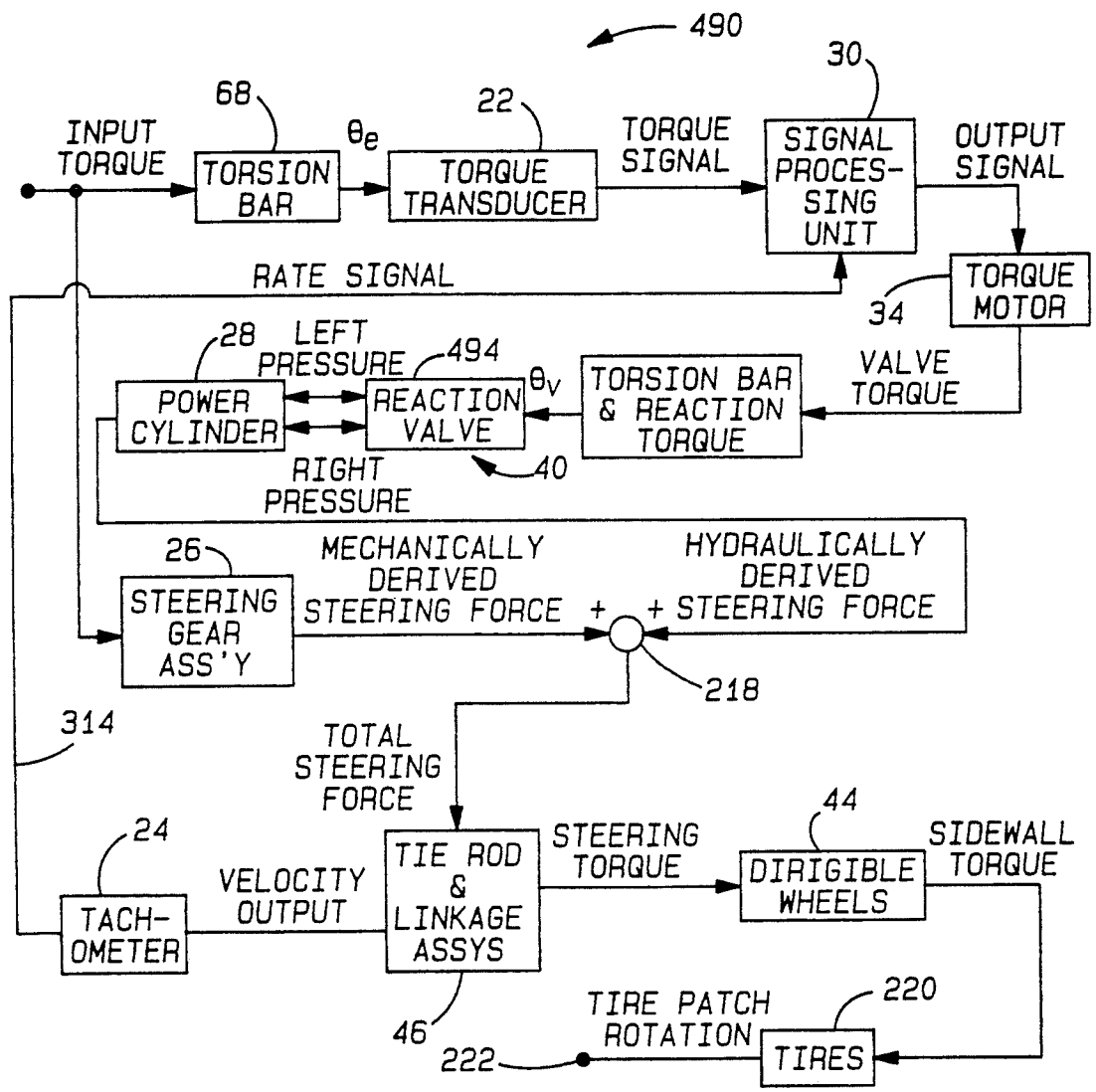
FIG. 28 is a block diagram depicting the operation of an electronically controlled power steering system using a reaction valve according to a fourth preferred embodiment of the present invention.

With reference now to FIG. 28, there is shown a block diagram depicting operation of an electronically controlled power steering system 490 according to the fourth embodiment of the present invention. The principle difference between electronically controlled power steering system 490 and electronically controlled power steering system 430 is that it incorporates a reaction valve 494 instead of rotary valve 126 in control valve assembly 36 which allows the elimination of differential pressure transducers 434.

Figure 29:
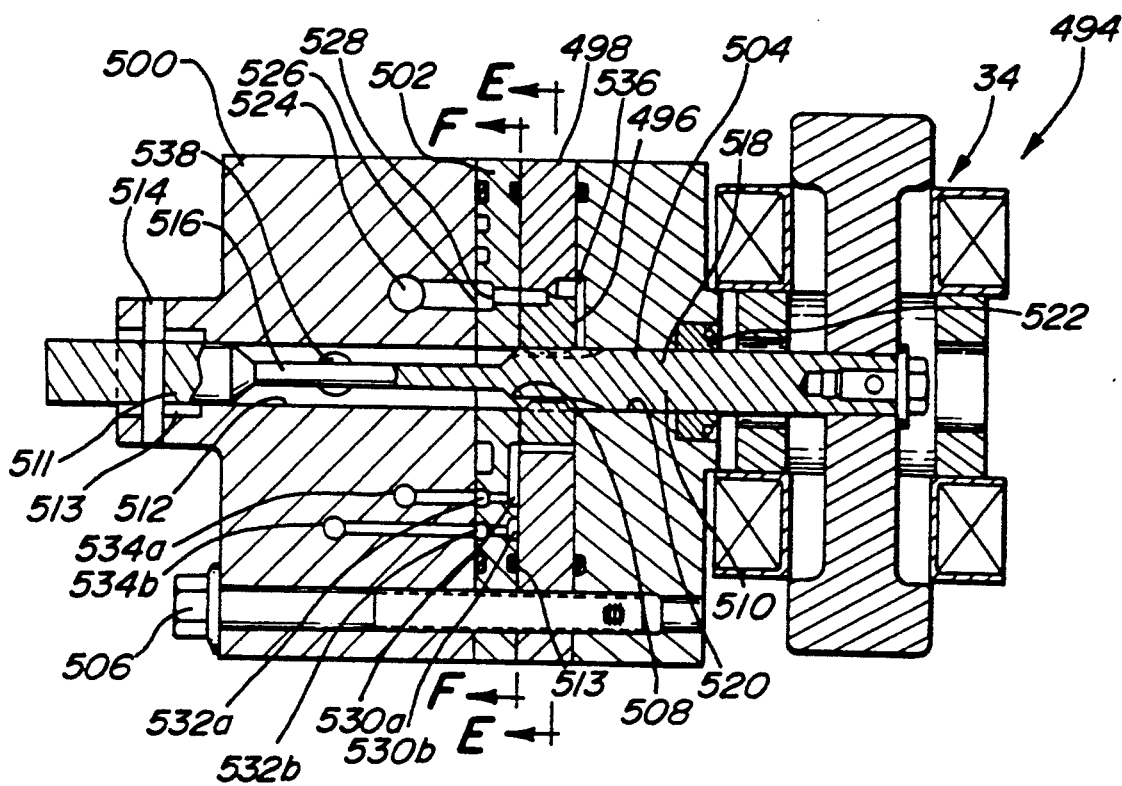
FIG. 29 is a sectional view of the variable ratio reaction valve assembly utilized in the fourth preferred embodiment of the present invention.
Figure 30:
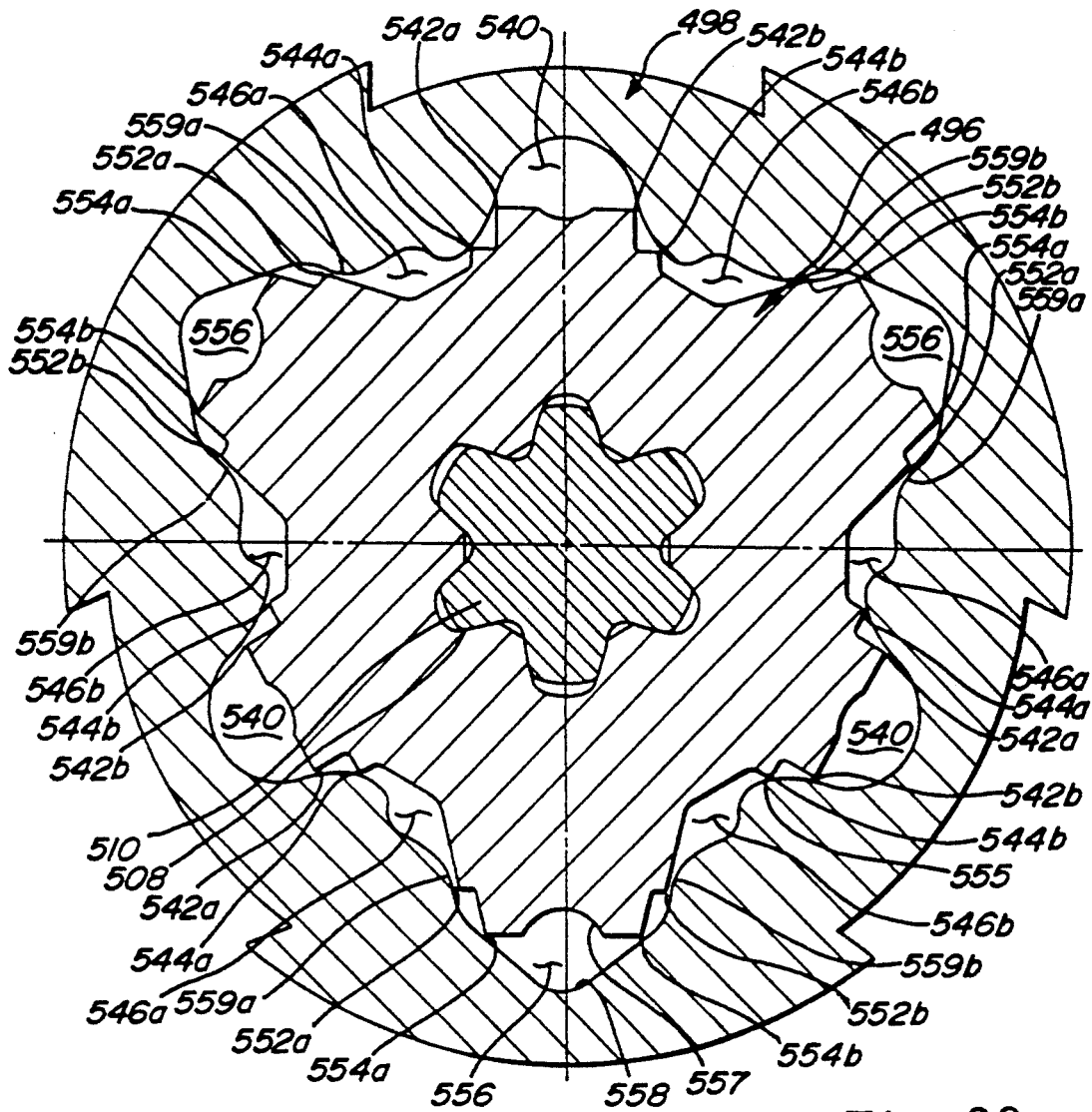
FIG. 30 is an enlarged cross-sectional view taken along line E—E of FIG. 29.
Figure 31:
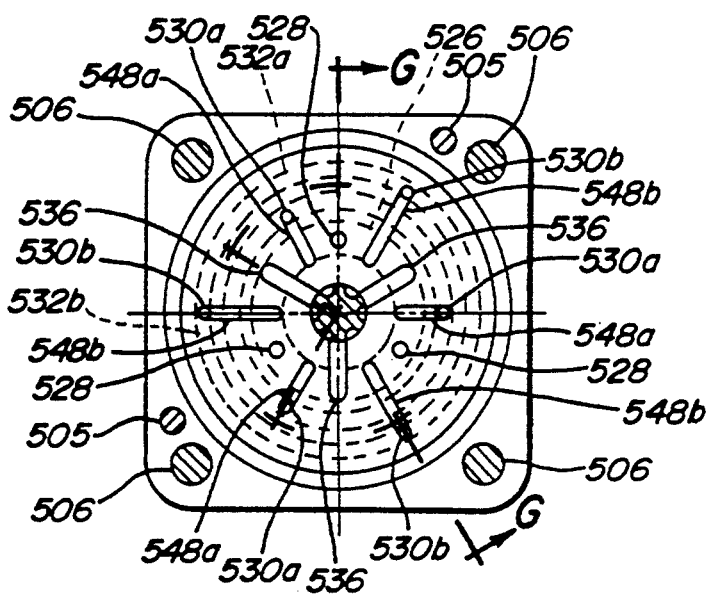
FIG. 31 is a cross-sectional view taken along line F—F of FIG. 29.

One exemplary type of reaction valve adapted for utilization in electronically controlled power steering system 490 was first described in incorporated U.S. Pat. No. 4,922,803 and modified in U.S. patent application Ser. No. 485,637. This control valve is known as a variable ratio reaction valve. An exemplary structural embodiment of variable ratio reaction valve 494 is shown in FIGS. 29, 30 and 31. In particular, variable ratio reaction valve 494 is a version of the variable ratio reaction valve shown in incorporated U.S. patent application Ser. No. 485,637 which has been modified to promote economic manufacturability according to methods described below.

FIG. 29 is a multi-sectioned sectional view of variable ratio reaction valve 494 taken along split line G—G of FIG. 31. FIG. 30 is an enlarged cross-sectional view of inner and outer valve members 496 and 498, respectively, taken along line E—E of FIG. 29. FIG. 31 is another cross-sectional view, taken along line F—F of FIG. 29, which depicts intermediate input, left, right, and return porting associated with variable ratio reaction valve 494.

Variable ratio reaction valve 494 has an advantage that its static performance characteristics can be selectively chosen such that they substantially emulate the "ideal" static performance characteristics described above. Thus, the "torque" signal can be linearly amplified by signal processing unit 30 to form the "output" signal used to drive torque motor 34. Further, variable ratio reaction valve 494 is superior in that it is a reaction valve whereby the torque imposed by torque motor 34 is predominantly opposed by internally generated feedback torque. Thus, feedback derived from a pressure signal such as that generated by pressure transducer 434 in electronically controlled power steering system 430 is not generally required in order to achieve superior performance of the reaction valve. The internally generated feedback torque also aids in centering the steering wheel after a turn because feedback pressure generated by the tire patches via left and right tie rod and linkage assemblies 46a and 46b, respectively, and power cylinder 28 tend to force internal valve member 496 to an "open" position. In addition, because mechanical backup steering generates feedback pressure via power cylinder 28 in the same manner, such mechanical backup steering can be accomplished with reduced effort.

With reference now to FIGS. 29-31, variable ratio reaction valve assembly 494 can be seen to include inner and outer valve members 496 and 498, respectively. Outer valve member 498 is fabricated in a plate form having the internal shape shown in FIG. 30. It is mounted in tandem with an intermediate porting plate 502 and a bearing plate 504 to a valve body 500. The components are positioned by asymmetrically oriented pins 505 and secured to valve body 500 by bolts 506. Pins 505 are positioned asymmetrically to preclude inverted assembly of any of the components.

Inner valve member 496 is slidably mounted on a spline 508 formed on a torsion bar 510. An outer portion 511 of torsion bar 510 is retained in axial bore 512 formed in valve body 500 by a pin 514. Torsion bar 510 also comprises a rotationally compliant section 516 with its inner portion 518 being radially constrained with axial bore 520 formed in bearing plate 504. Axial bore 520 acts as a bearing for rotation of inner portion 518 of torsion bar 510. A shaft seal 522 is mounted in a counterbore also formed concentrically in bearing plate 504. Shaft seal 522 and O-ring seals 513 keep hydraulic fluid contained with the valve assembly 494. Torque is applied to inner portion 518 of torsion bar 510 by torque motor 34 in response to the "output" signal from signal processing unit 30.

Pressurized fluid enters variable ratio reaction valve 494 via an input port 524 formed in valve body 500, an input groove 526 formed in intermediate porting plate 502, and intermediate input ports 528 formed in intermediate porting plate 502. Fluid selectively flows to left and right hydraulic lines 42a and 42b, respectively, via connection to left and right intermediate ports 530a and 530b, respectively, left and right grooves 532a and 532b, respectively, formed in intermediate porting plate 502, and left and right ports 534a and 534b, respectively, formed in valve body 500. Return fluid flows out of variable ratio reaction valve assembly 494 via return slots 536 formed in both bearing plate 504 and intermediate porting plate 502, annular spaces formed interstitially within the spline 508 and between axial bore 512 and rotationally compliant section 516 of torsion bar 510 and a return port 538.

With particular reference now to FIGS. 30 and 31, inner and outer valve members 496 and 498, respectively, can be seen to comprise a variety of flow channels and control orifices as described in incorporated U.S. patent application Ser. No. 485,637. Input fluid flows into input channels 540 directly via intermediate input ports 528 formed in intermediate porting plate 502. The fluid then flows past left and right secondary input orifices 542a and 542b, respectively and left and right primary input orifices 544a and 544b, respectively, to left and right channels 546a and 546b, respectively. Left and right fluid then selectively flows to-or-from left and right intermediate ports 530a and 530b, respectively. Left and right intermediate ports 530a and 530b, respectively, comprise left and right radial slots 548a and 548b, respectively. The fluid then flows past left and right secondary return orifices 552a and 552b, respectively, and left and right primary return orifices 554a and 554b, respectively, to return channels 556. Finally, return fluid flows out via return slots 536 as described above.

As depicted herein in FIG. 30, the geometric shapes of surface 557 on inner valve member 496 and surface 558 on outer valve members 498 defines the hydraulic interface therebetween. This interface has been modified from the surfaces depicted in incorporated U.S. patent application Ser. No. 485,637 to promote improved manufacturability. As depicted in FIG. 30, all of sharp cornered edges 555 utilized to define the left and right secondary input orifices 542a and 542b, respectively, left and right primary input orifices 544a and 544b, respectively, left and right secondary return orifices 552a and 552b, respectively, and left and right return primary orifices 554a and 554b, respectively, are formed on surface 557 of inner valve member 496. On the other hand, surface 558 on outer valve member 498 forms planar portions separated by gently curving surfaces. This can be regarded as a design choice made to facilitate a preferred method of manufacture of the surfaces 557 and 558 on inner and outer valve members 496 and 498, respectively.

Surface 557 is fabricated via a machining process known as radial profilating. In radial profilating, a high speed milling spindle is oriented off axis in a slightly non-perpendicular manner with respect to a work spindle (which in this case holds a plurality of inner valve members 496 on an arbor formed in the manner of spline 508). If surface 557 on inner valve member 496 is generally tri-symmetric as depicted in FIG. 30, then the high speed milling spindle on the radial profilator is gearably coupled to the work spindle with a 3:1 ratio and each of the repetitive facets of surface 557 is cut with a single cutting edge of a cutting tool mounted in the milling spindle. Because each of the repetitive facets of surface 557 is cut by a single cutting edge, this procedure results in minimal "tooth-to-tooth" errors (i.e., typically less than a micron) in surface 557.

Outer valve member 498 is preferably formed by a widely used process known as powdered metallurgy. Surface 558 is formed at near finished dimensions after compacting and sintering steps of the powdered metallurgy process. The final configuration of surface 558 is attained via a secondary operation known as "sizing" wherein a mandrel is forced through the previously sintered outer valve member 498 to enlarge surface 558 to its final geometrical shape.

In addition to the above, left and right secondary return orifices 552a and 552b, respectively, are formed from nominally parallel sets of left and right channels 559a and 559b, respectively. This precludes damage to either of the surfaces 557 and 558 should hydraulic failure occur with torque motor 34 applying full torque to inner valve member 496. In that case, inner valve member 496 rotates until surface 557 contacts surface 558 at three locations resulting in the collapse of either of the sets of left and right channels 559a and 559b, respectively. The radial extent of the sets of left and right channels 559a and 559b, respectively, is chosen such that they are capable of taking full torque from torque motor 34 without damage.

However, the design procedure described above requires that all of the other orifices be configured so that they do not achieve closure before either of the left and right channels 559a and 559b, respectively, achieves closure. As described in incorporated U.S. patent application Ser. No. 485,637, left and right secondary input orifices 542a and 542b, respectively, and left and right secondary return orifices 552a and 552b, respectively, achieve closure before left and right primary input orifices 544a and 544b, respectively, and left and right primary return orifices 554a and 554b, respectively. Thus, left and right secondary input orifices 542a and 542b, respectively, must be dimensioned so that they do not achieve closure before left and right channels 559a and 559b, respectively, achieve closure.

Also, because of a Bernoulli effect in which fluid pressure is reduced within the left and right channels 559a and 559b, respectively, due to the fluid velocity therein, the left and right secondary return orifices 552a and 552b, respectively, are positioned at a larger radial dimension such that the nominal desired radial location of the left and right secondary return orifices 552a and 552b, respectively, occurs at a location within the left and right channels 559a and 559b, respectively.

Figure 32:
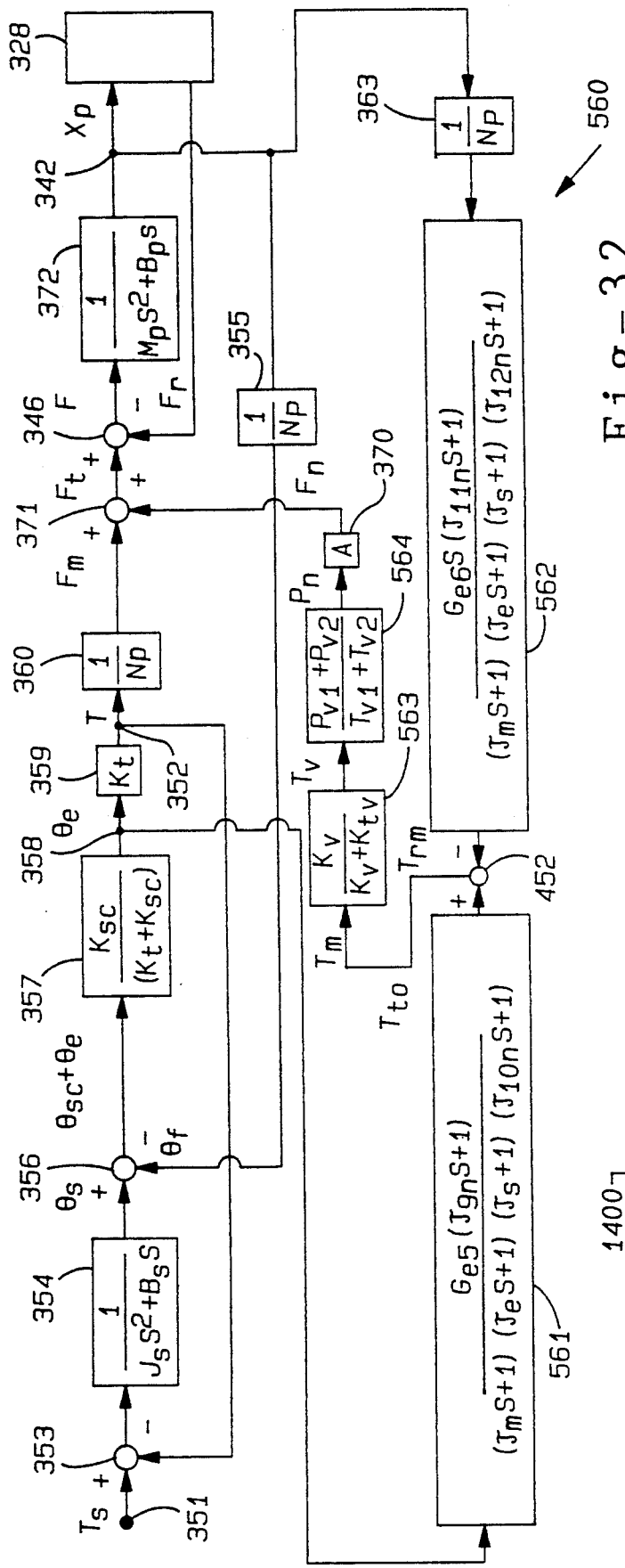
FIG. 32 is a detailed block diagram depicting the control system of the fourth preferred embodiment of the present invention.

With reference now to FIG. 32, there is shown an elaborate block diagram 560 which, when used with block diagram 328 (FIG. 14), permits detailed mathematical analysis of electronically controlled power steering system 490. Block diagram 560 is very similar to the block diagram 450. It differs only in that new gain functions $G_{e5}$ and $G_{e6}$ (blocks 561 and 562, respectively) have been substituted for the gain functions $G_{e3}$ and $G_{e4}$ in the blocks 451 and 453, respectively; time constants $\tau_{9n}$, $\tau_{10n}$, $\tau_{11n}$, and $\tau_{12n}$ have been substituted for time constants $\tau_{5n}$, $\tau_{6n}$, $\tau_{7n}$, and $\tau_{8n}$, respectively; the pole $(\tau_f s+1)$ shown in the blocks 451 and 453 has been deleted from blocks 561 and 562; and, the addition of blocks 563 and 564. The addition of blocks 563 and 564 is necessary because they describe variable reaction area functions associated with the reaction valve and which are used to calculate the output differential pressure, $P_h$, with respect to motor torque, $T_m$.

$T_m$ is multiplied by control element $K_v/(K_v+K_{tv})$ (where $K_v$ is a hydraulically generated equivalent torsional spring constant according to an equation kv=kv1+kv2 defined in the sixth program below) shown at block 563 to generate valve torque $T_v$. $T_v$ is multiplied by control element $(P_{v1}+P_{v2})/(T_{v1}+T_{v2})$ to generate output differential pressure $P_h$. It should be noted that $P_{v1}$ is valve pressure contribution made by fluid flow past the appropriate primary orifices 542 and 554. $P_{v2}$ is valve pressure contribution made by fluid flow past the appropriate secondary orifices 544 and 552. $T_{v1}$ is the torque required to actuate the primary orifice set and $T_{v2}$ is the torque required to actuate the secondary orifice set according to definitions give in the sixth program below.

Shown below are fifth and sixth computer programs for plotting output force $F_t$ and the dynamic system performance characteristics, respectively. The fifth program is defined as follows:

```
kt        =   2500.0;
ksc       =   3200.0;
k3        =   ksc/(ksc + kt);
np        =   0.333333;
qs        =   6.16;
a         =   1.0;
ktv       =   200.0;
ge5       =   1500.0;
lve       =   1.1;
rv1       =   0.4375;
av1       =   0.11;
rv2       =   0.4375;
av2       =   0.011;
xo1       =   0.009;
xo2       =   xo1 rv2/rv1;
x11       =   0.011;
x12       =   x11 rv2/rv1;
xv1[xv_]: =   xv;
xv2[xv_]: =   xv1[xv] rv2/rv1;
beta      =   0.524;
gamma     =   0.524;
tv1[xv_]: =   rv1 av1 qs^2/(56000 lve^2 (x11 − xv1[xv]) 2
              Sin[beta]^2;
tv2[xv_]: =   rv2 av2 qs^2/(56000 lve^2 (xo2 − xv2[xv])^2
              Cos[gamma]^2;
tv[xv_]:  =   tv1[xv] + tv2[xv];
ts[xv_]:  =   kt (tv[xv] + ktv xv1[xv]/rv1)/ge5;
fh[xv_]:  =   a (tv1[xv]/(rv1 av1) + tv2[xv]/(rv2 av2));
ft[xv_]:  =   fm[xv] + fh[xv];
thetae[xv_]: = ts[xv]/kt;
thetav[xv_]: = xv1[xv]/rv1;
thetas[xv_]: = ts[xv]/(k3 kt);
```

Figure 33:
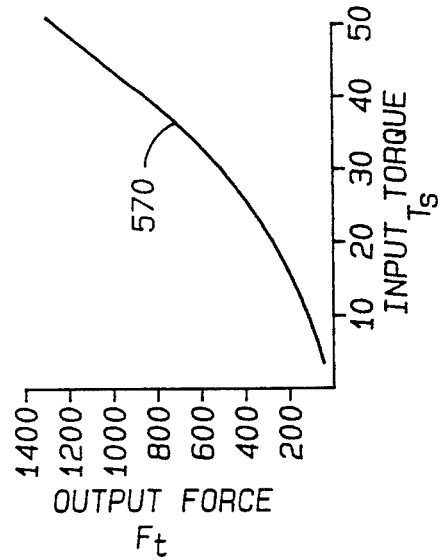
FIG. 33 is a graph presenting the static performance characteristics of an electronically controlled power steering system constructed according to the fourth preferred embodiment of the present invention.
Figure 34A:
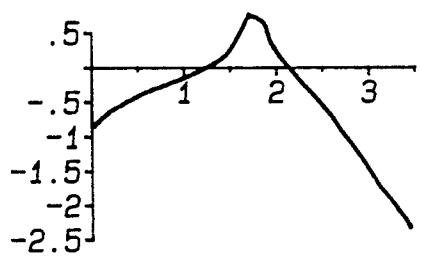
FIGS. 34 A-J are graphs depicting the dynamic performance of an electronically controlled power steering system constructed according to the fourth preferred embodiment of the present invention.
Figure 34B:
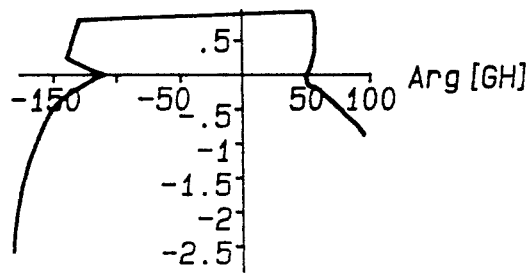
Figure 34C:
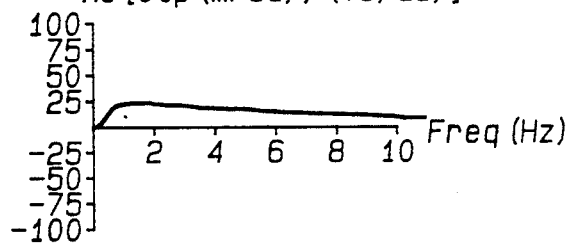
Figure 34D:
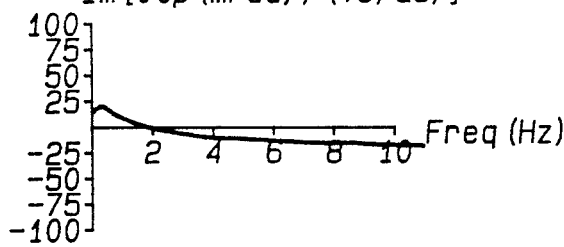
Figure 34E:
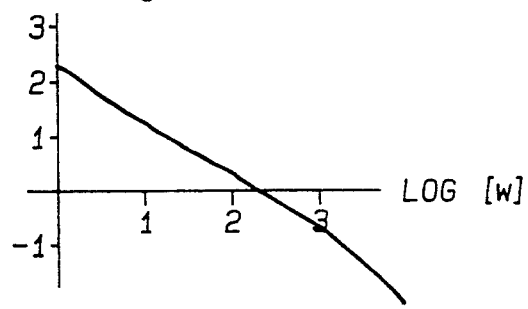
Figure 34F:
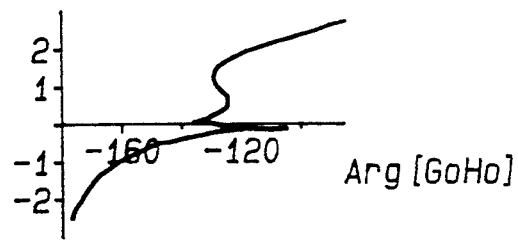
Figure 34G:
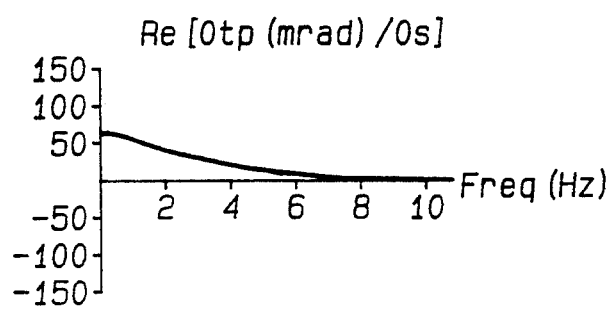
Figure 34H:
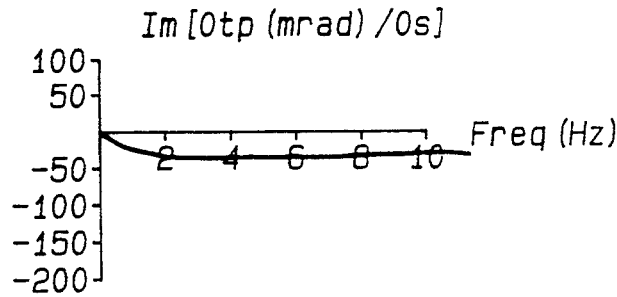
Figure 34I:
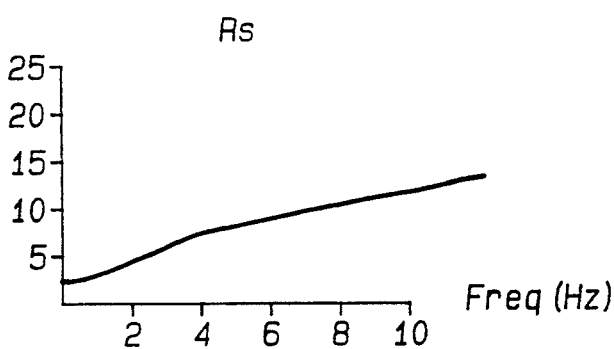
Figure 34J:
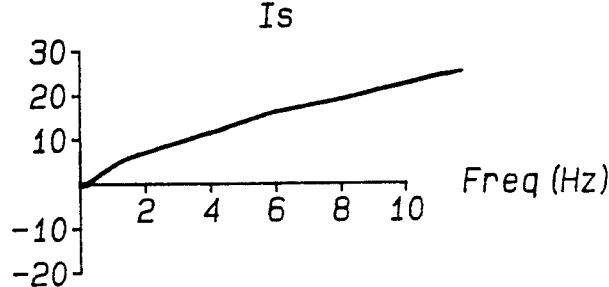

Shown in FIG. 33 is a graph wherein curve 570 depicts the static performance characteristics of electronically controlled power steering system 490 using the above described values. As desired, curve 570 is very similar to curves 242 and 476 shown in FIGS. 8 and 24, respectively.

The sixth program is used to plot dynamic system performance for a particular chosen value of xv ($X_v$). It is defined as follows:

```
xv        =   0.0069;
js        =   0.32;
bs        =   0.0;
ksc       =   3200.0;
kt        =   2500.0;
k3        =   ksc/(ksc + kt);
ktv       =   200;
lve       =   1.1;
rv1       =   0.4375;
av1       =   0.11;
rv2       =   0.4375;
av2       =   0.011;
xo1       =   0.009;
xo2       =   xo1 rv2/rv1;
x11       =   0.011;
x12       =   x11 rv2/rv1;
xv1       =   xv;
xv2       =   xv1 rv2/rv1;
beta      =   0.524;
gamma     =   0.524;
qs        =   6.16;
pv1       =   qs^2/(56000 lve^2 (x11 − xv1[xv])^2 Sin[beta]^2;
pv2       =   qs^2/(56000 lve^2 (xo2 − xv2[xv])^2 Cos[gamma]^2;
tv1       =   rv1 av1 pv1;
tv2       =   rv2 av2 pv2;
tv        =   tv1 + tv2;
ge5       =   1500;
ts        =   kt (tv + ktv xv1/rv1)/ge5;
kv1       =   rv1 av1 qs^2/(28000 lve^2 (x11 − xv1[xv])^3
              Sin[beta]^2;
kv2       =   rv2 av2 qs^2/(28000 lve^2 (xo2 − xv2[xv])^3
              Cos[gamma]^2;
kv        =   kv1 + kv2;
k2        =   kv/(kv + ktv);
np        =   0.333333;
fm        =   ts/np;
a         =   1.0;
fh        =   tv1 a/(rv1 av1) + tv2 a/(rv2 + av2);
ft        =   fm + fh;
xp        =   −Log[1 − ft/400]/1.5;
ktp       =   1.0 ((15000.0 E^(−1.5 xp));
btp       =   1.0 (250 + 500 xp + 87.5 xp^2);
ksw       =   1.0 (25000.0);
bsw       =   1.0 (100.0);
jw        =   6.25;
rw        =   5.0;
kr        =   4000.0;
mp        =   0.025;
bp        =   2.0;
q1[s_]:   =   bsw s + ksw;
q2[s_]:   =   (btp + bsw) s + ktp + ksw;
q3[s_]:   =   jw s^2 + q1[s] − q1[s]^2/q2[s] + kr rw^2;
q4[s_]:   =   mp s^2 + bp s + kr;
tau       =   0.05;
pi        =   N[Pi,10];
ge6       =   1.25;
tau11     =   0.015;
tau12     =   0.0025;
tau13     =   0.02;
tau14     =   0.05;
taum      =   0.015;
taue      =   0.0025;
tau21     =   0.2;
tau31     =   0.015;
tau32     =   0.0025;
tau33     =   0.005;
tau34     =   0.05;
tau41     =   0.0;
qO5[s_]:  =   (ge5 (tau11 s + 1) (tau12 s + 1) (tau13 s + 1)
              (tau14 s + 1))/((taum s + 1) (taue s + 1)
              (tau s + 1) (tau21 s + 1));
q06[s_]:  =   (ge6 (tau31 s + 1) (tau32 s + 1) (tau33 s + 1)
              (tau34 s + 1))/(np (taum s + 1) (taue s + 1)
              (tau s + 1) (tau41 s + 1);
q8[s_]:   =   js s^2 + bs s + k3 kt;
q9[s_]:   =   js s^2 + bs s;
go[s_]:   =   Block[{myq05,myq06,myq3,myq4},
```

```
            myq05 = q05[s];
            myq06 = q06[s];
            myq3 = q3[s];
            myq4 = q4[s];
            N[(k3 kt/np + (k3 myq05 k2 (pv1 + pv2) a)/tv/
            (myq4 − (kr rw)^2/myq3 + (myq06 k2
            (pv1 + pv2) a)/tv), 10]];
ho =        N[1/np, 10];
g[s_]: =    Block[{myq05,myq06,myq3,myq4,myq8},
            myq05 = q05[s];
            myq06 = q06[s];
            myq3 = q3[s];
            myq4 = q4[s];
            myq8 = q8[s];
            N[(k3 kt/np + (k3 myq05 k2 (pv1 + pv2) a)/tv/
            (myq8 (myq4 − (kr rw)^2/myq3 + (myq06 k2
            (pv1 + pv2) a/tv)), 10]];
h[s_]: =    N[q9[s]/np, 10];
```

FIGS. 34A-J are graphs that depict the dynamic performance of electronically controlled power steering system 490 utilizing the values assumed above. The graphs represent the same series of plots utilized above with reference to FIGS. 18A-J, 19A-J and 25A-J. As with the plots shown in FIGS. 19A-J and 25A-J, superior dynamic performance is illustrated.

Each of the embodiments of the present invention is adapted to prevent catastrophic failure. As in any power steering system, any system failure must be orderly in nature and "backup" mechanical steering must ensue without significant angular deviation of dirigible wheels 44a and 44b. In purely hydraulic power steering systems such as that shown in U.S. Pat. No. 4,452,274, this means that no catastrophic failure of the valve assembly is permitted (i.e., the torsion bar must never break, the rotor must always rotate freely within the valve sleeve and in the event of a hydraulic failure, and the physical integrity of the steering shaft and the pinion shaft must be maintained). In any of the electronically controlled power steering systems 210, 310, 430 or 490 hereinafter described, operation of the electronic devices including torque transducer 22, tachometer 24 and signal processing unit 30 is substantially fail-safe.

As discussed hereinbefore, fail-safe operation of the exemplary combined torque transducer and backup coupling assembly 92 and tachometer 24 is enabled via redundant sensor operation wherein the output of each pair of the redundant sensors is cross-checked. What is additionally required is to independently ensure that the torque delivered to control valve 40 in electronically controlled power steering systems 210, 310 and 490 or the differential output pressure measured by differential pressure measuring transducer 434 in electronically controlled power steering system 430 substantially matches that intended at all times.

Signal processing unit 30 includes power circuitry for driving torque motor 34. Exemplary power circuitry for this purpose is a PWM power signal generator 120 shown in FIGS. 26A and 26B of incorporated U.S. Pat. No. 4,956,590. Comprised within the PWM power signal generator 120 is a current sensor 126 and a voltage follower circuit whose output signal generates a signal ground which is nominally voltage centered between voltages present on the terminals of the host vehicle's battery. The voltage follower circuit is shown in FIG. 11 and is incorporated herein to provide such a signal ground.

Figure 35:
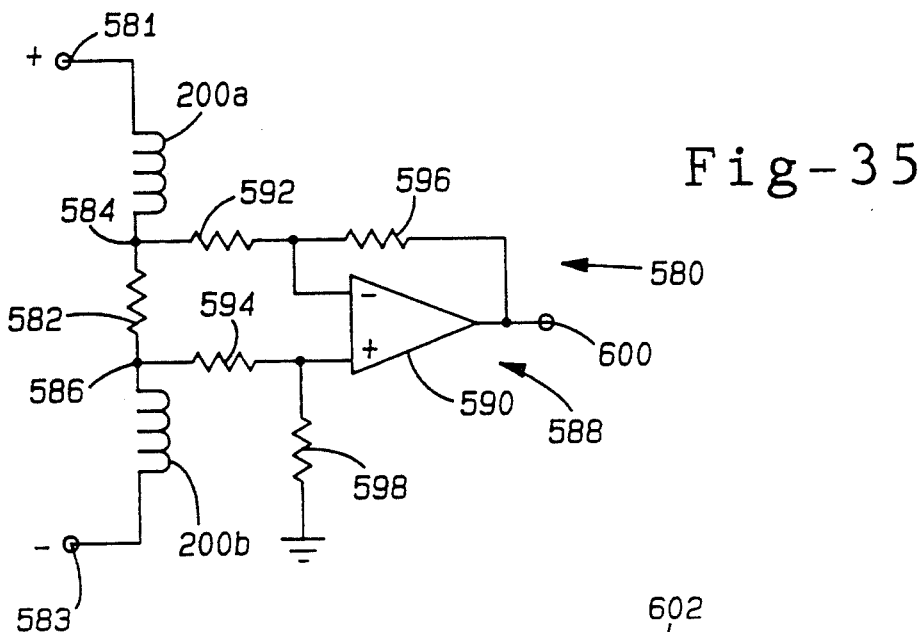
FIG. 35 is a circuit diagram depicting an exemplary circuit utilized for measuring current passing through the torque motor utilized in the first, second and fourth preferred embodiments of the present invention.

With reference now to FIG. 35, an exemplary current measuring circuit 580 which can be used as a current sensor is shown. Current measuring circuit 580 provides a voltage signal (relative to signal ground) which is indicative of the current flowing through torque motor 34. In current measuring circuit 580, armature windings 200a and 200b are connected to positive and negative terminals 581 and 583, respectively, so that voltages therebetween are always close to signal ground. A resistor 582 having a low value is inserted therebetween and the difference between voltage signals present at terminal 584 and terminal 586 are indicative of current flowing through armature windings 200a and 200b. These small differential voltage signals are then amplified in a standard manner by a differential amplifier 588, comprising an operational amplifier 590 and resistors 592, 594, 596 and 598, to obtain the voltage signal which is indicative of the current flowing through torque motor 34. The signal indicative of the current flowing through torque motor 34 is generated at an intermediate terminal 600 by the operational amplifier 590.

Figure 36:
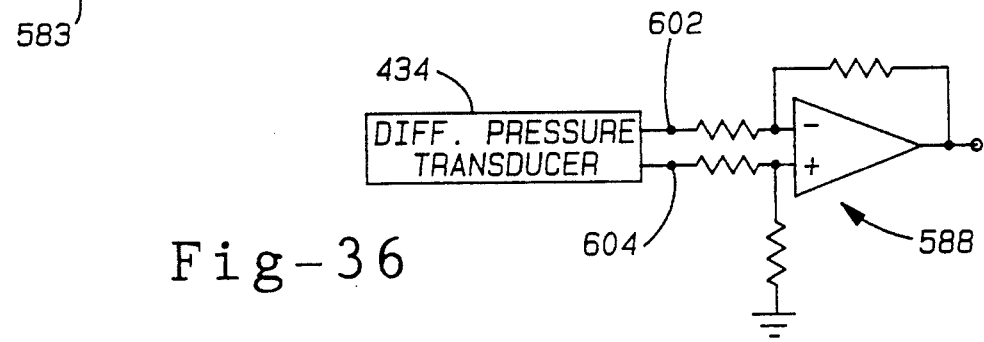
FIG. 36 is a circuit diagram depicting a portion of the exemplary circuit of FIG. 35 utilized for amplifying output signals from a differential pressure measuring transducer associated with the third preferred embodiment of the present invention.

As shown in FIG. 36, differential amplifier 588 can also be utilized for providing a voltage signal indicative of the differential output pressure measured by differential pressure measuring transducer 434 of FIG. 20. Input signals to differential amplifier 588 come from output terminals 602 and 604 of differential pressure measuring transducer 432.

Figure 37:
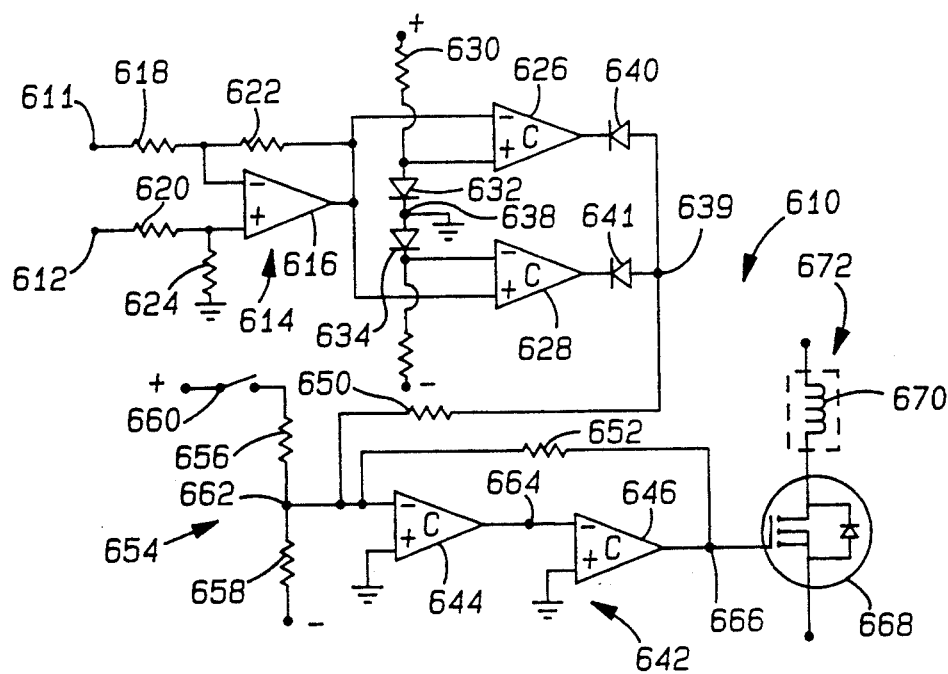
FIG. 37 is a circuit diagram depicting the circuitry utilized to effect the fail-safe operation associated with all of the preferred embodiments of the present invention.

FIG. 37 illustrates a contactor and alarm drive circuit 610. Differentially compared input signals to the contactor and alarm drive circuit 610 comprise the signal at intermediate terminal 611 and a signal derived from the torque signal and/or rate signal (as discussed above with reference to each of the electrically controlled power steering systems 210, 310, 430 and 490) which is applied to another intermediate terminal 612. The difference between the signals at the intermediate terminals 611 and 612 is amplified by another differential amplifier 614, comprising an operational amplifier 616 and resistors 618, 620, 622 and 624 in order to obtain an error signal.

The error signal is applied to the negative terminal of a comparitor 626 and the positive terminal of another comparitor 628. Concomitantly, the positive terminal of comparitor 626 and the negative terminal of comparitor 628 are biased 0.6 volts above and below signal ground, respectively, via current flow through a resistor 630, diodes 632 and 634, and a resistor 636 where a terminal 638 between the diodes 632 and 634 is tied to signal ground. Thereby, output signals of comparitors 626 and 628 are substantially at positive rail voltage if the error signal is less than 0.6 volts in magnitude. In this case, no current flows through either diode 640 or diode 641. On the other hand, if the error signal becomes greater than 0.6 volts in magnitude, the output signal of one of comparitors 626 and 628 instantly jumps to substantially negative rail voltage and current flows through one of diodes 640 and 641. Also, a negative voltage signal is present at intermediate terminal 639.

The intermediate terminal 639 serves as an input terminal for a flip/flop circuit 642, which comprises comparitors 644 and 646, resistors 650 and 652, and a voltage divider circuit 654 comprising resistors 656 and 658. When voltage divider 654 is energized via closing a switch 660 (i.e., the host vehicle's ignition switch), junction 662 has a positive voltage signal. This causes junction 664 to go substantially to negative rail voltage and junction 666 to go substantially to positive rail voltage. The positive voltage signal at the junction 666 causes a MOSFET 668 to conduct current through a contactor winding 670. The contactor winding 670 energizes a normally open contactor 672 disposed in series with torque motor 34 and current is allowed to conduct therethrough.

If, on the other hand, the voltage signal at terminal 639 jumps to substantially negative rail voltage, then current is pulled through either of diodes 640 or 641 and resistor 650. Then junction 662 has a negative voltage signal. This causes flip/flop circuit 642 to reset in an inverted manner by inverting all voltage signals. Thereafter, current flowing through resistor 652 is sufficient to hold flip/flop circuit 642 in its inverted condition as long as signal processing unit 30 is turned on. This causes MOSFET 668 to turn off and cease conducting current through contactor winding 670. The normally open contactor 672 reverts to its "off" state and current is not allowed to be conducted through torque motor 34.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An electronically controlled power steering system for motor vehicles of the type used for steering dirigible wheels in response to an input torque applied to a steering wheel, comprising:
    mechanical steering gear means coupled to said steering wheel for generating a mechanically derived steering force in response to said input torque;
    a power cylinder coupled to said mechanical steering gear means for producing a hydraulically derived steering force for augmenting said mechanically derived steering force;
    first transducer means for generating a first signal indicative of said input torque applied to said steering wheel;
    control valve means in fluid communication with said power cylinder for generating a differential pressure applied to said power cylinder;
    means for supplying fluid to said control valve means; and
    signal processing means for generating an output signal in response to said first signal, said signal processing means operable to selectively actuate said control valve means in response to said output signal for selectively regulating said hydraulically derived steering force generated by said power cylinder said signal processing means being adapted to amplify and selectively manipulate said first signal such that said output signal is a function of said input torque applied to said steering wheel.

2. The electronically controlled power steering system of claim 1 wherein said control valve means includes a control valve and valve actuation means for selectively actuating said control valve in response to said output signal.

3. The electronically controlled power steering system of claim 1 wherein said signal processing means includes means for generating said output signal as a function of vehicular speed.

4. The electronically controlled power steering system of claim 1 wherein said signal processing means includes means for amplifying said first signal so as to increase a system gain at relatively low input torque levels and decrease said gain at relatively high input torque levels.

5. The electronically controlled power steering system of claim 1 wherein said first transducer means is a torque transducer associated with said mechanical steering gear means.

6. The electronically controlled power steering system of claim 1 further including second transducer means for generating a rate signal indicative of the velocity of an output motion of said steering gear means, said rate signal being fed back to said signal processing means for selectively modifying said output signal.

7. The electronically controlled power steering system of claim 6 wherein said second transducer means is associated with said mechanical steering gear means.

8. The electronically controlled power steering system of claim 6 wherein said rate signal is frequency compensated and amplified by said signal processing means.

9. The electronically controlled power steering system of claim 8 wherein said rate signal is non-linearly amplified by said signal processing means as a function of one of its first own magnitude and magnitude of said first signal.

10. The electronically controlled power steering system of claim 8 wherein said rate signal is non-linearly amplified by said signal processing means as a function of its own first magnitude and a second magnitude of said first signal.

11. The electronically controlled power steering system of claim 6 wherein said signal processing means includes means for amplifying said rate signal as a function of vehicular speed for generating a rate derived - speed sensitive power steering.

12. The electronically controlled power steering system of claim 2 further comprising fluid pressure measurement means for measuring differential fluid pressure applied to said power cylinder upon actuation of said control valve and generating a pressure signal in response thereto.

13. The electronically controlled power steering system of claim 12 wherein said pressure signal is fed back to said signal processing means for selectively modifying said output signal in response thereto, and wherein said differential fluid pressure applied to said power cylinder is a function of said input torque applied to said steering wheel.

14. The electronically controlled power steering system of claim 6 further comprising fluid pressure measurement means for measuring said differential fluid pressure applied to said power cylinder upon actuation of said control valve and generating a pressure signal in response thereto.

15. The electronically controlled power steering system of claim 14 wherein said pressure signal is fed back to said signal processing means for selectively modifying said output signal in response thereto and wherein said differential fluid pressure applied to said power cylinder is a function of said input torque applied to said steering wheel.

16. The electronically controlled power steering system of claim 15 wherein said fluid pressure measurement means is a pressure transducer associated with said control valve.

17. The electronically controlled power steering system of claim 2 wherein said control valve is an open-centered rotary valve and said valve actuation means is a torque motor coupled to said rotary valve and operable to selectively control fluid flow therethrough.

18. The electronically controlled power steering system of claim 17 wherein said open-centered rotary valve and said torque motor are remotely located from said steering gear means.

19. The electronically controlled power steering system of claim 18 wherein said open-centered rotary valve and said torque motor form a control valve assembly.

20. The electronically controlled power steering system of claim 6 wherein said control valve is an open-centered rotary valve and said valve actuating means is a torque motor coupled to said rotary valve and operable to selectively control fluid flow therethrough.

21. The electronically controlled power steering system of claim 14 wherein said control valve is an open-centered rotary valve and said valve actuating means is a torque motor coupled to said rotary valve and operable to selectively control fluid flow therethrough.

22. The electronically controlled power steering system of claim 2 wherein said mechanical steering gear means includes an input shaft coupled to a steering shaft to which said steering wheel is secured, an actuation member generally coaxially aligned with said input shaft and a rotationally compliant member adapted to interconnect said input shaft to said actuation member for transmitting said input torque thereto, said input torque being transferred from said actuation member to a driven member for producing said mechanically derived steering force.

23. The electronically controlled power steering system of claim 22 wherein said first transducer means is operably associated with said input shaft and said actuation member for generating said first signal indicative of the torque transmitted to said actuation member.

24. The electronically controlled power steering system of claim 23 wherein said first transducer means comprises first and second proximity transducers secured on one of said input shaft and said actuation member which are adapted to measure the distance between complimentary facing surfaces on the other of said input shaft and said actuation member and wherein said compliant member elastically deflects in a substantially linear manner with respect to said input torque upon rotation of said input shaft so as to define a corresponding change in said proximate distance between said first and second proximity transducers and said complimentary facing surfaces, respectfully, which is concomitant with said input torque, said signal processing means adapted to manipulate signals generated by said first and second proximity detectors to define said first signal.

25. The electronically controlled power steering system of claim 24 wherein said first and second proximity transducers are mounted in opposed relation within a plurality of first jaw teeth formed on an end of one of said input shaft and said actuation member which are loosely fitted with a plurality of complimentary second jaw teeth formed in juxtaposed relation on an end of the other of said input shaft and said actuation member and wherein said first and second jaw teeth form a mechanical backup steering assembly such that when said input torque is substantially zero said first and second jaw teeth are substantially centered in a non-contacting orientation.

26. The electronically controlled power steering system of claim 25 wherein said first and second proximity transducers are redundant such that their respective output signals are compared by said signal processing means whereby upon an excessively divergent value thereof said mechanical backup steering assembly provides mechanically derived steering during conditions of substantially no hydraulically derived steering force being generated.

27. The electronically controlled power steering system of claim 22 wherein said mechanical steering gear means further includes second transducer means for generating a rate signal representative of the rotational velocity imparted on said actuation member relative to said input shaft.

28. The electronically controlled power steering system of claim 27 wherein said second transducer means comprises a tachometer.

29. The electronically controlled power steering system of claim 28 wherein said rate signal is fed back to said signal processing means for modifying said output signal so as to enhance a system stability whereby an unstable motion of said dirigible wheels is attenuated through a modification of said output signal.

30. The electronically controlled power steering system of claim 29 wherein said output signal from said signal processing means is applied to said valve actuating means for selective actuation of said control valve in a manner which is substantially linearly related to said output signal.

31. The electronically controlled power steering system of claim 30 wherein said valve actuating means includes a torque motor which is actuated to elastically deflect a torsion bar for selectively regulating flow characteristics of said control valve with respect to said power cylinder.

32. The electronically controlled power steering system of claim 31 wherein output from said control valve is a differential right and a left fluid flow to opposite ends of said power cylinder for generating said hydraulically derived steering force.

33. The electronically controlled power steering system of claim 32 wherein said rate signal is selectively increased as a function of vehicular speed for generating a rate derived speed sensitive steering.

34. A method for controlling a power steering system of the type used in motor vehicles for steering a pair of dirigible wheels, said method comprising the steps of:
applying an input torque to a power steering unit by applying a steering torque to a steering wheel coupled thereto;
generating a mechanically derived steering force in response to said input torque;
generating a hydraulically derived steering force in response to said input torque for augmenting said mechanically derived steering force;
summing said mechanically derived steering force and said hydraulically derived steering force to define a total steering force which is applied to the dirigible wheels;
sensing a first signal indicative of said input torque;
amplifying and modifying said first signal to generate an output signal which is a function of said input torque applied to said steering wheel;
applying said output signal to a control valve assembly; and
selectively actuating said control valve assembly in response to said output signal for regulating said hydraulically derived steering force as a function of said input torque.

35. The method of claim 34 wherein said power steering unit includes mechanical steering gear means coupled to said steering wheel for generating said mechanically derived steering force in response to said input torque and a power cylinder coupled to said mechanical steering gear means for producing said hydraulically derived steering force, said power cylinder fluidly communicating with said control valve assembly.

36. The method of claim 35 wherein said step of generating said output signal includes providing signal processing means for generating said output signal for selectively actuating said control valve assembly so as to selectively regulate said hydraulically derived steering force generated by said power cylinder.

37. The method of claim 36 wherein said control valve assembly includes a valve apparatus and a valve actuation means for selectively actuating said valve apparatus in response to said output signal from said signal processing means.

38. The method of claim 34 wherein said step of generating said output signal includes means for generating said output signal as a function of vehicular speed.

39. The method of claim 34 wherein said step of generating said output signal includes selectively amplifying said first signal so as to increase system gain at relatively low input torque levels and decrease system gain at relatively high input torque levels.

40. The method of claim 35 wherein said step of sensing said first signal includes providing a torque transducer within said mechanical steering gear means.

41. The method of claim 36 further comprising the step of sensing the velocity of an output motion of said steering gear means and generating a rate signal indicative thereof and inputting said rate signal to said signal processing means for selectively modifying said output signal with respect to said first signal and said rate signal.

42. The method of claim 41 wherein said step of sensing the velocity of an output motion of said steering gear means includes providing a tachometer in association with said mechanical steering gear means.

43. The method of claim 41 wherein said rate signal is manipulated and amplified by said signal processing means.

44. The method of claim 41 wherein said rate signal is non-linearly amplified as a function of one of its own magnitude and the magnitude of said first signal.

45. The method of claim 41 wherein said rate signal is non-linearly amplified as a function of its own magnitude and the magnitude of said first signal.

46. The method of claim 41 wherein said rate signal is amplified as a function of vehicular speed for generating rate derived speed-sensitive power steering.

47. The method of claim 36 further including the step of measuring the differential fluid pressure applied to said power cylinder and generating a pressure signal in response thereto.

48. The method of claim 47 said pressure signal is fed back to said signal processing means for selectively modifying said output signal in response thereto such that said differential fluid pressure applied to said power cylinder is a function of said input torque applied to said steering wheel.

49. The method of claim 41 further including the step of measuring the differential fluid pressure applied to said power cylinder and generating a pressure signal in response thereto.

50. The method of claim 49 said pressure signal is fed back to said signal processing means for selectively modifying said output signal in response thereto such that said differential fluid pressure applied to said power cylinder is a function of said input torque applied to said steering wheel.

51. The method of claim 50 wherein said step of measuring said differential fluid pressure includes providing a pressure transducer between said valve apparatus and said power cylinder.

52. An electronically controlled power steering system for motor vehicles of the type used for steering dirigible wheels in response to an input torque applied to a steering wheel, comprising:
mechanical steering gear means coupled to said steering wheel for generating a mechanically derived steering force in response to said input torque;
a power cylinder coupled to said mechanical steering gear means for producing a hydraulically derived steering force for augmenting said mechanically derived steering force;
first transducer means for generating a first signal indicative of said input torque applied to said steering wheel;
control valve means in fluid communication with said power cylinder for generating a differential pressure applied to said power cylinder;
means for supplying fluid to said control valve means;
a source of pressurized hydraulic fluid adapted to supply hydraulic fluid to said control valve means;
signal processing means for generating an output signal in response to said first signal, said signal processing means operable to selectively actuate said control valve means in response to said output signal for selectively regulating said hydraulically derived steering force generated by said power cylinder; and
second transducer means for generating a rate signal indicative of the velocity of an output motion of said mechanical steering gear means, said rate signal being fed back to said signal processing means for selectively modifying said output signal said signal processing means being adapted to amplify and selectively manipulate said first signal such that said output signal is a function of said input torque applied to said steering wheel.

53. The electronically controlled power steering system of claim 52 wherein said control valve means includes a control valve and valve actuation means for selectively actuating said control valve in response to said output signal.

54. The electronically controlled power steering system of claim 52 wherein said signal processing means includes means for generating said output signal as a function of vehicular speed.

55. The electronically controlled power steering system of claim 52 wherein said signal processing means includes means for amplifying said first signal so as to increase a system gain at relatively low input torque levels and decrease said system gain at relatively high input torque levels.

56. The electronically controlled power steering system of claim 52 wherein said first and second transducer means are associated with said mechanical steering gear means.

57. The electronically controlled power steering system of claim 52 wherein said rate signal is selectively manipulated and amplified by said signal processing means.

58. The electronically controlled power steering system of claim 57 wherein said rate signal is non-linearly amplified by said signal processing means as a function of one of a first magnitude of said rate signal and a second magnitude of said first signal.

59. The electronically controlled power steering system of claim 57 wherein said rate signal is non-linearly amplified by said signal processing means as a function of a first magnitude of said rate signal and a second magnitude of said first signal.

60. The electronically controlled power steering system of claim 52 wherein said signal processing means includes means for amplifying said rate signal as a function of vehicular speed for generating a rate derived - speed sensitive power steering.

61. The electronically controlled power steering system of claim 53 further comprising fluid pressure measurement means for measuring the differential fluid pressure applied to said power cylinder upon actuation of said control valve and generating a pressure signal in response thereto.

62. The electronically controlled power steering system of claim 61 wherein said pressure signal is fed back to said signal processing means for selectively modifying said output signal in response thereto and wherein said differential fluid pressure applied to said power cylinder is a function of said input torque applied to said steering wheel.

63. The electronically controlled power steering system of claim 62 wherein said fluid pressure measurement means is a pressure transducer associated with said control valve.

64. The electronically controlled power steering system of claim 53 wherein said control valve is an open-centered rotary valve and said valve actuation means is a torque motor coupled to said rotary valve and operable to selectively control fluid flow therethrough.

65. The electronically controlled power steering system of claim 61 wherein said control valve is an open-centered rotary valve and said valve actuation means is a torque motor operable to selectively control fluid flow through said reaction valve.

66. The electronically controlled power steering system of claim 53 wherein said mechanical steering gear means includes an input shaft coupled to a steering shaft to which said steering wheel is secured, an actuation member generally coaxially aligned with said input shaft and a rotationally compliant member adapted to interconnect said input shaft to said actuation member for transmitting said input torque thereto, said input torque being transferred from said actuation member to a driven member for producing said mechanically derived steering force.

67. The electronically controlled power steering system of claim 66 wherein said first transducer means is operably associated with said input shaft and said actuation member for generating said first signal indicative of the torque transmitted to said actuation member and wherein said first transducer means comprises first and second proximity transducers secured on one of said input shaft and said actuation member which are adapted to measure the distance between complimentary facing surfaces on the other of said input shaft and said actuation member and wherein said compliant member elastically deflects in a substantially linear manner with respect to said input torque upon rotation of said input shaft so as to define a corresponding change in said proximate distance between said first and second proximity transducers and said complimentary facing surfaces, respectfully, which is concomitant with said input torque, said signal processing means adapted to manipulate signals generated by said first and second proximity detectors to define said first signal.

68. The electronically controlled power steering system of claim 67 wherein said first and second proximity transducers are mounted in opposed relation within a plurality of first jaw teeth formed on an end of one of said input shaft and said actuation member which are loosely fitted with a plurality of complimentary second jaw teeth formed in juxtaposed relation on an end of the other of said input shaft and said actuation member and wherein said first and second jaw teeth form a mechanical backup steering assembly such that when said input torque is substantially zero said first and second jaw teeth are substantially centered in a non-contacting orientation.

69. The electronically controlled power steering system of claim 68 wherein said first and second proximity transducers are redundant such that their respective output signals are compared by said signal processing means whereby upon an excessively divergent value thereof said mechanical backup steering assembly provides mechanically derived steering during conditions of substantially no hydraulically derived steering force being generated.

* * * * *